United States Patent
Miyashita et al.

(10) Patent No.: US 8,068,399 B2
(45) Date of Patent: Nov. 29, 2011

(54) SIGNAL EVALUATION METHOD AND SIGNAL EVALUATION APPARATUS

(75) Inventors: Harumitsu Miyashita, Nara (JP); Kohei Nakata, Nara (JP); Yasumori Hino, Nara (JP); Naohiro Kimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 12/394,281

(22) Filed: Feb. 27, 2009

(65) Prior Publication Data

US 2009/0225639 A1 Sep. 10, 2009

Related U.S. Application Data

(60) Provisional application No. 61/048,262, filed on Apr. 28, 2008, provisional application No. 61/032,112, filed on Feb. 28, 2008.

(51) Int. Cl.
*G11B 5/09* (2006.01)
(52) U.S. Cl. ............ 369/59.22; 369/59.23; 369/59.26; 369/47.1
(58) Field of Classification Search .................. None
See application file for complete search history.

(56) References Cited

U.S. PATENT DOCUMENTS

| | | | |
|---|---|---|---|
| 7,440,522 B2 * | 10/2008 | Minemura | 375/341 |
| 7,603,611 B2 * | 10/2009 | Shiraishi | 714/794 |
| 2003/0043939 A1 | 3/2003 | Okumura et al. | |
| 2003/0067998 A1 | 4/2003 | Nakajima et al. | |
| 2003/0135812 A1 | 7/2003 | Akiyama et al. | |
| 2003/0174622 A1 | 9/2003 | Nagai et al. | |
| 2004/0208101 A1 | 10/2004 | Ohkubo et al. | |
| 2005/0078579 A1 | 4/2005 | Myashita et al. | |
| 2005/0249318 A1 | 11/2005 | Minemura | |
| 2007/0014385 A1 | 1/2007 | Shiraishi | |
| 2007/0195675 A1 | 8/2007 | Lee et al. | |

(Continued)

FOREIGN PATENT DOCUMENTS

EP 1 443 509 A2 8/2004
(Continued)

OTHER PUBLICATIONS

International Search Report for corresponding Application No. PCT/JP2009/000907 dated Apr. 14, 2009.

(Continued)

*Primary Examiner* — Muhammad N Edun
(74) *Attorney, Agent, or Firm* — Renner, Otto, Boisselle & Sklar, LLP

(57) ABSTRACT

A signal evaluation method according to the present invention is a method for evaluating a read signal, retrieved from an information recording medium, based on a binarized signal generated from the read signal by a PRML method. The method includes the steps of: detecting the patterns of multiple paths associated with the binarized signal and merging into the same state; getting the ideal value of a correct pattern associated with the binarized signal and that of an erroneous pattern that is similar to, but different from, the correct pattern; calculating the difference between a distance from the ideal value of the correct pattern to the read signal and a distance from that of the erroneous pattern to the read signal; calculating, based on the difference, an expected error rate for each predetermined group of patterns by the PRML method; and calculating a standard deviation that is associated with a total error rate, which is obtained by adding together the error rates of the predetermined groups of patterns, and that is used for evaluating the read signal.

5 Claims, 23 Drawing Sheets

U.S. PATENT DOCUMENTS

2008/0159104 A1    7/2008   Miyashita et al.

FOREIGN PATENT DOCUMENTS

| | | |
|---|---|---|
| JP | 2003-051163 | 2/2003 |
| JP | 2003-141823 | 5/2003 |
| JP | 2003-272304 | 9/2003 |
| JP | 2004-213862 | 7/2004 |
| JP | 2004-335079 | 11/2004 |
| JP | 3668178 | 4/2005 |
| JP | 2006-164318 | 6/2006 |
| WO | 2008/081820 A1 | 7/2008 |

OTHER PUBLICATIONS

Illustrated Blu-ray Disc Reader published by Ohmsha, Ltd., Dec. 10, 2006, pp. 136-137, pp. 144-155 and pp. 246-247 with a concise explanation and a partial English translation.

Adaptive Signal Processing Algorithm published by Baifukan Co., Ltd., Jul. 19, 2000, pp. 32-35 with a partial English translation.

Illustrated Blu-ray Disc Reader published by Ohmsha Ltd., Dec. 10, 2006, pp. 13-28 with concise explanation.

White paper, Blu-ray Disc Format, General, Aug. 2004, pp. 1-37.

White paper, Blu-ray Disc Format, 3. File System Specifications for BD-RE, R, ROM, Aug. 2004, pp. 1-6.

White paper, Blu-ray Disc Format, 4. Key Technologies, Aug. 2004, pp. 1-8.

Form PCT/ISA/237 and a partial English translation for International Application No. PCT/JP2009/000907 dated Apr. 14, 2009 (previously submitted on May 15, 2009).

Supplementary European Search Report for corresponding Application No. EP 09 71 4009 dated Jun. 29, 2011.

* cited by examiner

TRACK 131   SHORTEST MARK 132   LIGHT BEAM SPOT 133

FIG. 15
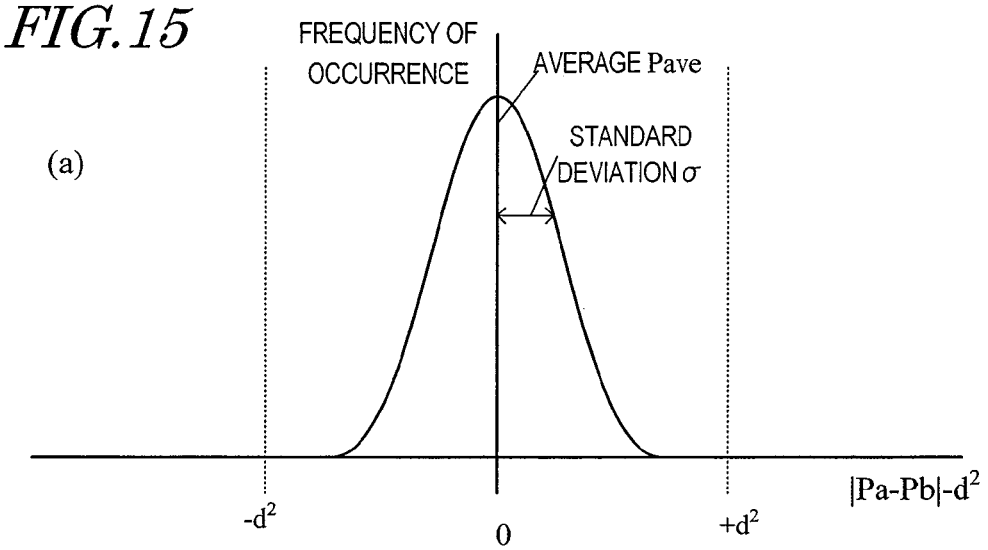
(a)
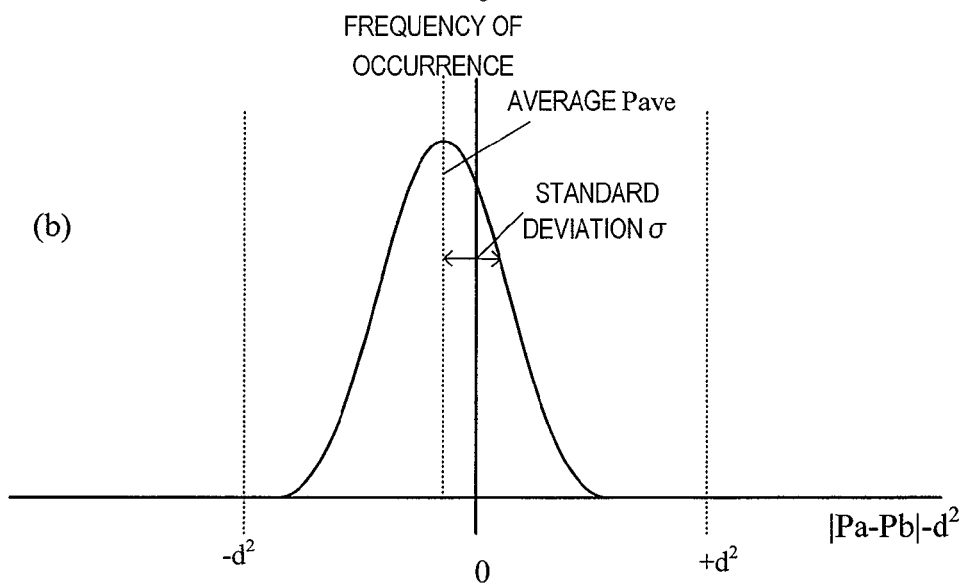
(b)
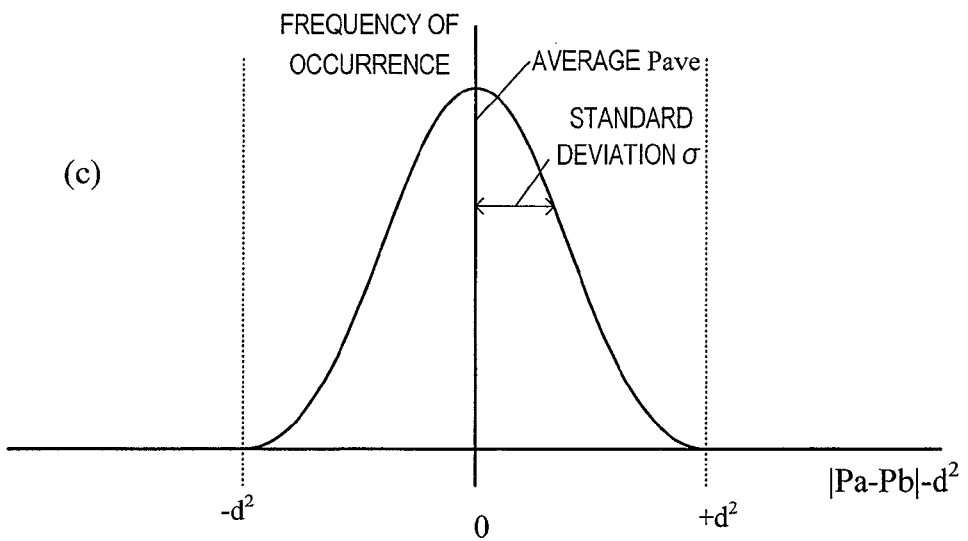
(c)

(b)

| TIME[T] | -1 | 0 | 1 | 2 | 3 | 4 | 5 | 6 | 7 | 8 | 9 | 10 | 11 | DESCRIPTION |
|---|---|---|---|---|---|---|---|---|---|---|---|---|---|---|
| PATTERN OF WAVEFORM A | 0 | 0 | 0 | 0 | 0 | 1 | 1 | 1 | 0 | 0 | 0 | 0 | 0 | ERRONEOUS PATTERN |
| PATTERN OF WAVEFORM B | 0 | 0 | 0 | 0 | 1 | 1 | 1 | 0 | 0 | 0 | 0 | 0 | 0 | ERRONEOUS PATTERN |
| PATTERN OF WAVEFORM C | 0 | 0 | 0 | 0 | 0 | 1 | 1 | 0 | 0 | 0 | 0 | 0 | 0 | CORRECT PATTERN |
| PATTERN OF WAVEFORM D | 0 | 0 | 0 | 0 | 0 | 0 | 1 | 1 | 0 | 0 | 0 | 0 | 0 | ERRONEOUS PATTERN |
| PATTERN OF WAVEFORM E | 0 | 0 | 0 | 0 | 1 | 1 | 0 | 0 | 0 | 0 | 0 | 0 | 0 | ERRONEOUS PATTERN |

FIG.27
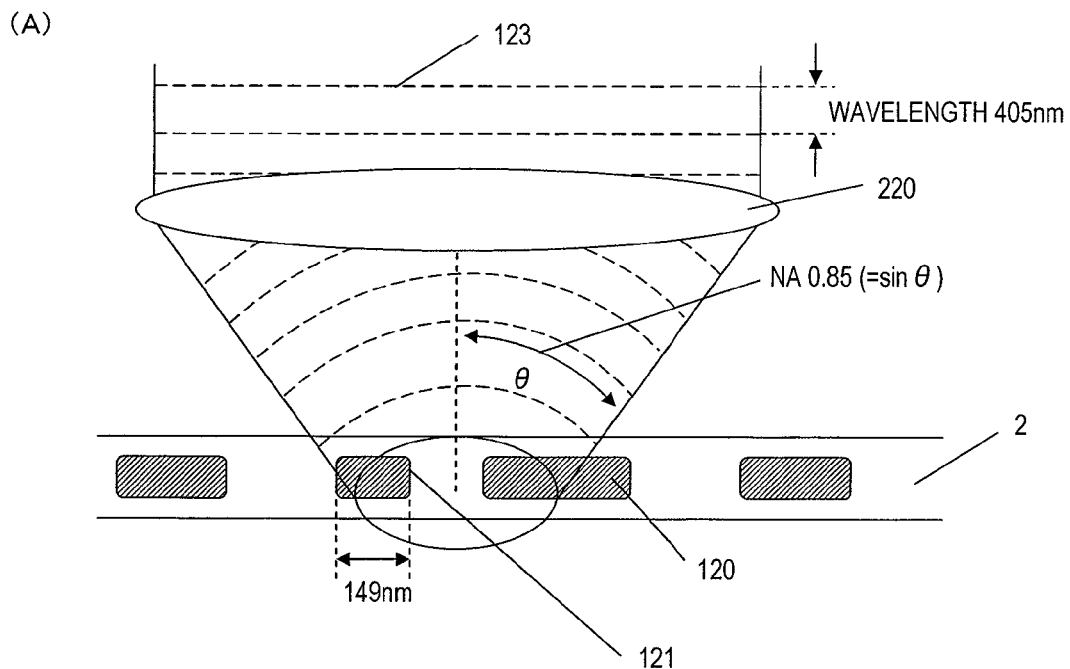
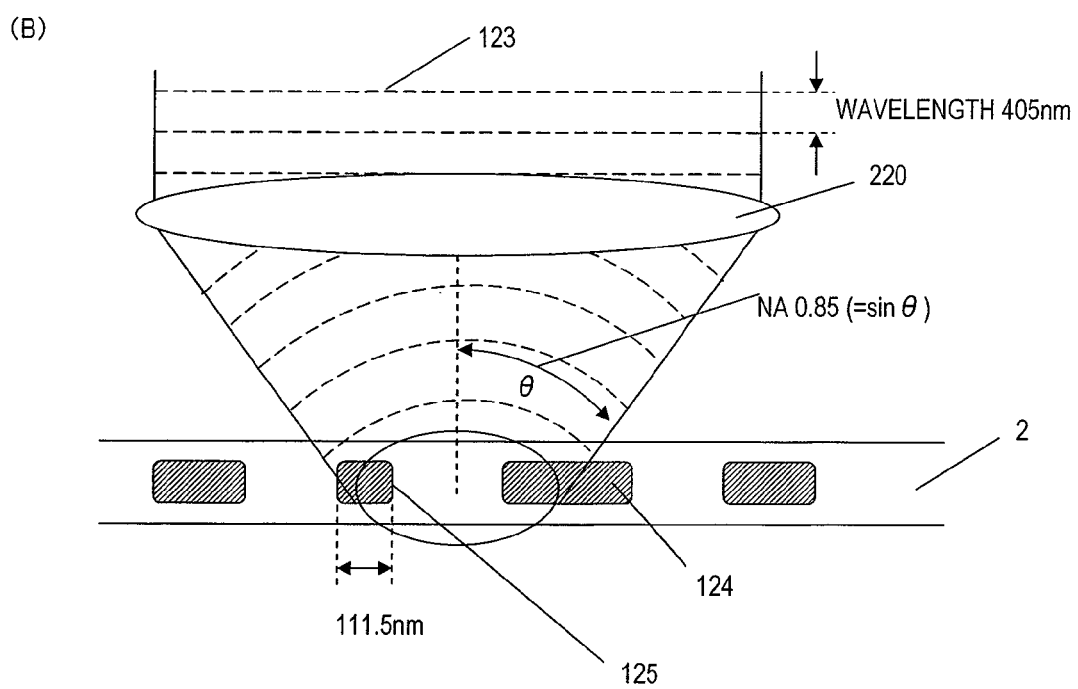

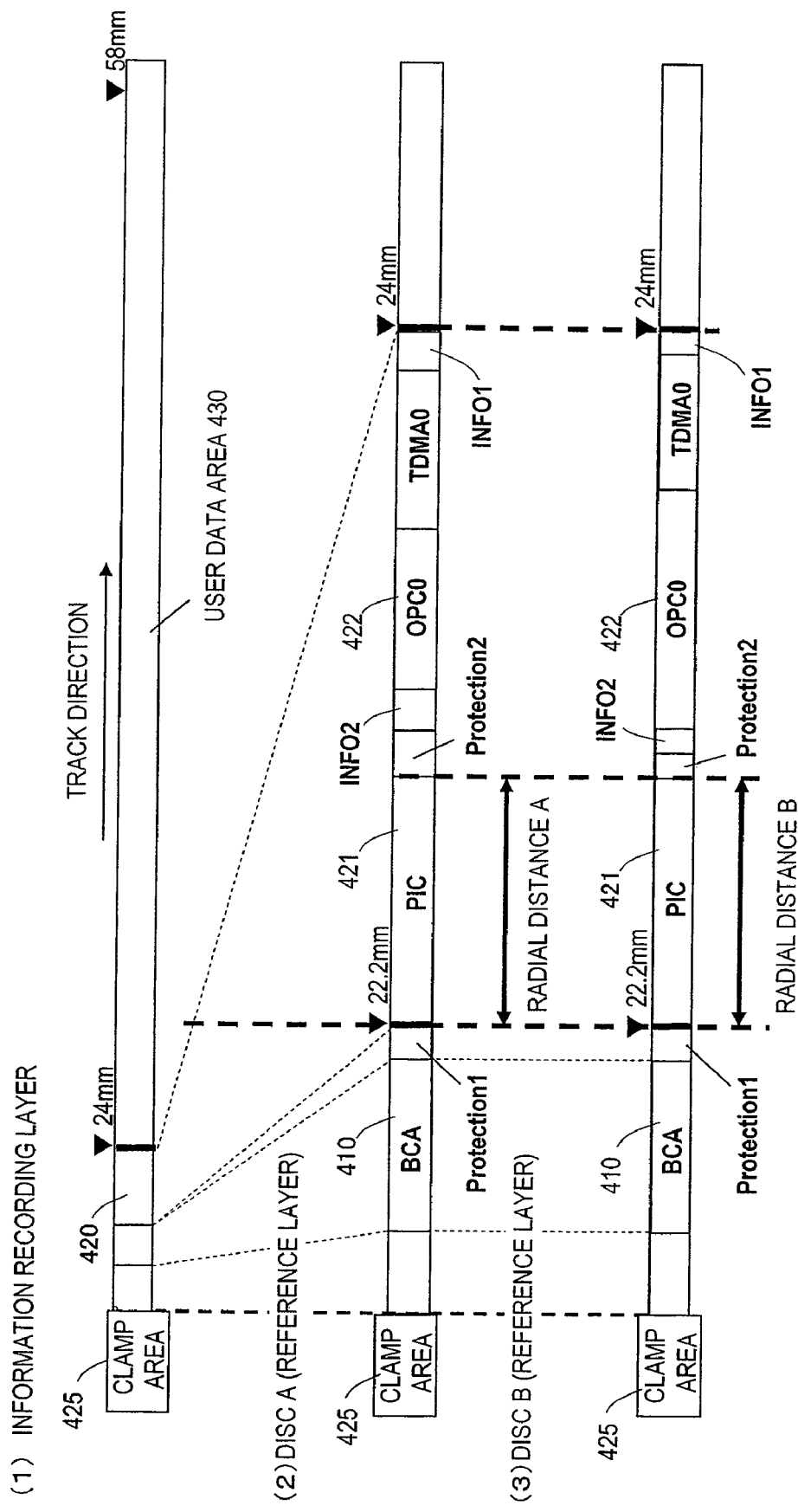

SIGNAL EVALUATION METHOD AND SIGNAL EVALUATION APPARATUS

BACKGROUND OF THE INVENTION

1. Field of the Invention

The present invention relates to a signal processing method that uses a maximum likelihood decoding technique and also relates to a method for evaluating a read signal by the maximum likelihood decoding technique.

2. Description of the Related Art

Recently, as the densities of optical disc media have been further increased, the shortest length of recording marks has come even closer to the limit of optical resolutions. As a result, intersymbol interference is occurring increasingly often and the SNR (signal to noise ratio) is decreasing even more significantly. To overcome these problems, it has become more and more common to adopt PRML (partial response maximum likelihood) as a signal processing method.

The PRML method is a combination of the partial response (PR) technique and the maximum likelihood (ML) technique, and is a method for selecting a most likely signal sequence based on a read signal waveform on the supposition that a known intersymbol interference should occur. Thus, it is known that decoding performance improves compared to the conventional level determination method (see, for example, Illustrated Blu-ray Disc Reader, Ohmsha, Ltd. (Non-Patent Document No. 1))

Meanwhile, as the level determination method has been gradually replaced by the PRML method as a mainstream signal processing method, some problems are arising about how to evaluate the read signal. Specifically, jitter has been used as an index for evaluating a read signal on the supposition that the signal processing technique is level determination, and therefore, may sometimes have no correlation with the decoding performance of the PRML method, which requires a different signal processing algorithm than that of the level determination. Thus, new indices that do have correlation with the decoding performance of the PRML method have been proposed (see, for example, Japanese Patent Application Laid-Open Publication No. 2003-141823 (Patent Document No. 1) and Japanese Patent Application Laid-Open Publication No. 2004-213862 (Patent Document No. 2)).

On the other hand, a new index that would contribute to detecting edge shifting between marks and spaces, which are very important factors that determine the storage quality of an optical disc medium, has also been proposed lately (see, for example, Japanese Patent Application Laid-Open Publication No. 2004-335079 (Patent Document No. 3)). As long as the PRML method is adopted, this index should also comply with the PRML rule and should also have correlation with the decoding performance of the PRML method. In addition, this index also needs to represent quantitatively the magnitude and direction of edge shifting on a pattern-by-pattern basis.

As described above, as the densities of optical disc media have been further increased, the intersymbol interference and SNR will have more and more serious consequences. Non-Patent Document No. 1 (Illustrated Blu-ray Disc Reader, Ohmsha, Ltd.) discloses that to maintain a system margin, the PRML methods need to be changed into a higher-order one. For example, if a 12 cm optical disc medium has a storage capacity of 25 GB per recording layer, the system margin can be maintained by adopting PR 1221 ML method. However, if the storage capacity per recording layer is 33.3 GB, then PR 12221 ML method should be adopted. It is expected that as the densities of optical disc media are further rising, the order of the PRML method to adopt should continue to get higher and higher in this manner.

Patent Document No. 1 (Japanese Patent Application Laid-Open Publication No. 2003-141823) and Patent Document No. 2 (Japanese Patent Application Laid-Open Publication No. 2004-213862) disclose that "difference metrics representing the difference between the first most likely state transition sequence and the read signal and the difference between the second most likely state transition sequence and the read signal" should be used as index values. In that case, if the "first and second most likely state transition sequences" that could produce errors have multiple patterns, then those patterns should be processed statistically. However, Patent Documents Nos. 1 and 2 do not disclose such a processing method.

Paying special attention to this point, Patent Document No. 5 (Japanese Patent Application Laid-Open Publication No. 2003-272304) discloses a method for detecting multiple patterns of the difference metrics that have been detected by the same method as the ones disclosed in Patent Documents Nos. 1 and 2 and processing those groups of patterns. According to the PR 12221 ML signal processing method disclosed in Patent Document No. 5, there are three groups of patterns (i.e., groups of patterns of merging paths with a relatively short Euclidean distance) that are likely to produce errors. These groups of patterns have mutually different probabilities and generate respectively different numbers of errors. That is why Patent Document No. 5 discloses a method in which a standard deviation $\sigma$ is calculated based on the distribution of index values that have been obtained from those patterns and in which the errors to produce are predicted based on the probability of occurrence of the patterns (i.e., the frequency of occurrence with respect to the total parameters) and the number of errors to produce when the patterns are erroneous. Patent Document No. 5 adopts, as a method for predicting the errors, a method in which the distribution of the index values thus obtained is supposed to be a normal distribution and in which the probability of the index value becoming equal to or smaller than zero (i.e., the probability of causing bit errors) is predicted based on the standard deviation $\sigma$ and the average variance $\mu$ thereof. This is a normal technique for predicting the probability of occurrence of errors. According to Patent Document No. 5, the probability of occurrence is calculated on a pattern-by-pattern basis, thereby calculating the expected error rate and using that expected error rate as an index to signal quality.

Patent Document No. 4 (Japanese Patent Application Laid-Open Publication No. 2003-51163) and Patent Document No. 5 mentioned above disclose a method that uses bER, predicted based on the difference metrics, as an index. However, even if those parameters were used as index values, those parameters would have no compatibility with jitters on the time axis that have been used as an index for evaluating the signal quality of an optical disc, and would be difficult to handle. Among other things, to ensure compatibility with the conventional jitter index values, signal evaluation indices that can represent the signal quality with $\sigma$ are particularly needed. A system that is supposed to use the PR 12221 ML signal processing technique as disclosed in Patent Document No. 5 needs a signal evaluation index that can be represented by $\sigma$ and that can indicate a signal quality that is highly correlated to the performance (as represented by the error rate) of the PR 12221 ML signal processing. As described above, according to the PR 12221 ML signal processing, there are three different groups of patterns (i.e., groups of patterns of merging paths with a relatively short Euclidean distance) that are likely to cause errors. FIG. 18 shows the distribution of the squares of the difference metrics in those three groups of patterns. Those three groups of patterns have mutually different probabilities and respectively different numbers of errors to occur, and therefore, it is difficult to represent those three groups of patterns as a single distribution.

SUMMARY OF THE INVENTION

It is therefore an object of the present invention to provide a method and apparatus for evaluating the quality of a read signal appropriately by a signal processing method suitable for a system that adopts a PRML method.

A signal evaluation method according to the present invention is a method for evaluating a read signal, retrieved from an information recording medium, based on a binarized signal that has been generated from the read signal by a PRML method. The method includes the steps of: detecting the patterns of multiple paths that are associated with the binarized signal and that merge into the same state; getting the ideal value of a correct pattern that is associated with the binarized signal and the ideal value of an erroneous pattern that is similar to, but different from, the correct pattern; calculating the difference between a distance from the ideal value of the correct pattern to the read signal and a distance from the ideal value of the erroneous pattern to the read signal; calculating, based on the difference, an expected error rate for each predetermined group of patterns by the PRML method; and calculating a standard deviation that is associated with a total error rate, which is obtained by adding together the error rates of the predetermined groups of patterns, and that is used for evaluating the read signal.

In one preferred embodiment, the step of calculating the error rate includes: calculating the standard deviation of the difference for each said predetermined group of patterns; detecting the probability of each said predetermined group of patterns; and calculating the error rate based on the standard deviation of the difference, the probability, and the number of errors occurring in each said predetermined group of patterns.

In another preferred embodiment, each said predetermined group of patterns has a Euclidean distance of 14 or less.

In still another preferred embodiment, the predetermined groups of patterns include: a group of patterns with a Euclidean distance of 14; a group of patterns with a Euclidean distance of 12 and with isolated 2T signals; and a group of patterns with a Euclidean distance of 12 and with a series of 2T signals.

In yet another preferred embodiment, the PRML method is PR 12221.

An apparatus according to the present invention is designed to evaluate a read signal, retrieved from an information recording medium, based on a binarized signal that has been generated from the read signal by a PRML method. The apparatus includes: a pattern detecting section for detecting the patterns of multiple paths that are associated with the binarized signal and that merge into the same state; a difference calculating section for calculating the difference between a distance from the ideal value of a correct pattern associated with the binarized signal to the read signal and a distance from the ideal value of an erroneous pattern, which is similar to, but different from, the correct pattern, to the read signal; an error rate calculating section for calculating, based on the difference, an expected error rate for each predetermined group of patterns by the PRML method; and a standard deviation calculating section for calculating a standard deviation that is associated with a total error rate, which is obtained by adding together the error rates of the predetermined groups of patterns, and that is used for evaluating the read signal.

In one preferred embodiment, the apparatus further includes: a calculating section for calculating the standard deviation of the difference for each said predetermined group of patterns; and a detecting section for detecting the probability of each said predetermined group of patterns. The error rate calculating section calculates the error rate based on the standard deviation of the difference, the probability, and the number of errors occurring in each said predetermined group of patterns.

In another preferred embodiment, each said predetermined group of patterns has a Euclidean distance of 14 or less.

In still another preferred embodiment, the predetermined groups of patterns include: a group of patterns with a Euclidean distance of 14; a group of patterns with a Euclidean distance of 12 and with isolated 2T signals; and a group of patterns with a Euclidean distance of 12 and with a series of 2T signals.

In yet another preferred embodiment, the PRML method is PR 12221.

An information recording medium according to the present invention has a predetermined quality. The information recording medium includes at least one recording layer, which has a recording area in which information is stored as a combination of marks and spaces. An evaluation value, representing a read signal that has been generated from the marks and the spaces, has a predetermined value. The process of calculating the evaluation value includes the steps of: generating a binarized signal from the read signal, which has been generated from the marks and spaces, by a PRML method; detecting the patterns of multiple paths that are associated with the binarized signal and that merge into the same state; calculating the difference between a distance from the ideal value of a correct pattern that is associated with the binarized signal to the read signal and a distance from the ideal value of an erroneous pattern that is similar to, but different from, the correct pattern to the read signal; calculating, based on the difference, an expected error rate for each predetermined group of patterns by the PRML method; and calculating a standard deviation that is associated with a total error rate, which is obtained by adding together the error rates of the predetermined groups of patterns, and that is used for evaluating the read signal.

A player according to the present invention is designed to read information from the information recording medium of the present invention described above. The player includes: a light receiving section for irradiating the information recording medium with a light beam and receiving light that has been reflected from the marks and the spaces; and a reading section for reading, based on a signal generated from the reflected light, information that is stored as the marks and the spaces.

A recorder according to the present invention is designed to write information on the information recording medium of the present invention described above. The recorder includes: an irradiating section for irradiating the information recording medium with a pulsed light beam, thereby forming marks on the recording area; and an adjusting section for adjusting an emission wave pattern of the light beam such that the evaluation value satisfies the predetermined value.

According to the present invention, with special attention paid to the patterns of merging paths, which have a relatively small Euclidean distance between them, in performing PRML signal processing, a single signal evaluation index is generated based on the difference metric information of multiple groups of patterns that have mutually different probabilities and that generate different numbers of errors. Specifically, the probabilities of errors of the respective groups of patterns are obtained and the sum is calculated. And based on the total error rate thus obtained, the standard deviation σ of the expected normal distribution is calculated. By using that standard deviation σ as the signal evaluation index, a method and apparatus for evaluating a signal quality in close correlation with the error rate can be provided.

Also, according to the present invention, if the quality of a given read signal is calculated by a PRML method in which a number of zero-cross portions are included in a merging path of a minimum difference metric, the quality is calculated by using only a state transition pattern in which only one zero-cross portion is included in a merging path of a non-minimum difference metric. By using such a state transition pattern in which only one zero-cross portion is included in a merging path, the error of each and every zero-cross portion (i.e., zero-cross information) can be detected separately and independently of each other. And by rating each zero-cross portion of the read signal on an individual basis, the quality of the read signal can be evaluated appropriately.

BRIEF DESCRIPTION OF THE DRAWINGS

FIGS. 15(a) through 15(c) show the distributions of signal quality evaluation indices according to a preferred embodiment of the present invention.

FIG. 27(A) illustrates an example of a BD with a storage density of 25 GB per recording layer and FIG. 27(B) illustrates an optical disc with a higher storage density than the 25 GB BD.

FIG. 30(1) illustrates the makeup of the information recording layer of Disc A with a predetermined storage density and Disc B with a higher storage density, while FIGS. 30(2) and 30(3) illustrate specific arrangements in the lead-in area of Discs A and B.

DETAILED DESCRIPTION OF PREFERRED EMBODIMENTS

Figure 1:
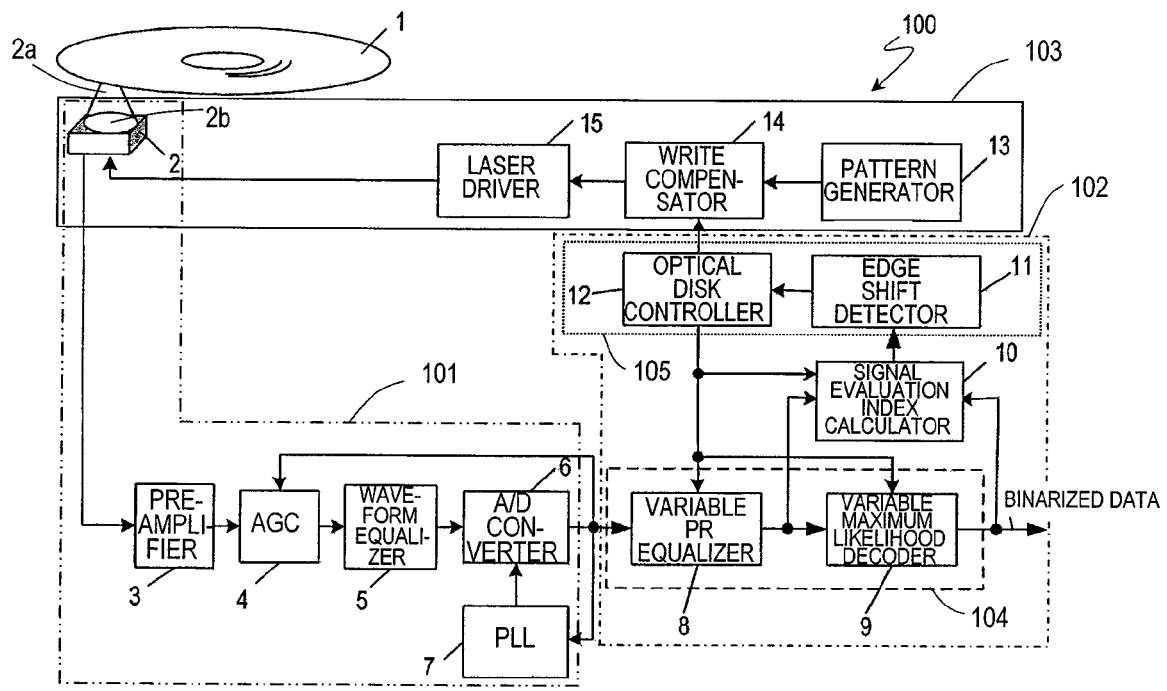
FIG. 1 illustrates an optical disc drive according to a preferred embodiment of the present invention.

Hereinafter, preferred embodiments of the present invention will be described with reference to the accompanying drawings. In the drawings, any pair of components shown in multiple sheets and having substantially the same function is identified by the same reference numeral. And once a component has been described, the description of its counterpart will be omitted herein to avoid redundancies.

First of all, it will be described how to adjust write parameters (e.g., how to adjust the edge positions of marks and spaces, among other things) by a PRML method according to a preferred embodiment of the present invention. As an exemplary method for adjusting write parameters is disclosed in Patent Document No. 3 (Japanese Patent Application Laid-Open Publication No. 2004-335079), only important points that have a lot to do with the present invention will be described. The entire disclosure of Patent Document No. 3 (Japanese Patent Application Laid-Open Publication No. 2004-335079) is hereby incorporated by reference.

In short, according to the present invention, the PR 12221 ML method is adopted to get signal processing done by the read system of a read/write system and a run length limited (RLL) code such as RLL (1, 7) is used as a recording code.

Figure 2:
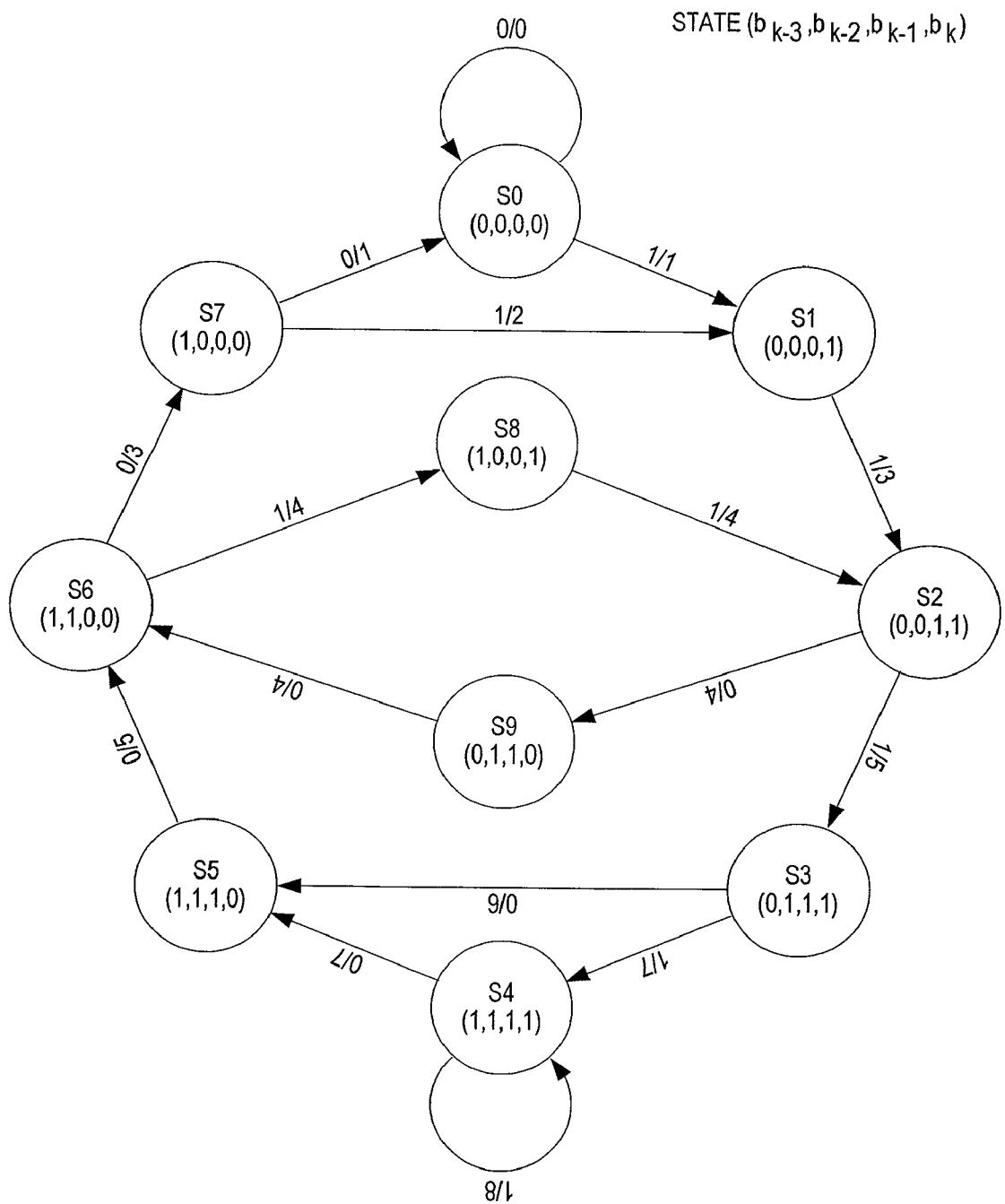
FIG. 2 shows state transition rules defined by a combination of RLL (1, 7) recording code and PR (1, 2, 2, 2, 1) equalization in a preferred embodiment of the present invention.
Figure 3:
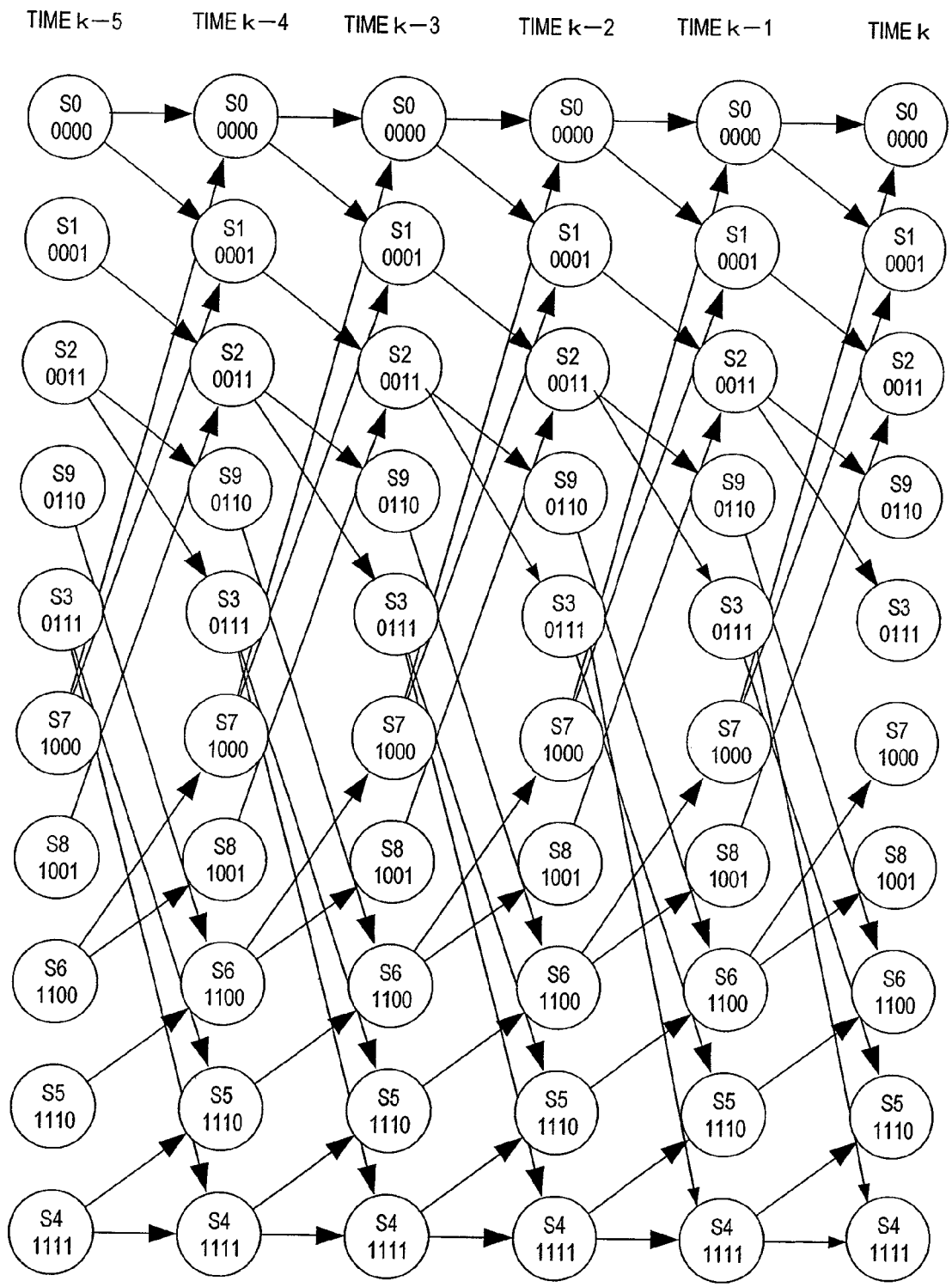
FIG. 3 is a trellis diagram corresponding to the state transition rules shown in FIG. 2.

Hereinafter, it will be described briefly with reference to FIGS. 2 and 3 what the PR 12221 ML method is. FIG. 2 is a state transition diagram showing state transition rules to be determined by the combination of the RLL (1, 7) recording code and equalization method PR (1, 2, 2, 2, 1). FIG. 3 is a trellis diagram representing the state transition rules shown in FIG. 2.

By combining PR 12221 ML and RLL (1, 7), the number of possible states of the decoding section is reduced to 10, the number of state transition paths becomes 16, and there are 9 read signal levels.

According to the state transition rules of the PR 12221 ML method shown in FIG. 2, ten states are represented by identifying, at a certain point in time, a state S (0, 0, 0, 0) by S0, a state S (0, 0, 0, 1) by S1, a state S (0, 0, 1, 1) by S2, a state S (0, 1, 1, 1) by S3, a state S (1, 1, 1, 1) by S4, a state S (1, 1, 1, 0) by S5, a state S (1, 1, 0, 0) by S6, a state S (1, 0, 0, 0) by S7, a state S (1, 0, 0, 1) by S8, and a state S (0, 1, 1, 0) by S9, respectively, where zero or one in the parentheses represents a signal sequence on the time axis and shows what state could be produced as a result of the next state transition from the current state. Also, if this state transition diagram is extended along the time axis, the trellis diagram shown in FIG. 3 can be obtained.

In the state transitions of PR 12221 ML shown in FIG. 3, there are an infinite number of state transition patterns (i.e., combinations of states) that can take two state transition paths in making a transition from a particular state at a certain point in time into another particular state at the next point in time. If we pay attention to only patterns that are particularly likely to produce errors in a certain time range, the state transition patterns of PR 12221 ML may be summarized as in the following Tables 1, 2 and 3:

TABLE 1

| state transition | recording code $(b_{k-i}, \ldots, b_k)$ | k−9 | k−8 | k−7 | k−6 | k−5 | k−4 | k−3 | k−2 | k−1 | k | PR equalization ideal value | | | | | Euclidean distance between paths |
|---|---|---|---|---|---|---|---|---|---|---|---|---|---|---|---|---|---|
| $S0_{k-5} \to S6_k$ | (0, 0, 0, 0, 1, 1, 1, 0, 0) | | | | | S0 | S1 | S2 | S3 | S5 | S6 | 1 | 3 | 5 | 6 | 5 | |
| | (0, 0, 0, 0, 0, 1, 1, 0, 0) | | | | | S0 | S0 | S1 | S2 | S9 | S6 | 0 | 1 | 3 | 4 | 4 | 14 |
| $S0_{k-5} \to S5_k$ | (0, 0, 0, 0, 1, 1, 1, 1, 0) | | | | | S0 | S1 | S2 | S3 | S4 | S5 | 1 | 3 | 5 | 7 | 8 | |
| | (0, 0, 0, 0, 0, 1, 1, 1, 0) | | | | | S0 | S0 | S1 | S2 | S3 | S5 | 0 | 1 | 3 | 5 | 7 | 14 |
| $S0_{k-5} \to S4_k$ | (0, 0, 0, 0, 1, 1, 1, 1, 1) | | | | | S0 | S1 | S2 | S3 | S4 | S4 | 1 | 3 | 5 | 7 | 8 | |
| | (0, 0, 0, 0, 0, 1, 1, 1, 1) | | | | | S0 | S0 | S1 | S2 | S3 | S4 | 0 | 1 | 3 | 5 | 7 | 14 |
| $S2_{k-5} \to S0_k$ | (0, 0, 1, 1, 1, 0, 0, 0, 0) | | | | | S2 | S3 | S5 | S6 | S7 | S0 | 5 | 6 | 5 | 3 | 1 | |
| | (0, 0, 1, 1, 0, 0, 0, 0, 0) | | | | | S2 | S9 | S6 | S7 | S0 | S0 | 4 | 4 | 3 | 1 | 0 | 14 |
| $S2_{k-5} \to S1_k$ | (0, 0, 1, 1, 1, 0, 0, 0, 1) | | | | | S2 | S3 | S5 | S6 | S7 | S1 | 5 | 6 | 5 | 3 | 2 | |
| | (0, 0, 1, 1, 0, 0, 0, 0, 1) | | | | | S2 | S9 | S6 | S7 | S0 | S1 | 4 | 4 | 3 | 1 | 1 | 14 |
| $S2_{k-5} \to S2_k$ | (0, 0, 1, 1, 1, 0, 0, 1, 1) | | | | | S2 | S3 | S5 | S6 | S8 | S2 | 5 | 6 | 5 | 4 | 4 | |
| | (0, 0, 1, 1, 0, 0, 0, 1, 1) | | | | | S2 | S9 | S6 | S7 | S1 | S2 | 4 | 4 | 3 | 2 | 3 | 14 |
| $S3_{k-5} \to S0_k$ | (0, 1, 1, 1, 1, 0, 0, 0, 0) | | | | | S3 | S4 | S5 | S6 | S7 | S0 | 7 | 7 | 5 | 3 | 1 | |
| | (0, 1, 1, 1, 0, 0, 0, 0, 0) | | | | | S3 | S5 | S6 | S7 | S0 | S0 | 6 | 5 | 3 | 1 | 0 | 14 |
| $S3_{k-5} \to S1_k$ | (0, 1, 1, 1, 1, 0, 0, 0, 1) | | | | | S3 | S4 | S5 | S6 | S7 | S1 | 7 | 7 | 5 | 3 | 2 | |
| | (0, 1, 1, 1, 0, 0, 0, 0, 1) | | | | | S3 | S5 | S6 | S7 | S0 | S1 | 6 | 5 | 3 | 1 | 1 | 14 |
| $S3_{k-5} \to S2_k$ | (0, 1, 1, 1, 1, 0, 0, 1, 1) | | | | | S3 | S4 | S5 | S6 | S8 | S2 | 7 | 7 | 5 | 4 | 4 | |
| | (0, 1, 1, 1, 0, 0, 0, 1, 1) | | | | | S3 | S5 | S6 | S7 | S1 | S2 | 6 | 5 | 3 | 2 | 3 | 14 |
| $S7_{k-5} \to S6_k$ | (1, 0, 0, 0, 1, 1, 1, 0, 0) | | | | | S7 | S1 | S2 | S3 | S5 | S6 | 2 | 3 | 5 | 6 | 5 | |
| | (1, 0, 0, 0, 0, 1, 1, 0, 0) | | | | | S7 | S0 | S1 | S2 | S9 | S6 | 1 | 1 | 3 | 4 | 4 | 14 |
| $S7_{k-5} \to S5_k$ | (1, 0, 0, 0, 1, 1, 1, 1, 0) | | | | | S7 | S1 | S2 | S3 | S4 | S5 | 2 | 3 | 5 | 7 | 7 | |
| | (1, 0, 0, 0, 0, 1, 1, 1, 0) | | | | | S7 | S0 | S1 | S2 | S3 | S5 | 1 | 1 | 3 | 5 | 6 | 14 |
| $S7_{k-5} \to S4_k$ | (1, 0, 0, 0, 1, 1, 1, 1, 1) | | | | | S7 | S1 | S2 | S3 | S4 | S4 | 2 | 3 | 5 | 7 | 8 | |
| | (1, 0, 0, 0, 0, 1, 1, 1, 1) | | | | | S7 | S0 | S1 | S2 | S3 | S4 | 1 | 1 | 3 | 5 | 7 | 14 |
| $S6_{k-5} \to S6_k$ | (1, 1, 0, 0, 1, 1, 1, 0, 0) | | | | | S6 | S8 | S2 | S3 | S5 | S6 | 4 | 4 | 5 | 6 | 5 | |
| | (1, 1, 0, 0, 0, 1, 1, 0, 0) | | | | | S6 | S7 | S1 | S2 | S9 | S6 | 3 | 2 | 3 | 4 | 4 | 14 |
| $S6_{k-5} \to S5_k$ | (1, 1, 0, 0, 1, 1, 1, 1, 0) | | | | | S6 | S8 | S2 | S3 | S4 | S5 | 4 | 4 | 5 | 7 | 7 | |
| | (1, 1, 0, 0, 0, 1, 1, 1, 0) | | | | | S6 | S7 | S1 | S2 | S3 | S5 | 3 | 2 | 3 | 5 | 6 | 14 |
| $S6_{k-5} \to S4_k$ | (1, 1, 0, 0, 1, 1, 1, 1, 1) | | | | | S6 | S8 | S2 | S3 | S4 | S4 | 4 | 4 | 5 | 7 | 8 | |
| | (1, 1, 0, 0, 0, 1, 1, 1, 1) | | | | | S6 | S7 | S1 | S2 | S3 | S4 | 3 | 2 | 3 | 5 | 7 | 14 |
| $S4_{k-5} \to S0_k$ | (1, 1, 1, 1, 1, 0, 0, 0, 0) | | | | | S4 | S4 | S5 | S6 | S7 | S0 | 8 | 7 | 5 | 3 | 1 | |
| | (1, 1, 1, 1, 0, 0, 0, 0, 0) | | | | | S4 | S5 | S6 | S7 | S0 | S0 | 7 | 5 | 3 | 1 | 0 | 14 |
| $S4_{k-5} \to S1_k$ | (1, 1, 1, 1, 1, 0, 0, 0, 1) | | | | | S4 | S4 | S5 | S6 | S7 | S1 | 8 | 7 | 5 | 3 | 2 | |
| | (1, 1, 1, 1, 0, 0, 0, 0, 1) | | | | | S4 | S5 | S6 | S7 | S0 | S1 | 7 | 5 | 3 | 1 | 1 | 14 |
| $S4_{k-5} \to S2_k$ | (1, 1, 1, 1, 1, 0, 0, 1, 1) | | | | | S4 | S4 | S5 | S6 | S8 | S2 | 8 | 7 | 5 | 4 | 4 | |
| | (1, 1, 1, 1, 0, 0, 0, 1, 1) | | | | | S4 | S5 | S6 | S7 | S1 | S2 | 7 | 5 | 3 | 2 | 3 | 14 |

TABLE 2

| state transition | recording code $(b_{k-i}, \ldots, b_k)$ | k-9 | k-8 | k-7 | k-6 | k-5 | k-4 | k-3 | k-2 | k-1 | k | PR equalization ideal value | | | | | | Euclidean distance between paths |
|---|---|---|---|---|---|---|---|---|---|---|---|---|---|---|---|---|---|---|
| $S0_{k-1} \rightarrow S0_k$ | (0, 0, 0, 0, 1, 1, 0, 0, 0, 0) | | S0 | S1 | S2 | S9 | S6 | S7 | S0 | S0 | 1 | 3 | 4 | 4 | 3 | 1 | 0 | |
| | (0, 0, 0, 0, 0, 1, 1, 0, 0, 0) | S0 | S0 | S1 | S2 | S9 | S6 | S7 | S0 | 0 | 1 | 3 | 4 | 4 | 3 | 1 | 12 |
| $S0_{k-1} \rightarrow S1_k$ | (0, 0, 0, 0, 1, 1, 0, 0, 0, 1) | | S0 | S1 | S2 | S9 | S6 | S7 | S0 | S1 | 1 | 3 | 4 | 4 | 3 | 1 | 1 | |
| | (0, 0, 0, 0, 0, 1, 1, 0, 0, 1) | S0 | S0 | S1 | S2 | S9 | S6 | S7 | S1 | 0 | 1 | 3 | 4 | 4 | 3 | 2 | 12 |
| $S0_{k-1} \rightarrow S2_k$ | (0, 0, 0, 0, 1, 1, 0, 0, 1, 1) | | S0 | S1 | S2 | S9 | S6 | S7 | S1 | S2 | 1 | 3 | 4 | 4 | 3 | 2 | 3 | |
| | (0, 0, 0, 0, 0, 1, 1, 0, 0, 1, 1) | S0 | S0 | S1 | S2 | S9 | S6 | S8 | S2 | 0 | 1 | 3 | 4 | 4 | 4 | 4 | 12 |
| $S2_{k-1} \rightarrow S6_k$ | (0, 0, 1, 1, 1, 0, 0, 1, 1, 0, 0) | | S2 | S3 | S5 | S6 | S8 | S2 | S9 | S6 | 5 | 6 | 5 | 4 | 4 | 4 | 4 | |
| | (0, 0, 1, 1, 0, 0, 1, 1, 0, 0) | S2 | S9 | S6 | S8 | S2 | S3 | S5 | S6 | 4 | 4 | 4 | 4 | 5 | 6 | 5 | 12 |
| $S2_{k-1} \rightarrow S5_k$ | (0, 0, 1, 1, 1, 0, 0, 1, 1, 1, 0) | | S2 | S3 | S5 | S6 | S8 | S2 | S3 | S5 | 5 | 6 | 5 | 4 | 4 | 5 | 6 | |
| | (0, 0, 1, 1, 0, 0, 1, 1, 1, 0) | S2 | S9 | S6 | S8 | S2 | S3 | S4 | S5 | 4 | 4 | 4 | 4 | 5 | 7 | 7 | 12 |
| $S2_{k-1} \rightarrow S4_k$ | (0, 0, 1, 1, 1, 0, 0, 1, 1, 1, 1) | | S2 | S3 | S5 | S6 | S8 | S2 | S3 | S4 | 5 | 6 | 5 | 4 | 4 | 5 | 7 | |
| | (0, 0, 1, 1, 0, 0, 1, 1, 1, 1) | S2 | S9 | S6 | S8 | S2 | S3 | S4 | S4 | 4 | 4 | 4 | 4 | 5 | 7 | 8 | 12 |
| $S3_{k-1} \rightarrow S6_k$ | (0, 1, 1, 1, 1, 0, 0, 1, 1, 0, 0) | | S3 | S4 | S5 | S6 | S8 | S2 | S9 | S6 | 7 | 7 | 5 | 4 | 4 | 4 | 4 | |
| | (0, 1, 1, 1, 0, 0, 1, 1, 0, 0) | S3 | S5 | S6 | S8 | S2 | S3 | S5 | S6 | 6 | 5 | 4 | 4 | 5 | 6 | 5 | 12 |
| $S3_{k-1} \rightarrow S5_k$ | (0, 1, 1, 1, 1, 0, 0, 1, 1, 1, 0) | | S3 | S4 | S5 | S6 | S8 | S2 | S3 | S5 | 7 | 7 | 5 | 4 | 4 | 5 | 6 | |
| | (0, 1, 1, 1, 0, 0, 1, 1, 1, 0) | S3 | S5 | S6 | S8 | S2 | S3 | S4 | S5 | 6 | 5 | 4 | 4 | 5 | 7 | 7 | 12 |
| $S3_{k-1} \rightarrow S4_k$ | (0, 1, 1, 1, 1, 0, 0, 1, 1, 1, 1) | | S3 | S4 | S5 | S6 | S8 | S2 | S3 | S4 | 7 | 7 | 5 | 4 | 4 | 5 | 7 | |
| | (0, 1, 1, 1, 0, 0, 1, 1, 1, 1) | S3 | S5 | S6 | S8 | S2 | S3 | S4 | S4 | 6 | 5 | 4 | 4 | 5 | 7 | 8 | 12 |
| $S7_{k-1} \rightarrow S0_k$ | (1, 0, 0, 0, 1, 1, 0, 0, 0, 0) | | S7 | S1 | S2 | S9 | S6 | S7 | S0 | S0 | 2 | 3 | 4 | 4 | 3 | 1 | 0 | |
| | (1, 0, 0, 0, 0, 1, 1, 0, 0, 0) | S7 | S0 | S1 | S2 | S9 | S6 | S7 | S0 | 1 | 1 | 3 | 4 | 4 | 3 | 1 | 12 |
| $S7_{k-1} \rightarrow S1_k$ | (1, 0, 0, 0, 1, 1, 0, 0, 0, 1) | | S7 | S1 | S2 | S9 | S6 | S7 | S0 | S1 | 2 | 3 | 4 | 4 | 3 | 1 | 1 | |
| | (1, 0, 0, 0, 0, 1, 1, 0, 0, 1) | S7 | S0 | S1 | S2 | S9 | S6 | S7 | S1 | 1 | 1 | 3 | 4 | 4 | 3 | 2 | 12 |
| $S7_{k-1} \rightarrow S2_k$ | (1, 0, 0, 0, 1, 1, 0, 0, 1, 1) | | S7 | S1 | S2 | S9 | S6 | S7 | S1 | S2 | 2 | 3 | 4 | 4 | 3 | 2 | 3 | |
| | (1, 0, 0, 0, 0, 1, 1, 0, 0, 1, 1) | S7 | S0 | S1 | S2 | S9 | S6 | S8 | S2 | 1 | 1 | 3 | 4 | 4 | 4 | 4 | 12 |
| $S6_{k-1} \rightarrow S0_k$ | (1, 1, 0, 0, 1, 1, 0, 0, 0, 0) | | S6 | S8 | S2 | S9 | S6 | S7 | S0 | S0 | 4 | 4 | 4 | 4 | 3 | 1 | 0 | |
| | (1, 1, 0, 0, 0, 1, 1, 0, 0, 0) | S6 | S7 | S1 | S2 | S9 | S6 | S7 | S0 | 3 | 2 | 3 | 4 | 4 | 3 | 1 | 12 |
| $S6_{k-1} \rightarrow S1_k$ | (1, 1, 0, 0, 1, 1, 0, 0, 0, 1) | | S6 | S8 | S2 | S9 | S6 | S7 | S0 | S1 | 4 | 4 | 4 | 4 | 3 | 1 | 1 | |
| | (1, 1, 0, 0, 0, 1, 1, 0, 0, 1) | S6 | S7 | S1 | S2 | S9 | S6 | S7 | S1 | 3 | 2 | 3 | 4 | 4 | 3 | 2 | 12 |
| $S6_{k-1} \rightarrow S2_k$ | (1, 1, 0, 0, 1, 1, 0, 0, 1, 1) | | S6 | S8 | S2 | S9 | S6 | S7 | S1 | S2 | 4 | 4 | 4 | 4 | 3 | 2 | 3 | |
| | (1, 1, 0, 0, 0, 1, 1, 0, 0, 1, 1) | S6 | S7 | S1 | S2 | S9 | S6 | S8 | S2 | 3 | 2 | 3 | 4 | 4 | 4 | 4 | 12 |
| $S4_{k-1} \rightarrow S6_k$ | (1, 1, 1, 1, 1, 0, 0, 1, 1, 0, 0) | | S4 | S4 | S5 | S6 | S8 | S2 | S9 | S6 | 8 | 7 | 5 | 4 | 4 | 4 | 4 | |
| | (1, 1, 1, 1, 0, 0, 1, 1, 0, 0) | S4 | S5 | S6 | S8 | S2 | S3 | S5 | S6 | 7 | 5 | 4 | 4 | 5 | 6 | 5 | 12 |
| $S4_{k-1} \rightarrow S5_k$ | (1, 1, 1, 1, 1, 0, 0, 1, 1, 1, 0) | | S4 | S4 | S5 | S6 | S8 | S2 | S3 | S5 | 8 | 7 | 5 | 4 | 4 | 5 | 6 | |
| | (1, 1, 1, 1, 0, 0, 1, 1, 1, 0) | S4 | S5 | S6 | S8 | S2 | S3 | S4 | S5 | 7 | 5 | 4 | 4 | 5 | 7 | 7 | 12 |
| $S4_{k-1} \rightarrow S4_k$ | (1, 1, 1, 1, 1, 0, 0, 1, 1, 1, 1) | | S4 | S4 | S5 | S6 | S8 | S2 | S3 | S4 | 8 | 7 | 5 | 4 | 4 | 5 | 7 | |
| | (1, 1, 1, 1, 0, 0, 1, 1, 1, 1) | S4 | S5 | S6 | S8 | S2 | S3 | S4 | S4 | 7 | 5 | 4 | 4 | 5 | 7 | 8 | 12 |

TABLE 3

| state transition | recording code $(b_{k-i}, \ldots, b_k)$ | k-9 | k-8 | k-7 | k-6 | k-5 | k-4 | k-3 | k-2 | k-1 | k | PR equalization ideal value | | | | | | Euclidean distance between paths |
|---|---|---|---|---|---|---|---|---|---|---|---|---|---|---|---|---|---|---|
| $S0_{k-9} \rightarrow S6_k$ | (0, 0, 0, 0, 1, 1, 0, 0, 1, 1, 0, 0) | S0 | S1 | S2 | S9 | S6 | S8 | S2 | S3 | S5 | S6 | 1 | 3 | 4 | 4 | 4 | 5 | 6 | 5 | |
| | (0, 0, 0, 0, 0, 1, 1, 0, 0, 1, 1, 0, 0) | S0 | S0 | S1 | S2 | S9 | S6 | S8 | S2 | S9 | S6 | 0 | 1 | 3 | 4 | 4 | 4 | 4 | 4 | 12 |
| $S0_{k-9} \rightarrow S5_k$ | (0, 0, 0, 0, 1, 1, 0, 0, 1, 1, 1, 0) | S0 | S1 | S2 | S9 | S6 | S8 | S2 | S3 | S4 | S5 | 1 | 3 | 4 | 4 | 4 | 5 | 7 | 7 | |
| | (0, 0, 0, 0, 0, 1, 1, 0, 0, 1, 1, 0, 1) | S0 | S0 | S1 | S2 | S9 | S6 | S8 | S2 | S3 | S5 | 0 | 1 | 3 | 4 | 4 | 4 | 5 | 6 | 12 |
| $S0_{k-9} \rightarrow S4_k$ | (0, 0, 0, 0, 1, 1, 0, 0, 1, 1, 1, 1) | S0 | S1 | S2 | S9 | S6 | S8 | S2 | S3 | S4 | S4 | 1 | 3 | 4 | 4 | 4 | 5 | 7 | 8 | |
| | (0, 0, 0, 0, 0, 1, 1, 0, 0, 1, 1, 1, 1) | S0 | S0 | S1 | S2 | S9 | S6 | S8 | S2 | S3 | S4 | 0 | 1 | 3 | 4 | 4 | 4 | 5 | 7 | 12 |
| $S2_{k-1} \rightarrow S0_k$ | (0, 0, 1, 1, 0, 0, 1, 1, 0, 0, 0, 0) | S2 | S3 | S5 | S6 | S8 | S2 | S9 | S6 | S7 | S0 | 5 | 6 | 5 | 4 | 4 | 4 | 3 | 1 | |
| | (0, 0, 1, 1, 0, 0, 1, 1, 0, 0, 0, 0) | S2 | S9 | S6 | S8 | S2 | S9 | S6 | S7 | S0 | S0 | 4 | 4 | 4 | 4 | 4 | 3 | 1 | 0 | 12 |
| $S2_{k-1} \rightarrow S1_k$ | (0, 0, 1, 1, 0, 0, 1, 1, 0, 0, 0, 1) | S2 | S3 | S5 | S6 | S8 | S2 | S9 | S6 | S7 | S1 | 5 | 6 | 5 | 4 | 4 | 4 | 3 | 2 | |
| | (0, 0, 1, 1, 0, 0, 1, 1, 0, 0, 0, 1) | S2 | S9 | S6 | S8 | S2 | S9 | S6 | S7 | S0 | S1 | 4 | 4 | 4 | 4 | 4 | 3 | 1 | 1 | 12 |
| $S2_{k-1} \rightarrow S2_k$ | (0, 0, 1, 1, 0, 0, 1, 1, 0, 0, 1, 1) | S2 | S3 | S5 | S6 | S8 | S2 | S9 | S6 | S8 | S2 | 5 | 6 | 5 | 4 | 4 | 4 | 4 | 4 | |
| | (0, 0, 1, 1, 0, 0, 1, 1, 0, 0, 1, 1) | S2 | S9 | S6 | S8 | S2 | S9 | S6 | S7 | S1 | S2 | 4 | 4 | 4 | 4 | 4 | 3 | 2 | 3 | 12 |
| $S3_{k-5} \rightarrow S0_k$ | (0, 1, 1, 1, 1, 0, 0, 1, 1, 0, 0, 0, 0) | S3 | S4 | S5 | S6 | S8 | S2 | S9 | S6 | S7 | S0 | 7 | 7 | 5 | 4 | 4 | 4 | 3 | 1 | |
| | (0, 1, 1, 1, 0, 0, 1, 1, 0, 0, 0, 0) | S3 | S5 | S6 | S8 | S2 | S9 | S6 | S7 | S0 | S0 | 6 | 5 | 4 | 4 | 4 | 3 | 1 | 0 | 12 |
| $S3_{k-5} \rightarrow S1_k$ | (0, 1, 1, 1, 1, 0, 0, 1, 1, 0, 0, 0, 1) | S3 | S4 | S5 | S6 | S8 | S2 | S9 | S6 | S7 | S1 | 7 | 7 | 5 | 4 | 4 | 4 | 3 | 2 | |
| | (0, 1, 1, 1, 0, 0, 1, 1, 0, 0, 0, 1) | S3 | S5 | S6 | S8 | S2 | S9 | S6 | S7 | S0 | S1 | 6 | 5 | 4 | 4 | 4 | 3 | 1 | 1 | 12 |
| $S3_{k-5} \rightarrow S2_k$ | (0, 1, 1, 1, 1, 0, 0, 1, 1, 0, 0, 1, 1) | S3 | S4 | S5 | S6 | S8 | S2 | S9 | S6 | S8 | S2 | 7 | 7 | 5 | 4 | 4 | 4 | 4 | 4 | |
| | (0, 1, 1, 1, 0, 0, 1, 1, 0, 0, 1, 1) | S3 | S5 | S6 | S8 | S2 | S9 | S6 | S7 | S1 | S2 | 6 | 5 | 4 | 4 | 4 | 3 | 2 | 3 | 12 |
| $S3_{k-5} \rightarrow S2_k$ | (1, 0, 0, 0, 1, 1, 0, 0, 1, 1, 0, 0) | S7 | S1 | S2 | S9 | S6 | S8 | S2 | S3 | S5 | S6 | 2 | 3 | 4 | 4 | 4 | 5 | 6 | 5 | |
| | (1, 0, 0, 0, 0, 1, 1, 0, 0, 1, 1, 0, 0) | S7 | S0 | S1 | S2 | S9 | S6 | S8 | S2 | S9 | S6 | 1 | 1 | 3 | 4 | 4 | 4 | 4 | 4 | 12 |
| $S3_{k-5} \rightarrow S2_k$ | (1, 0, 0, 0, 1, 1, 0, 0, 1, 1, 1, 0) | S7 | S1 | S2 | S9 | S6 | S8 | S2 | S3 | S4 | S5 | 2 | 3 | 4 | 4 | 4 | 5 | 7 | 7 | |
| | (1, 0, 0, 0, 0, 1, 1, 0, 0, 1, 1, 1, 0) | S7 | S0 | S1 | S2 | S9 | S6 | S8 | S2 | S3 | S5 | 1 | 1 | 3 | 4 | 4 | 4 | 5 | 6 | 12 |
| $S3_{k-5} \rightarrow S2_k$ | (1, 0, 0, 0, 1, 1, 0, 0, 1, 1, 1, 1) | S7 | S1 | S2 | S9 | S6 | S8 | S2 | S3 | S4 | S4 | 2 | 3 | 4 | 4 | 4 | 5 | 7 | 8 | |
| | (1, 0, 0, 0, 0, 1, 1, 0, 0, 1, 1, 1, 1) | S7 | S0 | S1 | S2 | S9 | S6 | S8 | S2 | S3 | S4 | 1 | 1 | 3 | 4 | 4 | 4 | 5 | 7 | 12 |
| $S6_{k-5} \rightarrow S6_k$ | (1, 1, 0, 0, 1, 1, 0, 0, 1, 1, 0, 0) | S6 | S8 | S2 | S9 | S6 | S8 | S2 | S3 | S5 | S6 | 4 | 4 | 4 | 4 | 4 | 5 | 6 | 5 | |
| | (1, 1, 0, 0, 0, 1, 1, 0, 0, 1, 1, 0, 0) | S6 | S7 | S1 | S2 | S9 | S6 | S8 | S2 | S9 | S6 | 3 | 2 | 3 | 4 | 4 | 4 | 4 | 4 | 12 |

TABLE 3-continued

| state transition | recording code $(b_{k-i}, \ldots, b_k)$ | k-9 | k-8 | k-7 | k-6 | k-5 | k-4 | k-3 | k-2 | k-1 | k | | | | | | | | | PR equalization ideal value | Euclidean distance between paths |
|---|---|---|---|---|---|---|---|---|---|---|---|---|---|---|---|---|---|---|---|---|---|
| $S6_{k-5} \to S5_k$ | (1, 1, 0, 0, 1, 1, 0, 0, 1, 1, 1, 0) | S6 | S8 | S2 | S9 | S6 | S8 | S2 | S3 | S4 | S5 | 4 | 4 | 4 | 4 | 4 | 4 | 5 | 7 | 7 | |
| | (1, 1, 0, 0, 0, 1, 1, 0, 0, 1, 1, 0) | S6 | S7 | S1 | S2 | S9 | S6 | S8 | S2 | S3 | S5 | 3 | 2 | 3 | 4 | 4 | 4 | 5 | 6 | | 12 |
| $S6_{k-5} \to S4_k$ | (1, 1, 0, 0, 1, 1, 0, 0, 1, 1, 1, 1) | S6 | S8 | S2 | S9 | S6 | S8 | S2 | S3 | S4 | S4 | 4 | 4 | 4 | 4 | 4 | 4 | 5 | 7 | 8 | |
| | (1, 1, 0, 0, 0, 1, 1, 0, 0, 1, 1, 1) | S6 | S7 | S1 | S2 | S9 | S6 | S8 | S2 | S3 | S4 | 3 | 2 | 3 | 4 | 4 | 4 | 5 | 7 | | 12 |
| $S4_{k-5} \to S0_k$ | (1, 1, 1, 1, 1, 0, 0, 1, 1, 0, 0, 0, 0) | S4 | S4 | S5 | S6 | S8 | S2 | S9 | S6 | S7 | S0 | 8 | 7 | 5 | 4 | 4 | 4 | 4 | 3 | 1 | |
| | (1, 1, 1, 1, 0, 0, 1, 1, 0, 0, 0, 0) | S4 | S5 | S6 | S8 | S2 | S9 | S6 | S7 | S0 | S0 | 7 | 5 | 4 | 4 | 4 | 4 | 3 | 1 | 0 | 12 |
| $S4_{k-5} \to S1_k$ | (1, 1, 1, 1, 1, 0, 0, 1, 1, 0, 0, 0, 1) | S4 | S4 | S5 | S6 | S8 | S2 | S9 | S6 | S7 | S1 | 8 | 7 | 5 | 4 | 4 | 4 | 4 | 3 | 2 | |
| | (1, 1, 1, 1, 0, 0, 1, 1, 0, 0, 0, 1) | S4 | S5 | S6 | S8 | S2 | S9 | S6 | S7 | S0 | S1 | 7 | 5 | 4 | 4 | 4 | 4 | 3 | 1 | 1 | 12 |
| $S4_{k-5} \to S2_k$ | (1, 1, 1, 1, 1, 0, 0, 1, 1, 0, 0, 1, 1) | S4 | S4 | S5 | S6 | S8 | S2 | S9 | S6 | S8 | S2 | 8 | 7 | 5 | 4 | 4 | 4 | 4 | 4 | 4 | |
| | (1, 1, 1, 1, 0, 0, 1, 1, 0, 0, 1, 1) | S4 | S5 | S6 | S8 | S2 | S9 | S6 | S7 | S1 | S2 | 7 | 5 | 4 | 4 | 4 | 4 | 3 | 2 | 3 | 12 |

Each of these Tables 1 to 3 shows the paths of two state transition patterns from their start state through their merging state by recording codes ($b_{k-i}, \ldots, b_k$), two recording sequences that could have gone through those two state transitions by (k−9, ..., k), two ideal read signal waveforms (PR equalization ideal values) that could have gone through those two state transitions, and a Euclidean distance between those two ideal read signal waveforms (i.e., a Euclidean distance between the two paths).

Specifically, Table 1 shows 18 different pairs of state transition patterns, each of which can take two different paths and has a Euclidean distance of 14 between themselves. These patterns correspond to the boundaries between marks and spaces on an optical disc medium (i.e., edge portions of a waveform). In other words, these patterns represent one-bit shift errors at those edges. For example, a state transition path leading from S0 (k−5) to S6 (k) according to the state transition rules shown in FIG. 3 will be described. In that case, one path with a recording sequence "0, 0, 0, 0, 1, 1, 1, 0, 0" is detected. If zeros of the read data are replaced with spaces and ones are replaced with marks, this recording sequence corresponds to a combination of a space with a length of 4T or more, a 3T mark, and a space with a length of 2T or more. The ideal PR equalization waveform of that path is shown as Path A waveform in FIG. 4.

Figure 4:
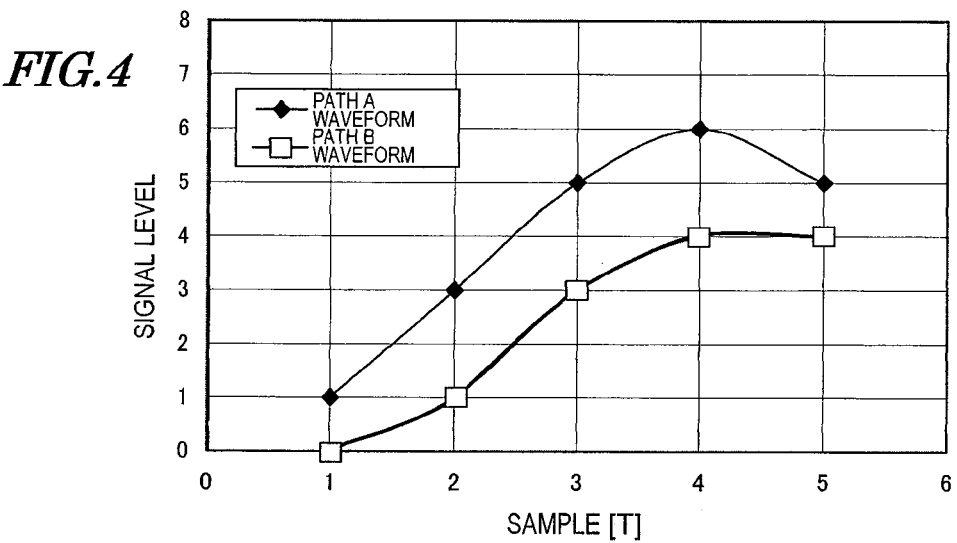
FIG. 4 shows an exemplary ideal PR equalization waveform for the state transition patterns shown in Table 1 in a preferred embodiment of the present invention.
Figure 5:
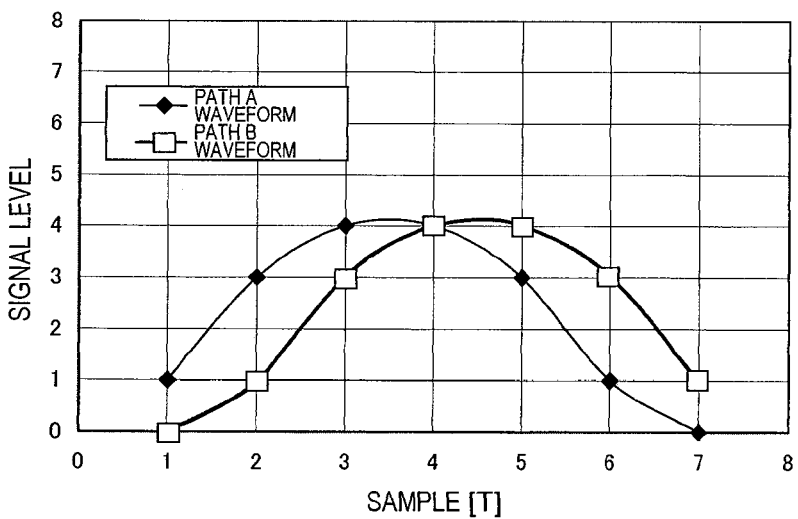
FIG. 5 shows an exemplary ideal PR equalization waveform for the state transition patterns shown in Table 2 in a preferred embodiment of the present invention.
Figure 6:
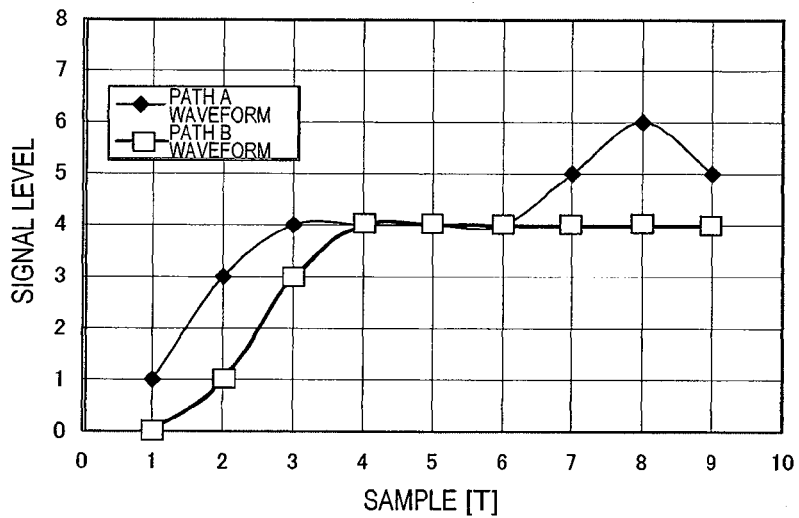
FIG. 6 shows an exemplary ideal PR equalization waveform for the state transition patterns shown in Table 3 in a preferred embodiment of the present invention.

FIG. 4 shows examples of the ideal PR equalization waveforms shown in Table 1. FIG. 5 shows examples of the ideal PR equalization waveforms shown in Table 2. And FIG. 6 shows examples of the ideal PR equalization waveforms shown in Table 3. In FIGS. 4, 5 and 6, the abscissa represents the sampling time (in this case, sampling is supposed to be carried out every point in time of the recording sequence) and the ordinate represents the read signal level.

As described above, PR 12221 ML has nine ideal read signal levels from Level 0 through Level 8. The other one of the two state transition paths leading from S0 (k−5) to S6 (k) according to the state transition rules shown in FIG. 3 has a recording sequence "0, 0, 0, 0, 0, 1, 1, 0, 0". If zeros of the read data are replaced with spaces and ones are replaced with marks, this recording sequence corresponds to a combination of a space with a length of 5T or more, a 2T mark, and a space with a length of 2T or more. The ideal PR equalization waveform of that path is shown as Path B waveform in FIG. 4.

The patterns with a Euclidean distance of 14 shown in Table 1 are characterized by always including a single piece of edge information. By taking advantage of this feature, the best edge adjustment can be done for the PRML method.

Table 2 shows 18 different pairs of state transition patterns, each of which has a Euclidean distance of 12 between themselves. These patterns correspond to shift errors of a 2T mark or a 2T space and represent two-bit error patterns. For example, a state transition path leading from S0 (k−7) to S0 (k) according to the state transition rules shown in FIG. 3 will be described. In that case, one path with a recording sequence "0, 0, 0, 0, 1, 1, 0, 0, 0, 0, 0" is detected. If zeros of the read data are replaced with spaces and ones are replaced with marks, this recording sequence corresponds to a combination of a space with a length of 4T or more, a 2T mark, and a space with a length of 5T or more. The ideal PR equalization waveform of that path is shown as Path A waveform in FIG. 5.

The other one of the two state transition paths has a recording sequence "0, 0, 0, 0, 0, 1, 1, 0, 0, 0, 0". If zeros of the read data are replaced with spaces and ones are replaced with marks, this recording sequence corresponds to a combination of a space with a length of 5T or more, a 2T mark, and a space with a length of 4T or more. The ideal PR equalization waveform of that path is shown as Path B waveform in FIG. 5.

The patterns with a Euclidean distance of 12 shown in Table 2 are characterized by always including two pieces of leading and trailing edge information with a length of 2T.

Table 3 shows 18 different pairs of state transition patterns, each of which has a Euclidean distance of 12 between themselves. These patterns correspond to portions where 2T marks and 2T spaces appear consecutively and represent three-bit error patterns. For example, a state transition path leading from S0 (k−9) to S6 (k) according to the state transition rules shown in FIG. 3 will be described. In that case, one path with a recording sequence "0, 0, 0, 0, 1, 1, 0, 0, 1, 1, 1, 0, 0" is detected. If zeros of the read data are replaced with spaces and ones are replaced with marks, this recording sequence corresponds to a combination of a space with a length of 4T or more, a 2T mark, a 2T space, a 3T mark, and a space with a length of 2T or more. The ideal PR equalization waveform of that path is shown as Path A waveform in FIG. 6.

The other one of the two state transition paths has a recording sequence "0, 0, 0, 0, 0, 1, 1, 0, 0, 1, 1, 0, 0". If zeros of the read data are replaced with spaces and ones are replaced with marks, this recording sequence corresponds to a combination of a space with a length of 5T or more, a 2T mark, a 2T space, a 2T mark and a space with a length of 2T or more. The ideal PR equalization waveform of that path is shown as Path B waveform in FIG. 6.

The patterns with a Euclidean distance of 12 shown in Table 3 are characterized by always including at least three pieces of edge information.

To adjust the position of the leading or trailing edge of a recording mark, the magnitude and direction of edge shift need to be detected for every mark and space combination.

That is why if the PR 12221 ML method is adopted, the state transition patterns with a Euclidean distance of 14 shown in Table 1 may be used.

The best position of the leading or trailing edge of a recording mark changes according to the characteristics of the PRML method adopted. As far as the PR 12221 ML is concerned, the leading edge portion of a 2T mark that follows a space with a length of 5 T or more has an ideal waveform such as Path B waveform shown in FIG. 4, in which read signal level 4 is the center of all nine levels. This means that the signal amplitude of a 2T mark ideally becomes equal to zero. That is to say, if the leading edge of a 2T mark is adjusted so that the 2T mark has such signal amplitude, the recording mark will shrink.

To compare the characteristics of multiple PRML methods, PRML 1221 ML will be described as another exemplary PRML method. Unlike PR 12221 ML, PR 1221 ML has a non-treble-boosted property. By combining PR 1221 ML and RLL (1, 7) with each other, the number of states in the decoding section is limited to six, the number of state transition paths thereof becomes ten, and the number of read signal levels becomes seven.

Figure 7:
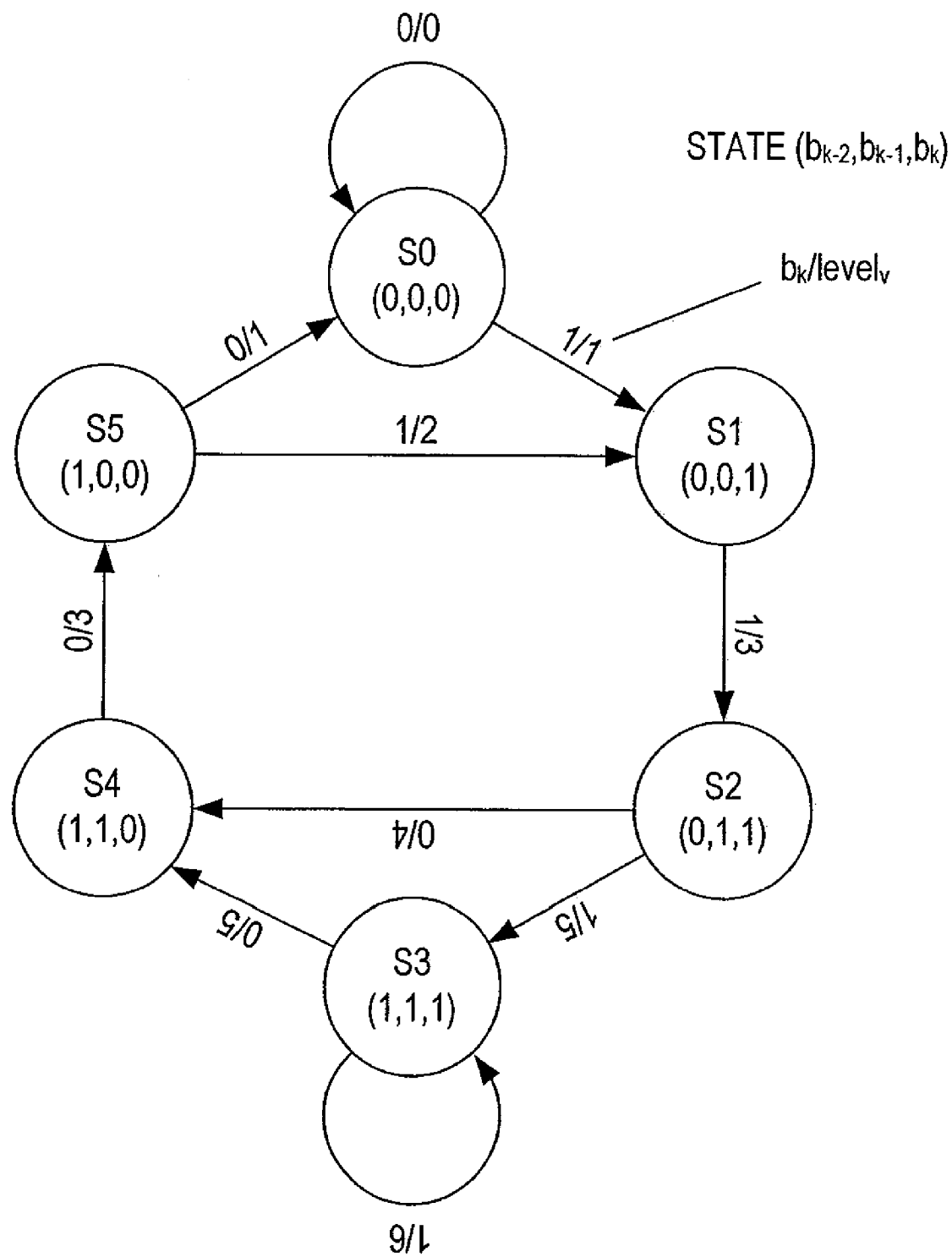
FIG. 7 shows state transition rules defined by a combination of RLL (1, 7) recording code and PR (1, 2, 2, 1) equalization in a preferred embodiment of the present invention.
Figure 8:
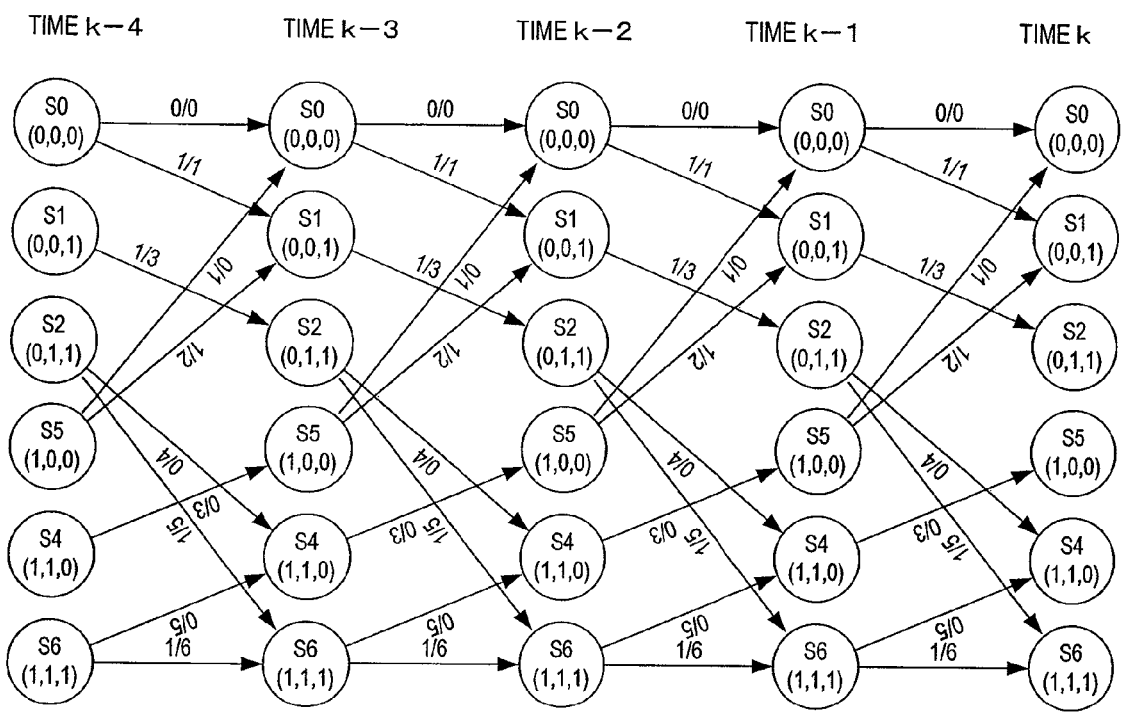
FIG. 8 is a trellis diagram corresponding to the state transition rules shown in FIG. 7.

FIG. 7 is a state transition diagram showing state transition rules to be determined by the combination of RLL (1, 7) and PR 1221 ML. FIG. 8 is a trellis diagram representing the state transition rules shown in FIG. 7.

As shown in FIG. 7, six states are represented by identifying, at a certain point in time, a state S (0, 0, 0) by S0, a state S (0, 0, 1) by S1, a state S (0, 1, 1) by S2, a state S (1, 1, 1) by S3, a state S (1, 1, 0) by S4, and a state S (1, 0, 0) by S5, respectively, where zero or one in the parentheses represents a signal sequence on the time axis and shows what state could be produced as a result of the next state transition from the current state. Also, if this state transition diagram is extended along the time axis, the trellis diagram shown in FIG. 8 can be obtained.

In the state transitions of PR 1221 ML shown in FIG. 8, there are an infinite number of state transition patterns (i.e., combinations of states) that can take two state transition paths in making a transition from a particular state at a certain point in time into another particular state at the next point in time. If we pay attention to only patterns that are particularly likely to produce errors in a certain time range, the state transition patterns of PR 1221 ML may be summarized as patterns with a Euclidean distance of as shown in the following Table 4:

Table 4 shows the paths of two state transition patterns from their start state through their merging state by recording codes $(b_{k-i}, \ldots, b_k)$, two recording sequences that could have gone through those two state transitions by $(K-10, \ldots, K)$, two ideal read signal waveforms (PR equalization ideal values) that could have gone through those two state transitions, and a Euclidean distance between those two ideal read signal waveforms (i.e., a Euclidean distance between the two paths).

According to the PR 1221 ML method, patterns that always include a single piece of edge information are the patterns with a Euclidean distance of 10 shown in Table 4. Also, according to the PR 1221 ML method, the ideal waveform of the leading edge portion of a 2T mark that follows a space with a length of 5T or more will be the Path B waveform shown in FIG. 9, which is one of two waveforms that could have made a transition from the state S0 (K−4) to the state S4 (K).

Figure 9:
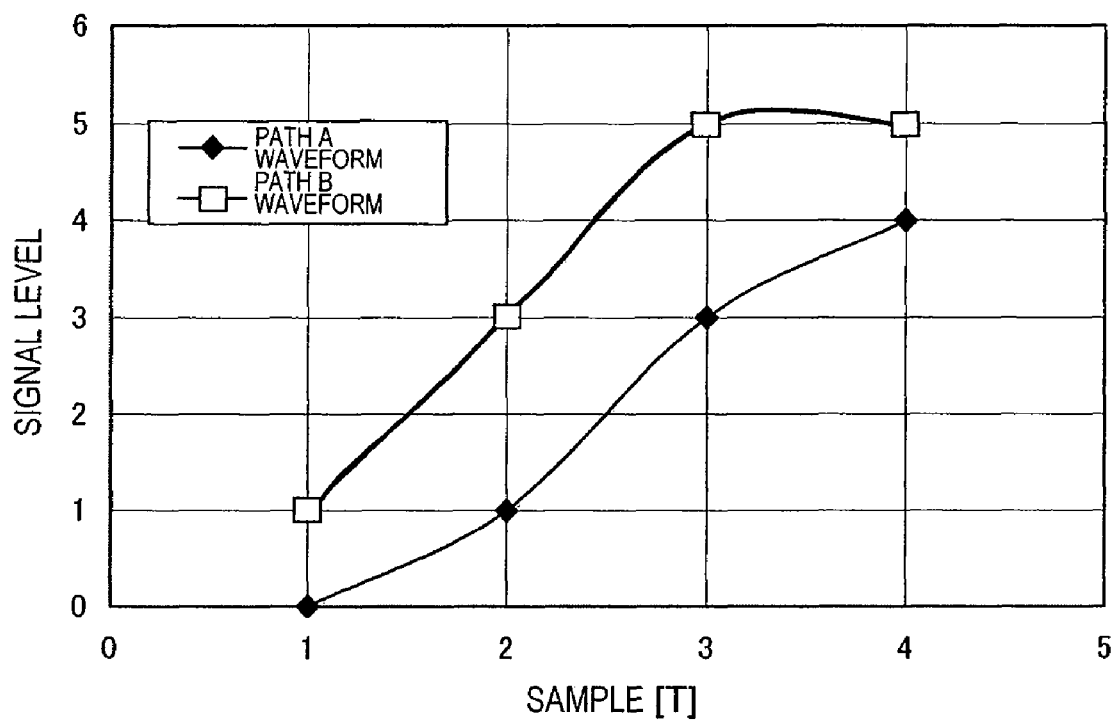
FIG. 9 shows an exemplary ideal PR equalization waveform for the state transition patterns shown in Table 4 in a preferred embodiment of the present invention.

FIG. 9 shows examples of the ideal PR equalization waveforms shown in Table 4. Since the PR 1221 ML has an ideal read signal level of seven, the center of the read signal levels shown in FIG. 9 is Level 3. As the signal amplitude of a 2T mark of the PR 1221 ML shown in FIG. 9 has Level 4, the leading edge of the 2T mark can be adjusted such that the signal amplitude of the 2T mark becomes greater than in the PR 12221 ML. Not just the leading edge of the 2T mark but also the trailing edge of the 2T mark and the leading and trailing edges of a mark with a length of 3T or more may be adjusted in a similar manner. Attention should be paid to the fact that an adjusted recording mark will have a different shape according to the characteristic of the PRML method as described above.

Hereinafter, it will be described what calculations need to be done to evaluate a read signal and to detect edge shifting. A signal evaluation index M for evaluating a read signal can be calculated by the following Equations (1), (2) and (3):

$$D = |Pa - Pb| - d^2 \tag{1}$$

$$\sigma = \sqrt{\overline{D^2} - (\overline{D})^2} \tag{2}$$

$$M = \frac{\sigma}{2 \cdot d^2} \tag{3}$$

TABLE 4

| state transition | recording code $(b_{k-i}, \ldots, b_k)$ | K−10 | K−9 | K−8 | K−7 | K−6 | K−5 | K−4 | K−3 | K−2 | K−1 | K | PR equalization ideal value | | | | Euclidean distance between paths |
|---|---|---|---|---|---|---|---|---|---|---|---|---|---|---|---|---|---|
| S2(K−4)→S0(K) | (0, 1, 1, 0, 0, 0, 0) | | | | | | | S2 | S4 | S5 | S0 | S0 | 4 | 3 | 1 | 0 | |
|  | (0, 1, 1, 1, 0, 0, 0) | | | | | | | S2 | S3 | S4 | S5 | S0 | 5 | 5 | 3 | 1 | 10 |
| S3(K−4)→S0(K) | (1, 1, 1, 0, 0, 0, 0) | | | | | | | S3 | S4 | S5 | S0 | S0 | 5 | 3 | 1 | 0 | |
|  | (1, 1, 1, 1, 0, 0, 0) | | | | | | | S3 | S3 | S4 | S5 | S0 | 6 | 5 | 3 | 1 | 10 |
| S2(K−4)→S1(K) | (0, 1, 1, 0, 0, 0, 1) | | | | | | | S2 | S4 | S5 | S0 | S1 | 4 | 3 | 1 | 1 | |
|  | (0, 1, 1, 1, 0, 0, 1) | | | | | | | S2 | S3 | S4 | S5 | S1 | 5 | 5 | 3 | 2 | 10 |
| S3(K−4)→S1(K) | (1, 1, 1, 0, 0, 0, 1) | | | | | | | S3 | S4 | S5 | S0 | S1 | 5 | 3 | 1 | 1 | |
|  | (1, 1, 1, 1, 0, 0, 1) | | | | | | | S3 | S3 | S4 | S5 | S1 | 6 | 5 | 3 | 2 | 10 |
| S0(K−4)→S4(K) | (0, 0, 0, 0, 1, 1, 0) | | | | | | | S0 | S0 | S1 | S2 | S4 | 0 | 1 | 3 | 4 | |
|  | (0, 0, 0, 1, 1, 1, 0) | | | | | | | S0 | S1 | S2 | S3 | S4 | 1 | 3 | 5 | 5 | 10 |
| S5(K−4)→S4(K) | (1, 0, 0, 0, 1, 1, 0) | | | | | | | S5 | S0 | S1 | S2 | S4 | 1 | 1 | 3 | 4 | |
|  | (1, 0, 0, 1, 1, 1, 0) | | | | | | | S5 | S1 | S2 | S3 | S4 | 2 | 3 | 5 | 5 | 10 |
| S0(K−4)→S3(K) | (0, 0, 0, 0, 1, 1, 1) | | | | | | | S0 | S0 | S1 | S2 | S3 | 0 | 1 | 3 | 5 | |
|  | (0, 0, 0, 1, 1, 1, 1) | | | | | | | S0 | S1 | S2 | S3 | S3 | 1 | 3 | 5 | 6 | 10 |
| S5(K−4)→S3(K) | (1, 0, 0, 0, 1, 1, 1) | | | | | | | S5 | S0 | S1 | S2 | S5 | 1 | 1 | 3 | 5 | |
|  | (1, 0, 0, 1, 1, 1, 1) | | | | | | | S5 | S1 | S2 | S3 | S5 | 2 | 3 | 5 | 6 | 10 |

This is an index that is similar to jitter and correlated to the read performance of PRML. Also, if M is calculated by Equation (3) with the average in Equation (2) supposed to be zero, then M obtained by Equation (3) can be said as an index calculated by normalizing the variance of Equation (1) with the square of the Euclidean distance. As this index is described in Patent Document No. 1, a detailed description thereof will be omitted herein. The entire disclosure of Patent Document No. 1 (Japanese Patent Application Laid-Open Publication No. 2003-141823) is hereby incorporated by reference.

The following Table 5 shows specifically how calculations given by Equation (1) are made according to the PR 1221 ML method:

TABLE 5

Pa − Pb according to PR 1221 ML where $d^2 = 10$

| State transition | $b_k b_{k-1} b_{k-2}$ $b_{k-3} b_{k-4} b_{k-5}$ $b_{k-6}$ | Pa − Pb |
|---|---|---|
| $S0_{k-4} \rightarrow S4_k$ | 000x110 | $(y_{k-3} - T_{-3})^2 + (y_{k-2} - T_{-2})^2 + (y_{k-1} - T_0)^2 + (y_k - T_1)^2 - \{(y_{k-3} - T_{-2})^2 + (y_{k-2} - T_0)^2 + (y_{k-1} - T_2)^2 + (y_k - T_2)^2\}$ |
| $S0_{k-4} \rightarrow S3_k$ | 000x111 | $(y_{k-3} - T_{-3})^2 + (y_{k-2} - T_{-2})^2 + (y_{k-1} - T_0)^2 + (y_k - T_2)^2 - \{(y_{k-3} - T_{-2})^2 + (y_{k-2} - T_0)^2 + (y_{k-1} - T_2)^2 + (y_k - T_3)^2\}$ |
| $S2_{k-4} \rightarrow S0_k$ | 011x000 | $(y_{k-3} - T_1)^2 + (y_{k-2} - T_0)^2 + (y_{k-1} - T_{-2})^2 + (y_k - T_{-3})^2 - \{(y_{k-3} - T_2)^2 + (y_{k-2} - T_2)^2 + (y_{k-1} - T_0)^2 + (y_k - T_{-2})^2\}$ |
| $S2_{k-4} \rightarrow S1_k$ | 011x001 | $(y_{k-3} - T_1)^2 + (y_{k-2} - T_0)^2 + (y_{k-1} - T_{-2})^2 + (y_k - T_{-2})^2 - \{(y_{k-3} - T_2)^2 + (y_{k-2} - T_2)^2 + (y_{k-1} - T_0)^2 + (y_k - T_{-1})^2\}$ |
| $S5_{k-4} \rightarrow S4_k$ | 100x110 | $(y_{k-3} - T_{-2})^2 + (y_{k-2} - T_{-2})^2 + (y_{k-1} - T_0)^2 + (y_k - T_1)^2 - \{(y_{k-3} - T_{-1})^2 + (y_{k-2} - T_0)^2 + (y_{k-1} - T_2)^2 + (y_k - T_2)^2\}$ |
| $S5_{k-4} \rightarrow S3_k$ | 100x111 | $(y_{k-3} - T_{-2})^2 + (y_{k-2} - T_{-2})^2 + (y_{k-1} - T_0)^2 + (y_k - T_2)^2 - \{(y_{k-3} - T_{-1})^2 + (y_{k-2} - T_0)^2 + (y_{k-1} - T_2)^2 + (y_k - T_3)^2\}$ |
| $S3_{k-4} \rightarrow S0_k$ | 111x000 | $(y_{k-3} - T_2)^2 + (y_{k-2} - T_0)^2 + (y_{k-1} - T_{-2})^2 + (y_k - T_{-3})^2 - \{(y_{k-3} - T_3)^2 + (y_{k-2} - T_2)^2 + (y_{k-1} - T_0)^2 + (y_k - T_{-2})^2\}$ |
| $S3_{k-4} \rightarrow S1_k$ | 111x001 | $(y_{k-3} - T_2)^2 + (y_{k-2} - T_0)^2 + (y_{k-1} - T_{-2})^2 + (y_k - T_{-2})^2 - \{(y_{k-3} - T_3)^2 + (y_{k-2} - T_2)^2 + (y_{k-1} - T_0)^2 + (y_k - T_{-1})^2\}$ |

In Table 5, $y_{k-3}$ through $y_k$ are PR equalization waveform (maximum likelihood decoding section input waveform) sequences to be described later, $T_{-3}$ through $T_3$ are PR equalization ideal value sequences (which can be in the range of 0 to 6) shown in Table 4, and the Euclidean distance is 10 ($d^2=10$).

The patterns shown in Tables 4 and 5 correspond to the leading and trailing edge portions. That is why if the calculations given by Equation (1) are made with the read digital signals classified for every possible combination of mark and space lengths, then the magnitude and direction of edge shifting can be calculated for every possible combination. Likewise, by applying the same idea to the calculations to be done according to the PR 12221 ML shown in Table 1, the magnitude and direction of edge shifting can be calculated for every possible combination of mark and space lengths.

Embodiment 1

Hereinafter, a preferred embodiment of an optical disc drive according to the present invention will be described with reference to FIG. 1, which illustrates an optical disc drive 100 as a first specific preferred embodiment of the present invention.

The information recording medium 1 shown in FIG. 1 is used to read and write information optically from/on it and may be an optical disc medium, for example. The optical disc drive 100 is a read/write system for reading and writing information from/on the given information recording medium 1.

The optical disc drive 100 includes a read section 101, a write condition modifying section 102 and a write section 103.

The read section 101 includes an optical head 2, a preamplifier section 3, an automatic gain control (AGC) section 4, a waveform equalizing section 5, an A/D converting section 6 and a PLL section 7. The read section 101 generates a digital signal based on an analog signal representing information that has been read from the information recording medium.

The write condition modifying section 102 includes a PRML section 104, a signal evaluation index calculating section 10, and a modifying section 105. The PRML section 104 includes a variable PR equalizing section 8 and a variable maximum likelihood decoding section 9. The modifying section 105 includes an edge shifting detecting section 11 and an optical disc controller section 12. The write condition modifying section 102 may be implemented as a semiconductor chip, for example.

The write section 103 includes a pattern generating section 13, a write compensating section 14 and a laser driver section 15.

The optical head section 2 converges a laser beam 2a, which has been transmitted through an objective lens 2b, on the recording layer of the information recording medium 1 and receives the light reflected from the medium 1, thereby generating an analog read signal representing information that is stored on the information recording medium 1. The objective lens 2b preferably has a numerical aperture of 0.7 to 0.9, more preferably 0.85. The laser beam 2a preferably has a wavelength of 410 nm or less, more preferably 405 nm.

The preamplifier section 3 amplifies the analog read signal with a predetermined gain and outputs the amplified signal to the AGC section 4. In response, the AGC section 4 further amplifies the read signal with a preset target gain such that the read signal will have a constant level when output from the A/D converting section 6 and then passes the amplified signal to the waveform equalizing section 5.

The waveform equalizing section 5 functions as a filter for amplifying the high frequency portion of the read signal, and outputs such a read signal with an amplified high frequency portion to the A/D converting section 6.

The PLL circuit 7 generates a read clock signal, which is synchronized with the waveform-equalized read signal, and outputs it to the A/D converting section 6.

In response to the read clock signal supplied from the PLL circuit 7, the A/D converting section 6 samples the read signal, converts the analog read signal into a digital read signal and outputs it to the variable PR equalizing section 8, the PLL section 7 and the AGC section 4.

The variable PR equalizing section 8 has the ability to change its filter characteristics into any one of multiple PR characteristics. The variable PR equalizing section 8 has such a frequency characteristic that was defined such that the read/write system has a frequency characteristic expected by the variable maximum likelihood decoding section 9 (such as PR (1, 2, 2, 1) equalization characteristic or PR (1, 2, 2, 2, 1) equalization characteristic). Specifically, the variable PR equalizing section 8 carries out PR equalization processing on the read signal by reducing the radio frequency noise thereof and by intentionally producing intersymbol interference, and then outputs the processed read signal to the variable maximum likelihood decoding section 9.

A method for changing the characteristics of the variable PR equalizing section 8 will be described. In a situation where PR (a, b, b, a) equalization characteristic is adopted, b/a=A is supposed to be satisfied and A1 and A2 (that is smaller than A1) are supposed to be used as A. In this manner, classes can be changed from a treble-boosted one using A1 into a non-treble-boosted one using A2.

According to another method, the characteristics are changed from a PR equalization characteristic that emphasizes 2T into a different PR equalization characteristic that does not emphasize 2T. Specifically, the variable PR equalizing section 8 changes the PR (a, b, b, a) equalization characteristic into a PR (x, y, z, y, x) equalization characteristic. At the same time, b/a=A and ((y+z)/2)/((x+y)/2)=B are supposed to be satisfied and the classes are changed from a treble-boosted one into a non-treble-boosted one using coefficients x, y and z that satisfy A>B. For example, by changing the characteristics from PR (1, 2, 2, 1) equalization into PR (1, 2, 2, 2, 1) equalization and increasing the order of the filter, the characteristics can be changed into a PR equalization characteristic that does not emphasize 2T.

The variable maximum likelihood decoding section 9 can change the types of maximum likelihood decoding processing when the PR characteristics of the variable PR equalizing section 8 are changed. For example, when A1 is changed into A2 according to the former method, the threshold values for use in decoding processing are changed into the best value for A2. According to the latter method, on the other hand, the threshold values for use in the decoding processing and the decoding rules are changed into best ones.

The variable maximum likelihood decoding section 9 may be a Viterbi decoder, for example, and uses a maximum likelihood decoding technique, which estimates the most likely sequence by the coding rule that has been added intentionally according to the type of the partial response, to decode the read signal that has been subjected to the PR equalization by the variable PR equalizing section 8 and output binarized data. This binarized data is output as demodulated binarized signal to a circuit on the next stage (not shown) and then subjected to a predetermined type of processing, thereby reading the information that is stored on the information recording medium 1.

The signal evaluation index calculating section 10 receives the waveform-shaped digital read signal from the variable PR equalizing section 8 and the binarized signal from the variable maximum likelihood decoding section 9. Specifically, the signal evaluation index calculating section 10 determines the state transition by the binarized signal and carries out calculations represented by Equation (1) and showing the reliability of the decoding result based on the decision result and the branch metric. Furthermore, the signal evaluation index calculating section 10 classifies the results of calculations according to the binarized signal for every possible combination of mark and space lengths. For example, the signal evaluation index calculating section 10 generates a pulse signal for each of the eighteen patterns shown in Table 1 or each of the eight patterns shown in Table 4 (i.e., for every pattern at the leading or trailing edge of a recording mark) and outputs it to the edge shifting detecting section 11.

The edge shifting detecting section 11 adds together those results of calculations on a pattern-by-pattern basis to find how much a parameter, which is used to adjust the edge position of a recording mark, has shifted from its best value (which will be referred to herein as "edge shifting").

The optical disc controller section 12 changes write parameters (e.g., waveforms of write signals) that have been determined necessary according to the magnitude of pattern-by-pattern edge shifting. Also, the optical disc controller section 12 outputs a control signal to change the PRML characteristics to the variable PR equalizing section 8, the variable maximum likelihood decoding section 9 and the signal evaluation index calculating section 10. When the PRML characteristics are changed, the variable PR equalizing section 8, the variable maximum likelihood decoding section 9 and the signal evaluation index calculating section 10 may perform different types of processing or calculations. That is why the parameters of the variable PR equalizing section 8, the variable maximum likelihood decoding section 9 and the signal evaluation index calculating section 10 are changed synchronously with each other by the optical disc controller section 12.

The pattern generating section 13 generates and outputs a write pattern to adjust the edges of a recording mark. The write compensating section 14 generates a laser radiation waveform pattern based on the write parameters supplied from the optical disc controller section 12 and the write pattern. And the laser driver section 15 controls the laser emission operation of the optical head section 2 following the laser radiation waveform pattern generated.

Hereinafter, it will be described in further detail how this optical disc drive 100 operates. To adjust the write parameters, the optical disc controller section 12 instructs the write compensating section 14 to perform test write operations using initial values of the write parameters that are stored as control data on the optical disc medium and then using values that are several steps away from those initial values. The optical disc controller section 12 outputs a few patterns of write parameters to the write compensating section 14. Meanwhile, the pattern generating section 13 outputs a write pattern to adjust the edges of a recording mark. In response, the write compensating section 14 generates a laser radiation waveform pattern based on the write parameters supplied from the optical disc controller section 12 and the write pattern. And the laser driver section 15 controls the laser emission operation of the optical head section 2 following the laser radiation waveform pattern generated. By performing this series of processing steps, a test write operation can be done to adjust the edges of a recording mark. Next, data is read from the area on which the test write operation has been performed.

The optical disc controller section 12 instructs the variable PR equalizing section 8, the variable maximum likelihood decoding section 9 and the signal evaluation index calculating section 10 to follow the PR 1221 ML characteristic. In response, the variable PR equalizing section 8 shapes the waveform such that the output waveform will have the PR 1221 characteristic. The variable maximum likelihood decoding section 9 changes the threshold values for use to make branch metric calculations into one for the PR 1221 ML, and also limits the number of states to six and the number of transition paths of the branch metric to ten.

To figure out the read signal evaluation index M for the PR 1221 ML, the signal evaluation index calculating section 10 makes the calculations represented by Equations (1) to (3) following the state transition paths shown in Table 4, and outputs results of the calculations to the edge shifting detecting section 11. In response, the edge shifting detecting section 11 adds together the magnitudes of edge shifts for all possible combinations of mark and space lengths and outputs the sum to the optical disc controller section 12. And the optical disc controller section 12 finds the best values of the parameters to adjust the edges of a recording mark based on the sum of the magnitudes of edge shifts, and outputs those best parameters to the write compensating section 14. By performing this series of processing steps, the best values of parameters to adjust the edges of a recording mark can be obtained.

On the other hand, when user data or any other type of data is read, the optical disc controller section 12 instructs the variable PR equalizing section 8 and the variable maximum likelihood decoding section 9 to follow the PR 12221 ML characteristic. In response, the variable PR equalizing section 8 shapes the waveform such that the output waveform will have the PR 12221 characteristic. The variable maximum likelihood decoding section 9 changes the threshold values for use to make branch metric calculations into one for the PR 12221 ML, and also limits the number of states to ten and the number of transition paths of the branch metric to sixteen. Also, the variable maximum likelihood decoding section 9 decodes the read signal and outputs binarized data. This binarized data is output as demodulated binarized signal to a circuit on the next stage (not shown) and then subjected to a predetermined type of processing, thereby reading the information (such as video, audio or characters) stored on the information recording medium 1.

Also, when a read operation is performed to rate the storage quality of a recording area, the optical disc controller section 12 instructs the variable PR equalizing section 8, the variable maximum likelihood decoding section 9 and the signal evaluation index calculating section 10 to follow the PR 12221 ML characteristic. In response, the variable PR equalizing section 8 shapes the waveform such that the output waveform will have the PR 12221 characteristic. The variable maximum likelihood decoding section 9 changes the threshold values for use to make branch metric calculations into one for the PR 12221 ML, and also limits the number of states to ten and the number of transition paths of the branch metric to sixteen.

To figure out the read signal evaluation index M for the PR 12221 ML, the signal evaluation index calculating section 10 makes the calculations represented by Equations (1) to (3) following the state transition paths shown in Tables 1 to 3, and outputs results of the calculations to the edge shifting detecting section 11. In response, the edge shifting detecting section 11 adds together the signal evaluation indices M for every transition path shown in Tables 1 to 3, and outputs the sum to the optical disc controller section 12. And the optical disc controller section 12 can rate the storage quality of the given recording area by the sum of the signal evaluation indices M. In this case, the edge shifting detecting section 11 may be used not just as a block for calculating the sum of the magnitudes of edge shifts but also as a block for calculating the sum of the signal evaluation indices M.

As described above, when the write parameters need to be adjusted (particularly when parameters concerning edge positions on the boundary between the marks and spaces need to be adjusted), the write parameters are adjusted by selecting such a PRML characteristic that would achieve the best write performance, thereby optimizing the storage quality of the medium. As a result, the system can maintain a sufficient write margin easily.

If the edge positions are adjusted by PR 12221 ML, the size of 2T marks or 3T marks may be adjusted into a smaller one. As a result, the write margin could decrease (which means a variation in recording power or a shrinkage of the tolerable strategy error range) and the PLL for generating a sync signal based on a read signal might lose its stability of operation. Also, particularly if short marks such as 2T marks or 3T marks were recorded so as to further reduce their size, the jitter as a signal evaluation index could deteriorate so significantly that it would be difficult to read such data for a device that adopts a non-PRML decision method (such as a level determination method) for its read system. Consequently, that might raise an issue in terms of optical disc medium compatibility. Thus, if the PR 1221 ML method is adopted to adjust the edges, the lengths (or positions) of the 2T marks and 3T marks can be adjusted into an appropriate mark length. As a result, the write operation can be performed with the write margin made full use of, the PLL for generating a sync signal based on the read signal can recover its stability, and the optical disc medium can maintain its compatibility constantly.

As described above, when information needs to be read by accessing the user area, the read operation may be performed by selecting such a PRML characteristic that would achieve the best read performance. In that case, the system's read margin can be maximized.

As also described above, when a read operation needs to be performed to rate the storage quality of a given recording area, the system's read performance can be recognized by calculating a signal evaluation index M for the PRML characteristic to adopt for the read operation. And by confirming the system's margin with this index M, it can be determined whether or not the optical disc drive can support the storage state or write performance of the given medium. This decision can be made based on a variation in the value of the signal evaluation index M of the area in which data has been tentatively written with the recording power varied or on the value of the signal evaluation index M of the area in which data has been written with the best write parameters.

Optionally, servo parameters such as a focus position parameter, a spherical aberration position parameter, and a tracking position parameter may be optimized using the signal evaluation index M. If the value of the index M preferably varies sensitively responsive to a variation in any of those parameters, then adjustments may be made not by the PRML characteristic that is usually adopted for reading but by a PRML characteristic that would achieve an inferior read performance. For example, according to a method in which a parameter is changed and a trough of the variation in evaluation index M is found to extract the best parameter value, the trough can be located with little parameter variation. That is why a servo failure that could be caused if the parameter were changed significantly is avoidable and the system can get stabilized.

Figure 10:
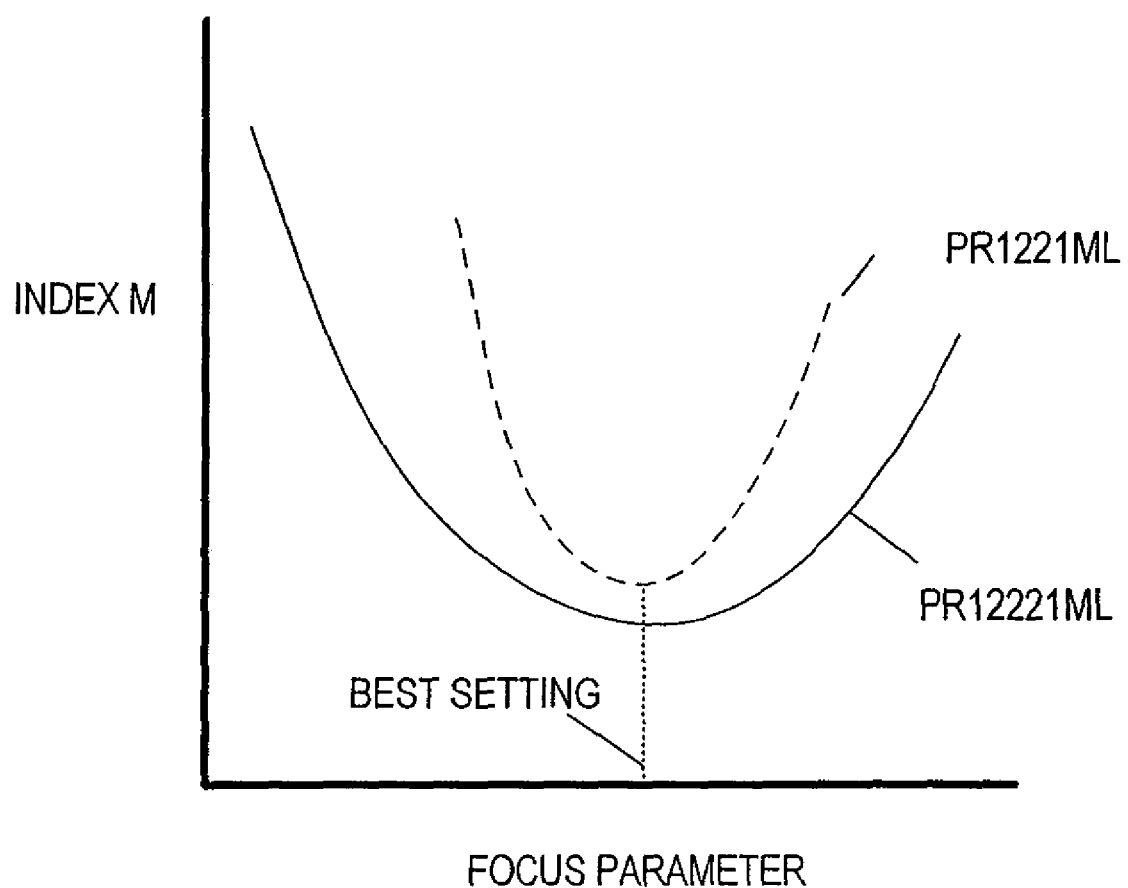
FIG. 10 shows how the index M of each PRML characteristic changes with a focus parameter during a focus position adjustment in a preferred embodiment of the present invention.

FIG. 10 shows how the index M of each PRML characteristic changes with the focus parameter. If higher read performance would be achieved by the PR 12221 ML than by the PR 1221 ML, then the trough of the index M can be detected more accurately in a range with little parameter variation by adjusting the focus parameter with the index M for the PR 1221 ML.

Figure 11:
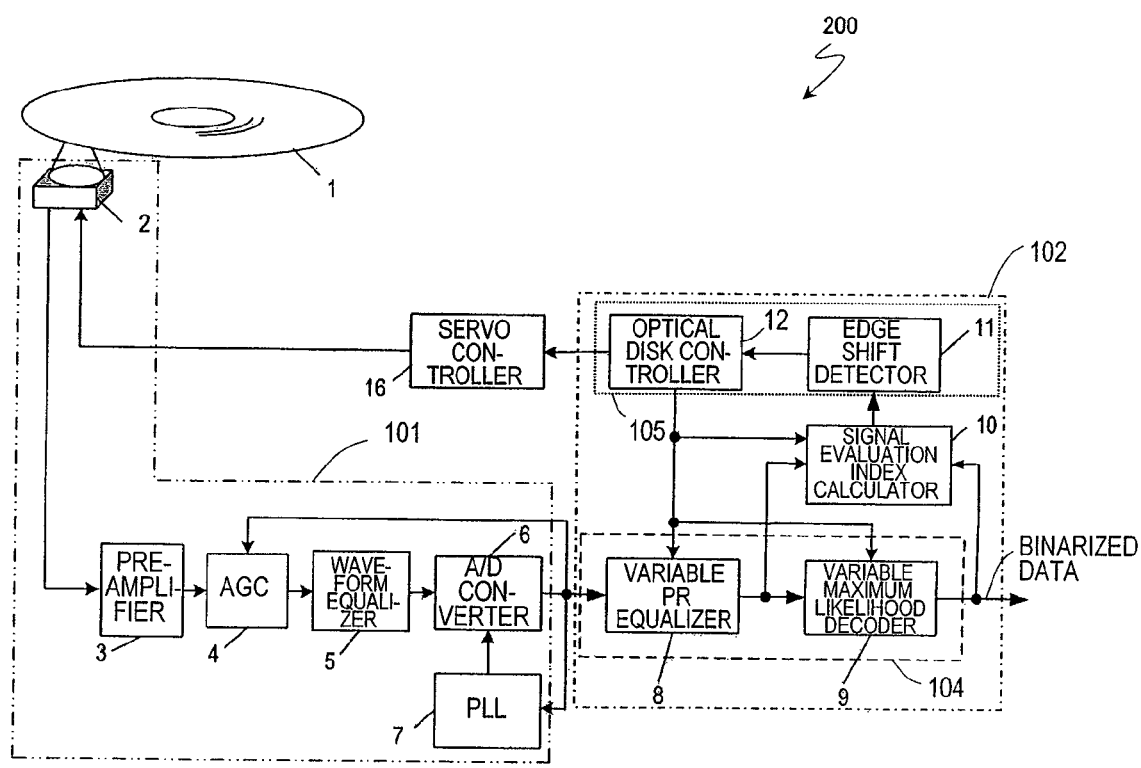
FIG. 11 illustrates an optical disc drive according to another preferred embodiment of the present invention.

An optical disc drive 200 that optimizes those servo parameters in this manner is shown in FIG. 11. The configuration of the optical disc drive 200 is substantially the same as that of the optical disc drive 100 shown in FIG. 1 but illustration of some components is omitted for the sake of simplicity. The optical disc drive 200 further includes a servo control section 16.

The servo control section 16 performs various types of controls, including optical head's position control, focus position control, spherical aberration position control, and tracking position control, in order to access a particular location on a given optical disc medium. The optical disc controller section 12 outputs the best value of focus parameters (see FIG. 10) to the servo control section 16. In response, the servo control section 16 controls the focus position using that parameter. Not just the focus position parameter but also the spherical aberration position parameter and the tracking position parameter may be obtained in a similar manner and optimized. Then, the optical disc drive can perform read/write operation with much more stability. Also, the servo parameters to optimize include not just servo parameters for reading but also ones for writing.

Furthermore, the signal evaluation index needs to be calculated differently according to the PRML characteristic to adopt as described above. For that reason, if the PRML characteristics are changed, the ways of calculating the signal evaluation index should also be changed according to the PRML characteristic newly adopted.

As described above, by changing the PRML characteristics to adopt depending on what type of operation needs to be done for what purpose (i.e., to make adjustments before a write operation is started, to perform a read operation, or to perform a read operation for evaluating the signal quality), various types of write parameters, the read performance and various types of read parameters can all be optimized easily. As a result, an optical disc drive that would achieve high write performance, high read performance and good compatibility can be provided.

In the foregoing description of preferred embodiments, PR 1221 ML and PR 12221 ML are supposed to be adopted as exemplary PRML methods. However, the present invention is in no way limited to those specific preferred embodiments. Rather the effects of the present invention would also be achieved equally even if the present invention were carried out with a different combination of PRML methods.

Also, it is not always necessary to perform the test write operation. Instead, the edge shifts may be detected and the write parameters may be corrected based on the information that was collected when a write operation was performed using initial write parameters.

Optionally, the variable PR equalizing section 8 may have a finite impulse response (FIR) filter configuration and may control tap coefficients adaptively by the least mean square (LMS) algorithm (see Adaptive Signal Processing Algorithm published by Baifukan Co., Ltd. (Non-Patent Document No. 2)).

Alternatively, the PRML characteristics may also be changed according to the storage density of the given optical disc medium on which information is going to be written. In that case, the same PRML characteristic may be eventually selected in every situation.

Still alternatively, when the PRML characteristics are changed, the optical disc controller section 12 may change the equalization characteristics of the waveform equalizing section 5. The waveform equalization made by the waveform equalizing section 5 contributes to not only maintaining the stability of the PLL by shaping the waveform before it is processed by the PLL section 7 but also improving the output characteristic of the variable PR equalizing section 8. By changing the waveform equalization characteristics of the waveform equalizing section 5 when the PRML characteristics are changed into a treble-boosted one or a non-treble-boosted one, not just can the stability of the PLL be maintained but also can the output characteristic of the variable PR equalizing section 8 be improved. If both of these two purposes cannot be achieved at the same time, then two waveform equalizing sections may be provided for the PLL and for the PRML, respectively. If the PRML methods are changed from PR 1221 ML into PR 12221 ML, then the waveform equalizing section for the PLL may have an increased characteristic gain (e.g., have increased amplitude at high frequencies) while the waveform equalizing section for PR equalization may have a decreased gain (e.g., have decreased amplitude at high frequencies). Alternatively, only waveform equalization for PLL may be carried out. Still alternatively, the waveform equalizing section 5 may be arranged after the A/D converting section 6 so as to function as a digital waveform equalizing section.

Also, in the foregoing description of preferred embodiments, write parameters that are correlated to edge shifting are supposed to be adjusted. However, the write parameters to adjust are not particularly limited but may also be the leading and trailing edges of a write signal waveform and the height of the write waveform (recording power). That is to say, as long as the edge positions of a mark can be adjusted, any other write parameters may be adjusted. Furthermore, the write parameter to adjust may also be recording power. The mark length can be calculated based on the magnitude and direction of edge shifting and the recording power may be adjusted such that this mark length becomes equal to a predetermined length.

Optionally, the preamplifier section 3, the AGC section 4 and the waveform equalizing section 5 shown in FIG. 1 may be integrated together into a single analog large-scale integrated circuit (LSI). Also, the A/D converting section 6, the PLL section 7, the variable PR equalizing section 8, the variable maximum likelihood decoding section 9, the signal evaluation index calculating section 10, the edge shifting detecting section 11, the optical disc controller section 12, the pattern generating section 13 and the write compensating section 14 may be integrated together into a single hybrid (analog and digital) large-scale integrated circuit (LSI). Naturally, this hybrid LSI may further include the preamplifier section 3, the AGC section 4 and the waveform equalizing section 5. The laser driver section 15 may be implemented as a single driver LSI and built in the optical head section 2 as well.

In the foregoing description of preferred embodiments, the optical disc drive 100 or 200 is supposed to be a read/write system. However, the optical disc drive 100 or 200 may also be a read-only device. In that case, the pattern generating section 13 and the write compensating section 14 may be omitted. Also, in that case, the servo control section 16 may be included as one of the blocks of the hybrid LSI mentioned above. Furthermore, the servo control section 16 may be added to the optical disc drive 100. Nevertheless, the present invention is not limited to any of these configurations for an optical disc drive but may use another configuration as well.

Also, the write adjustment mode, the read mode and the signal quality evaluating read mode could be recognized by various access commands such as a write access command, a read access command and a evaluate access command.

Embodiment 2

Figure 12:
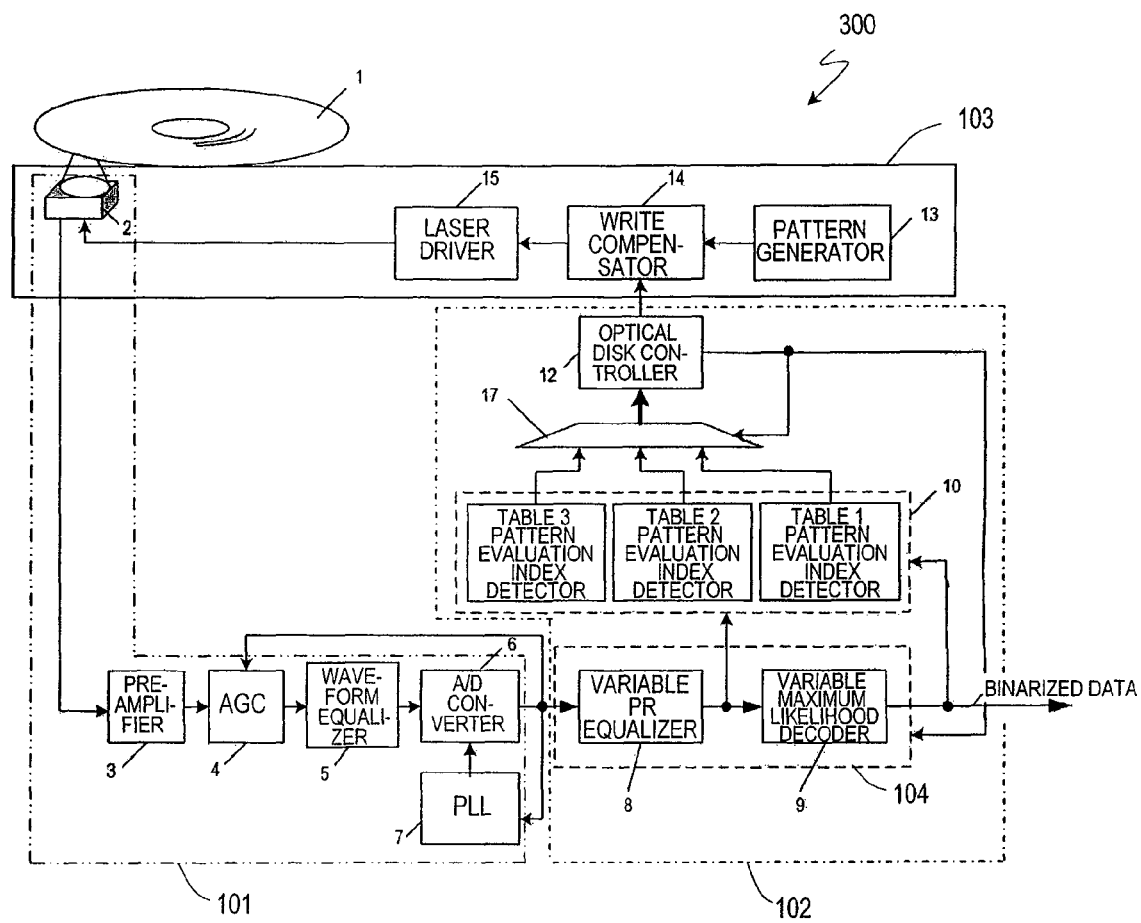
FIG. 12 illustrates an optical disc drive according to still another preferred embodiment of the present invention.

FIG. 12 shows a configuration for an optical disc drive 300 as a second specific preferred embodiment of the present invention. The optical disc drive 300 has the same configuration as the optical disc drive 100 shown in FIG. 1 except that the write condition modifying section 102 includes different components.

The signal evaluation index calculating section 10 of this optical disc drive 300 calculates and detects evaluation indices for the patterns shown in respective Tables 1, 2 and 3. That is to say, by calculating those evaluation indices, the signal evaluation index calculating section 10 detects the values of those evaluation indices. The optical disc drive 300 further includes a selecting section 17, which determines which of these results of calculations (and detections) should be output to the optical disc controller 12.

In response to the control signal supplied from the optical disc controller section 12, the selecting section 17 determines which of the patterns shown in Tables 1 to 3 should be output as the results of signal evaluation indices detected. As the case may be, patterns may be selected from either all of Tables 1, 2 and 3 or just one or two of them.

Hereinafter, it will be described how read processing needs to be carried out when write parameters are adjusted for a BD (Blu-ray Disc) with a storage linear density of 33.3 GB per recording layer and how read processing is performed on a normal user area.

The optical disc controller section 12 instructs the variable PR equalizing section 8 and the variable maximum likelihood decoding section 9 of the PRML detecting section 104 to select the PR 12221 ML method. Also, the optical disc controller section 12 instructs the selecting section 17 to selectively output only the evaluation indices detected for the patterns shown in Table 1 from the signal evaluation index calculating section 10.

The optical disc controller section 12 recognizes the results of detection as estimated signal values, thereby evaluating the signal quality of the read digital signal obtained by reading information from the recording area.

A high-order PRML method such as PR 12221 ML recognizes the waveform of a read signal using a waveform pattern in an even longer interval in order to identify the read signal under the influence of intersymbol interference. Comparing the patterns shown in Tables 2 and 3, which are most commonly mistakable in the PR 12221 ML, to the ones shown in Table 4, which are most commonly mistakable in the PR 1221 ML, it can be seen that the longer interval is an interval in which two paths that merge with each other in the shortest waveform distance have a long distance (i.e., it takes long for the time K to pass) between them. As used herein, the "waveform distance" represents how far two waveforms, which could be reference waveforms during a Viterbi decoding process, are apart from each other. Also, the most commonly mistakable patterns refer to the patterns of two paths that merge with each other in the shortest waveform distance.

The evaluation patterns shown in Table 2 are patterns in which a 2T signal representing either a 2T mark or a 2T space is isolated, and therefore, have two edges at the leading and trailing edges of the 2T signal (i.e., zero-cross information). The zero-cross information indicates the zero-cross portion of a signal. Since the error of a single piece of zero-cross information cannot be detected separately from a single pattern, it is difficult to adjust the zero-cross portions one by one when the write parameters are adjusted on a mark length basis with attention paid to the zero-cross information.

Meanwhile, the evaluation patterns shown in Table 3 include patterns in which 2T signals appear consecutively and patterns in which a 2T signal is either preceded or followed by a non-2T signal, and have multiple pieces of zero-cross information. Since the error of a single piece of zero-cross information cannot be detected separately from a single pattern, it is difficult to adjust the zero-cross portions one by one when the write parameters are adjusted on a mark length basis with attention paid to the zero-cross information.

The evaluation patterns shown in Table 1 are not most commonly mistakable patterns in the PR 12221 ML but have only a single piece of zero-cross information. In this case, the error of a single piece of zero-cross information can be detected separately from a single pattern. For that reason, it is possible to adjust the zero-cross portions one by one when the write parameters are adjusted on a mark length basis with attention paid to the zero-cross information.

The PR 12221 ML is a PRML method in which multiple pieces of zero-cross information (i.e., a number of zero-cross portions) are included in a merging path of a minimum difference metric. In this preferred embodiment, the signal quality of a read digital signal is calculated by this PR 12221 ML method. In this case, the signal quality is detected by calculating the evaluation index using only a state transition pattern in which only a single piece of zero-cross information is included in a merging path of a non-minimum difference metric. Such a state transition pattern in which only a single piece of zero-cross information is included in a merging path of a non-minimum difference metric belongs to the state transition patterns shown in Table 1. Particularly in an optical disc medium that adopts the mark edge recording method in which each zero-cross portion of a signal has information, it is a very important factor to detect and evaluate these zero-cross portions appropriately in order to evaluate and adjust the quality of the just written area.

The variable PR equalizing section 8 and the variable maximum likelihood decoding section 9 shown in FIG. 12 do not have to be designed to change the PRML methods, but may be designed to always use the PR 12221 ML, for example.

In evaluating the quality of a given medium, an index that is most correlated to an error rate (i.e., an index corresponding to a most commonly mistakable pattern) has been used as a signal evaluation index. However, if it is already known that the given pattern is related to the shortest mark as shown in Tables 2 and 3, rating can be done to a certain extent by signal processing. Nevertheless, the point is how to cope with SNR, erasure and archival properties (such as how well the original storage quality is maintained and how resistant it is against erasure even after years of storage), none of which could be dealt with by signal processing. It is determined based on information about zero crossing whether these properties are good or bad. That is why no matter how high-order the PRML method to adopt may be, the storage state is preferably evaluated by selecting a pattern that matches the method of writing on the optical disc medium.

The best PRML method needs to be selected in view of intersymbol interference and decrease in SNR that could occur more and more often as the storage linear density further rises. In this preferred embodiment, the PR 1221 ML method is adopted if the storage linear density is less than a predetermined value. And when information with a storage linear density that is equal to or higher than that value needs to be read, the PR 12221 ML method is adopted.

Hereinafter, the storage linear density of a BD will be described with reference to FIGS. 13 and 14. As in a DVD (digital versatile disc), data is also written on the track 131 of a BD as a series of marks that are produced as a result of a physical variation. The shortest one of this series of marks is the shortest mark 132. In a BD with a storage capacity of 25 GB, the shortest mark 132 has a physical length of 0.149 μm, which is approximately 1/2.7 of the shortest mark of a DVD.

And even if the resolution of a laser beam is increased by changing the parameters of an optical system such as the length (405 nm) and the NA (0.85), this value is still rather close to the limit of optical resolution, below which recording marks are no longer recognizable. It should be noted that both marks and spaces have the shortest length of 2T.

Figure 13:
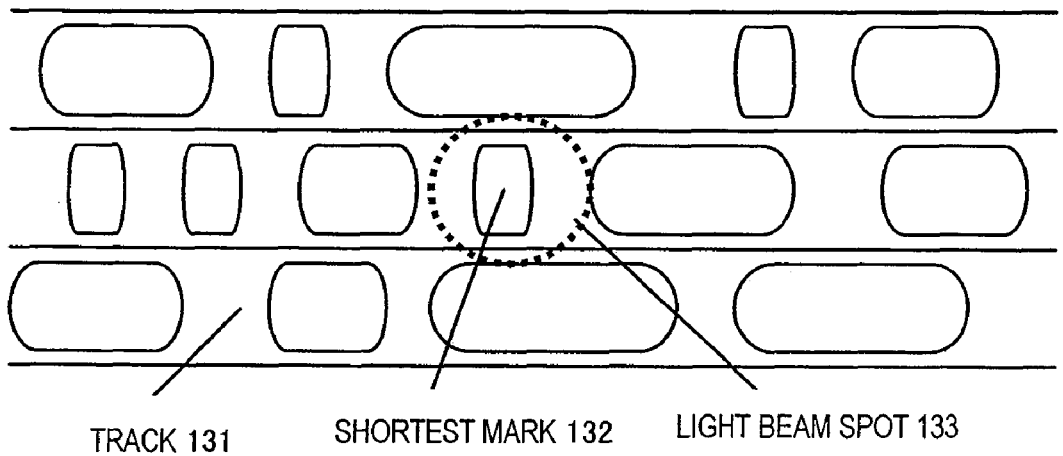
FIG. 13 illustrates a relation between a light beam spot and a series of marks that have been left on the track of an optical disc medium according to a preferred embodiment of the present invention.
Figure 14:
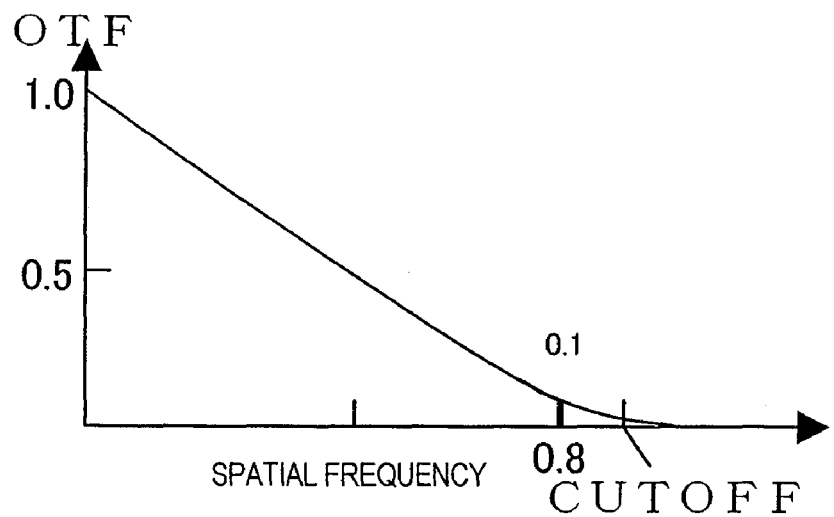
FIG. 14 shows the OTF characteristic of an optical disc medium according to a preferred embodiment of the present invention.

FIG. 13 illustrates a state where a light beam spot 133 has been formed on the series of recording marks on the track 131. In a BD, the light beam spot 133 has a diameter of about 0.39 µm, which may vary with parameters of the optical system. If the storage linear density is increased without changing the structures of the optical system, then the recording marks will shrink for the same spot size and the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the readable limit at which the amplitude goes zero is called an OTF cutoff. FIG. 14 shows how the OTF of a BD with a storage capacity of 25 GB changes with the shortest recording mark length. The spatial frequency of the shortest mark on a BD is 80% of, and is rather close to, the OTF cutoff frequency (i.e., a spatial frequency at which the OTF cutoff occurs). Also, a read signal representing the shortest mark has amplitude as small as approximately 10%. The storage linear density at which when the shortest mark on a BD is read, the OTF cutoff occurs (i.e., the storage linear density at which the read signal has almost no amplitude) corresponds to approximately 31 GB in a BD.

When the spatial frequency of the shortest mark comes close to, or exceeds, the OTF cutoff frequency, the limit of optical resolution may have been reached or even surpassed. As a result, the read signal comes to have decreased amplitude and the SNR drops steeply.

The storage density at which the PRML methods are changed from the PR 1221 ML into the PR 12221 ML, or vice versa, may be a storage linear density of 31 GB on a BD, for example. Also, the storage linear density at which the spatial frequency of the shortest mark is equal to the OTF cutoff frequency calculates 31.8 GB. That is why the PRML methods are preferably changed between PR 1221 ML and PR 12221 ML when the linear density is still smaller than 31.8 GB.

The storage linear density to change the PRML methods needs to be determined by taking not just the resolution of a laser beam but also an SNR, representing the storage property of a medium, into consideration fully, and may be either lower or higher than 31 GB.

The information recording medium 1 has a storage linear density of 31 GB or more per recording layer and may be equal to or higher than 31.8 GB. The storage linear density per recording layer may be approximately 33.3 GB, for example. The information recording medium 1 may include three or more recording layers, the total storage linear density of which becomes approximately equal to 100 GB.

It should be noted that the PRML method described above is just an example and the present invention is in no way limited to that example. Instead, any other PRML method may be selected according to the given storage linear density.

As described above, in an optical disc medium that adopts the mark edge recording method in which each zero-cross portion of a signal has information, it is a very important factor to detect and evaluate those zero-cross portions appropriately in order to evaluate and adjust the quality of the just written area. Hereinafter, an exemplary signal evaluation method that uses those zero-cross portions will be described.

The signal evaluation index calculating section 10 of the optical disc drive 300 shown in FIG. 12 calculates and detects the Table 1 pattern evaluation indices (which are signal evaluation indices of the patterns shown in Table 1). And the results of detection are classified according to the combination of mark and space lengths. As a result of that classification, the degree of edge shifting and SNR of each pattern are known. For example, the calculation represented by Equation (1) that has already been described for the first preferred embodiment of the present invention may be made and results of those calculations may be used as indices of a distribution similar to jitter's.

FIG. 15 shows the distribution of results of those signal evaluation index calculations represented by Equation (1) on the patterns shown in Table 1 (i.e., the distribution of index D values). In FIG. 15, the abscissa represents the D value calculated by Equation (1) and the ordinate represents its frequency of occurrence. According to the PR 12221 ML method, the square of d in Equation (1) is 14.

FIG. 15(a) shows a distribution, of which the average is approximately equal to zero and which has a relatively small standard deviation σ. This is an example in which the quality of the read signal is good. On the other hand, FIG. 15(b) shows a distribution, which has a relatively small standard deviation σ but of which the average has shifted. This is an example in which that pattern has caused edge shifting. And FIG. 15(c) shows a distribution, of which the average is approximately equal to zero but which has a relatively large standard deviation σ. This is an example in which the edges of that pattern have a poor SNR. If the signal quality is analyzed separately for every possible combination of mark and space lengths by these evaluation methods, the quality of recording marks that have been left on the optical disc medium can be evaluated accurately. In the signal quality evaluation processing, at least one of the degree of SNR of a read digital signal and the degree of edge shifting is determined by the signal quality calculated. The degree of edge shifting of a read digital signal can be determined by the average of a distribution of quality evaluation index values calculated. On the other hand, the degree of SNR of the read digital signal can be determined by the standard deviation of a distribution of quality evaluation index values calculated.

And a write operation may be performed with write parameters changed according to those results of evaluation such that the edge shift and SNR improve for every possible combination of mark and space lengths. In this case, the improvement of edge shift means bringing the average of the distribution as close to zero as possible. On the other hand, the improvement of SNR means reducing the standard deviation σ. For example, the optical disc controller section 12 may receive the results of evaluation from the signal evaluation index calculating section 10, determine which write parameters should be changed, and then output the modified parameters to the write compensating section 14. The write parameters include recording power parameters and write pulse position parameters. Optionally, the servo parameters described above, including focus position parameters, spherical aberration position parameters and tracking position parameters, may be optimized based on these results of evaluation.

The evaluation may be carried out in any way. That is to say, the edge shift and SNR may be estimated either separately or collectively. Or the evaluation may also be done with the results of calculations classified on a pattern-by-pattern basis.

The target of these estimated values needs to be set within a range in which a sufficient system margin can be afforded. If the variance of D calculated by Equation (1) is normalized with TW (which is the square of 2×d), it can be used as an estimated value correlated to the error rate. For example, the evaluation may be carried out with a target set on an element-by-element basis and with a total target index value supposed to be 10%. Specifically, evaluation may be done with the target value of edge shifting defined to be 4.3%. Alternatively, the evaluation may also be done with the target value of SNR defined to be 9%.

Embodiment 3

Figure 16:
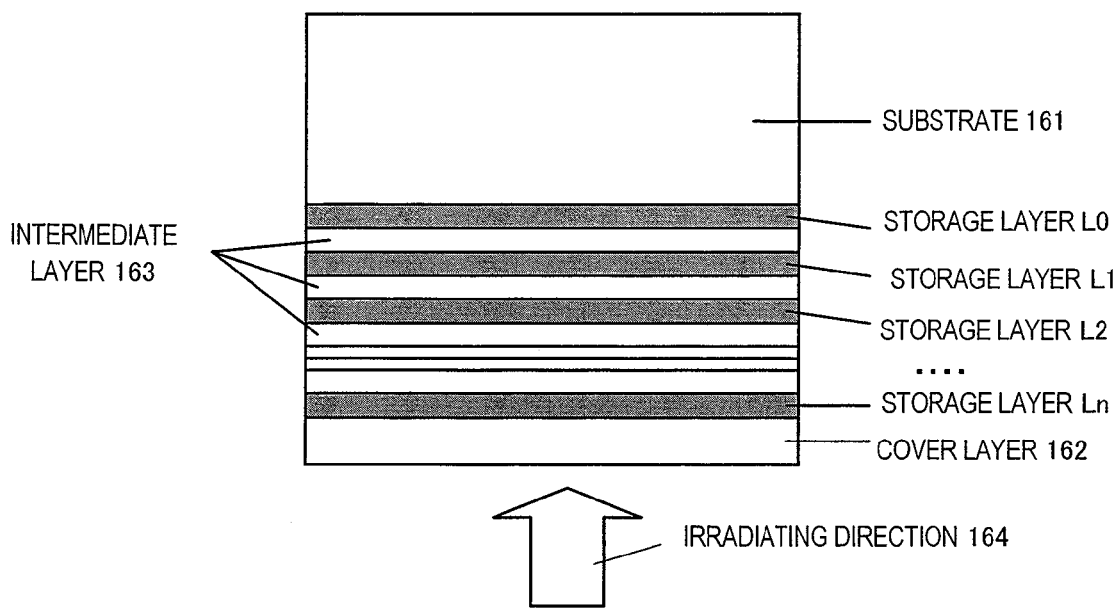
FIG. 16 illustrates an optical disc medium with multiple recording layers according to a preferred embodiment of the present invention.

Next, an information recording medium will be described as a third preferred embodiment of the present invention. FIG. 16 illustrates an information recording medium 1 according to this preferred embodiment. The information recording medium 1 is supposed to be loaded into the optical disc drive 100, 200 or 300 described above.

FIG. 16 illustrates a multilayer phase-change type thin film disc medium as an exemplary information recording medium 1. However, the storage medium may also be a single layer disc medium with only one recording layer. The information recording medium 1 shown in FIG. 16 includes a number n (which is an integer that is equal to or greater than two) of recording layers. The information recording medium 1 includes a coating layer (protective coating) 162, recording layers Ln through L0, and a polycarbonate substrate 161, which are stacked in this order over the light source of a laser beam 2a (see FIG. 1). Also, between each pair of adjacent recording layers Ln through L0, interposed is an intermediate layer 163, which functions as an optical buffering member. The substrate 161 may have a thickness of 1.1 mm, for example. The coating layer (protective coating) 162 may have a thickness of 10 µm to 200 µm, which is preferably 100 µm or less.

The direction 164 in which the laser beam 2a (see FIG. 1) travels is the direction in which the optical head section 2 faces toward the coating layer 162 of the information recording medium 1. That is to say, the laser beam 2a enters the information recording medium 1 through the coating layer 162 of the information recording medium 1.

It has been proposed that the overall storage capacity of a single information recording medium be increased by adopting such a multilayer structure with the storage capacity of each layer maintained. Such multilayer storage, however, could have various influences on the read operation. For example, as the balance in transmittance cannot be optimized due to the presence of multiple recording layers, the reflectance could decrease. In addition, as the thickness of the intermediate layers needs to be reduced, crosstalk would increase between the recording layers to cause a decrease in SNR. Furthermore, stray light could be produced due to the structure of the optical head, thus further decreasing the SNR. That is why development of a method for measuring these SNR quantitatively is awaited.

According to the evaluation method that uses the patterns shown in Table 2 or 3, an estimated value correlated to the error rate can be certainly obtained. Depending on the write condition, however, the SNR components could not be estimated appropriately. As described above, the patterns shown in Table 2 or 3 have either an isolated pattern of a 2T signal or a repetitive pattern of 2T signals. The PR 12221 ML is a reading method in which the 2T signal is expected to be read with zero amplitude (which is the center level of a waveform). That is why even in a write state with no edge shifting and a good SNR, when a read signal waveform in which a 2T signal will have significantly varied DC level (i.e., an asymmetric waveform) is evaluated, the evaluation index is significantly affected by the variation in DC level. For that reason, if the patterns shown in Table 2 or 3 are adopted, the influence of the SNR could not be evaluated accurately when an asymmetric waveform needs to be evaluated. Therefore, according to the present invention, by making evaluations using the patterns shown in Table 1 as described above, the properties of the given medium or optical head can be evaluated properly.

In the foregoing description, a problem of a medium with a multilayer structure and the effects of the present invention that can contribute to resolving such a problem have been discussed. However, the present invention can also be used effectively even in evaluating a single-layer medium with only one recording layer. On top of that, the present invention is applicable to evaluating not just a recordable information recording medium but also a ROM (read only memory) type information recording medium as well.

Embodiment 4

In the disc evaluation method described above, an evaluation index is calculated by using, as the most important index that pays special attention to an edge portion that has something to do with forming marks, only a state transition pattern according to the PR 12221 ML method in which only a single piece of zero-cross information is included in a merging path of a non-minimum difference metric, thereby detecting the signal quality. Specifically, such a state transition pattern in which only a single piece of zero-cross information is included in a merging path of a non-minimum difference metric belongs to the state transition patterns shown in Table 1. When evaluating a disc, it should be enough to evaluate it by using mainly the patterns shown in Table 1. However, for the signal evaluation index to have an even higher degree of correlation with the error rate, the evaluation index preferably takes every possible pattern in which an error is likely to occur into consideration in the PR 12221 ML signal processing.

Figure 17:
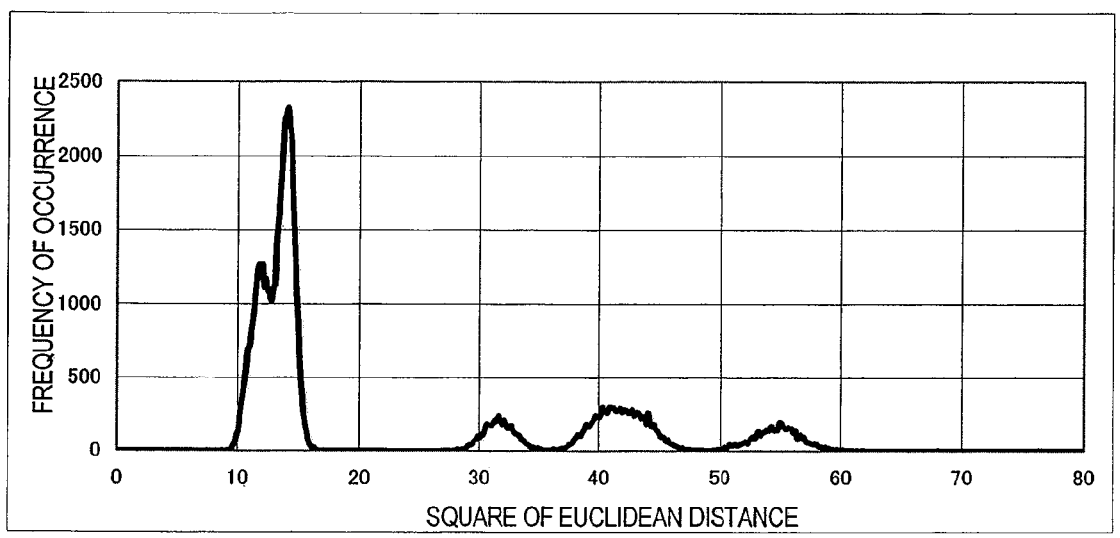
FIG. 17 shows the distribution of difference metrics according to a PR (1, 2, 2, 2, 1) ML method in a preferred embodiment of the present invention.

FIG. 17 shows the distribution of difference metrics according to the PR 12221 ML signal processing method. In FIG. 17, the abscissa represents the square of a Euclidean distance, while the ordinate represents its frequency of occurrence.

This result reveals that the smaller the square of a Euclidean distance, the more likely an error occurs in the PR 12221 ML signal processing. As also can be seen from FIG. 17, the squares of Euclidean distances have outstanding groups of distribution at 12 and 14 and every group of greater values is more than 30. That is to say, it can be seen that to obtain a signal index that has a high degree of correlation with the error rate, it should be enough to pay attention to those groups, in which the square of Euclidean distance is 12 or 14, i.e., the patterns shown in Tables 1, 2 and 3.

Figure 18:
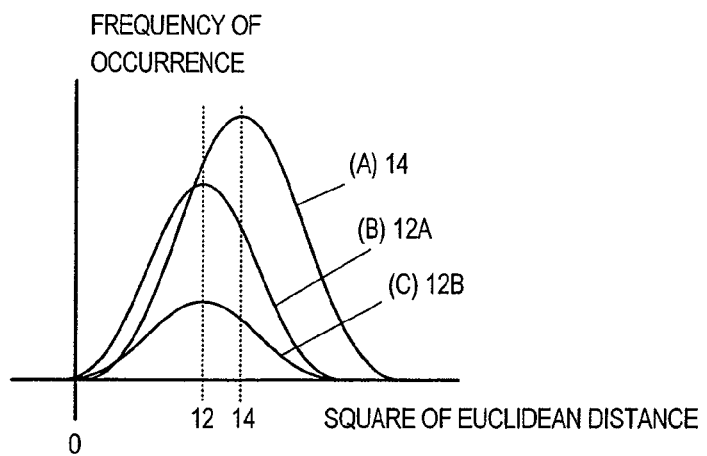
FIG. 18 shows the distributions of the difference metrics of the patterns with respective Euclidean distances according to the PR (1, 2, 2, 2, 1) ML method in the preferred embodiment of the present invention.

FIG. 18 shows how much the variance of |Pa−Pb|, which is the difference metric portion of Equation (1), is when the patterns shown in Tables 1, 2 and 3 are used. In FIG. 18, the abscissa represents the square of a Euclidean distance, while the ordinate represents its frequency of occurrence. Specifically, the curve (A) shown in FIG. 18 represents an exemplary distribution for only the patterns shown in Table 1, of which the square of the Euclidean distance is equal to 14. This curve is distributed substantially around the abscissa at which the square of the Euclidean distance is equal to 14. The curve (B)

shown in FIG. 18 represents an exemplary distribution for only the patterns shown in Table 2, of which the square of the Euclidean distance is equal to 12. This curve is distributed substantially around the abscissa at which the square of the Euclidean distance is equal to 12. And the curve (C) shown in FIG. 18 represents an exemplary distribution for only the patterns shown in Table 3, of which the square of the Euclidean distance is also equal to 12. This curve is also distributed substantially around the abscissa at which the square of the Euclidean distance is equal to 12.

The respective patterns shown in Tables 1, 2 and 3 have different Euclidean distances. However, as can be seen from the series of zeros and ones in those tables, Tables 1, 2 and 3 also have mutually different numbers of bits of errors that occurred. Specifically, the patterns shown in Table 1, of which the square of the Euclidean distance is equal to 14, generate one-bit errors. The patterns shown in Table 2, of which the square of the Euclidean distance is equal to 12, generate two-bit errors. And the patterns shown in Table 3, of which the square of the Euclidean distance is equal to 12, generate at least three-bit errors. Among other things, the patterns shown in Table 3 depend on the number of 2Ts that appear consecutively one after another. For example, if a given write modulation code permits at most six consecutive 2Ts, the pattern will generate at most six-bit errors. Although such six-bit errors are not shown in Table 3, patterns, in which 2Ts appear consecutively, just need to be extended to get an idea of such a pattern. However, such patterns are omitted from Table 3 for the sake of simplicity.

In addition, the patterns shown in those tables would also occur at mutually different probabilities in write modulation code sequences. For example, the patterns shown in Table 1 have a frequency of occurrence of approximately 40% with respect to all samples. The patterns shown in Table 2 have a frequency of occurrence of approximately 15% with respect to all samples. And the patterns shown in Table 3 have a frequency of occurrence of approximately 5% with respect to all samples.

The curves (A), (B) and (C) shown in FIG. 18 have mutually different standard deviations σ representing the degrees of deviation, different detection windows (Euclidean distances), different frequencies of occurrence, and different weights with respect to the number of error bits, and therefore, would have different degrees of influence on errors.

Hereinafter, an exemplary method for obtaining signal indices, which are highly correlated with errors, from these three signal distributions will be described.

Equation (4) is a mathematical equation for calculating a difference metric using the patterns shown in Table 1. Such a difference metric will be described briefly. First, a binarized signal is generated by the PRML processing based on a read signal retrieved from a given disc. Any of the recording code patterns shown in Table 1 is detected from the binarized signal and defined as a correct pattern. A PR equalization ideal value (ideal signal) associated with that correct pattern is calculated. Then, an erroneous pattern corresponding to that correct pattern and a PR equalization ideal value associated with that erroneous pattern are calculated.

For example, supposing the correct pattern in Table 1 is (0, 0, 0, 0, 1, 1, 1, 0, 0), a PR equalization ideal value associated with that correct pattern becomes (1, 3, 5, 6, 5). On the other hand, supposing the erroneous pattern is (0, 0, 0, 0, 0, 1, 1, 0, 0), a PR equalization ideal value associated with that erroneous pattern becomes (0, 1, 3, 4, 4). In that case, the square of the Euclidean distance, which is the square of the difference between the PR equalization ideal values of the correct and erroneous patterns, becomes equal to 14.

Next, the square of the difference between the read signal sequence and the PR equalization ideal value associated with the correct pattern is calculated and defined as PB. In the same way, the square of the difference between the read signal sequence and the PR equalization ideal value associated with the erroneous pattern is calculated and defined as PA. Then, the difference between PA and PB is calculated by PA-PB. This differential information is offset by the square (i.e., 14) of the difference between the PR equalization ideal values of the correct and erroneous patterns. This is a mathematical operation represented by Equation (4). In this example, the differential information is offset by the square (i.e., 14) of the difference between the PR equalization ideal values of the correct and erroneous patterns. However, such an offset is not always required. But such an offset is adopted just for the sake of convenience of calculations such that the center of the distribution becomes equal to zero.

Optionally, PB may also be obtained by making the calculations on the distance between the expected value of the correct pattern and the signal and PA may also be obtained by making the calculations on the distance between the expected value of the erroneous pattern, which is similar to, but different from, the correct pattern, and the signal. In that case, their difference PA-PB will be distributed around the square (i.e., 14) of the ideal Euclidean distance, and there will be no need to calculate the absolute value as in Equation (4).

In the same way, Equation (5) is a mathematical equation for calculating the difference metric based on the patterns shown in Table 2, while Equation (6) is a mathematical equation for calculating the difference metric based on the patterns shown in Table 3.

$$D_{14} = |Pa - Pb| - d^2_{(14)} \quad (4)$$

$$D_{12A} = |Pa - Pb| - d^2_{(12A)} \quad (5)$$

$$D_{12B} = |Pa - Pb| - d^2_{(12B)} \quad (6)$$

Supposing the difference metric distribution thus obtained is a normal distribution, the probability of errors bER can be calculated by the following Equation (7) using the variance σ of the distribution:

$$bER = p \times \int_{-\infty}^{0} \frac{1}{\sqrt{2\pi}\,\sigma} e^{-\frac{(x-d^2)^2}{2\sigma^2}} dx \quad (7)$$

where p is the probability of a distribution component with respect to all channel points. The difference metric by the patterns shown in Table 1 can be calculated by Equation (4) and its exemplary distribution is represented by the curve (A) shown in FIG. 18. The probability of errors that will occur in the patterns shown in Table 1 can be calculated by the following Equation (8) based on that distribution:

$$bER_{14} = 1 \times p_{14} \times \int_{-\infty}^{0} \frac{1}{\sqrt{2\pi}\,\sigma_{14}} e^{-\frac{(x-d^2_{14})^2}{2\sigma^2_{14}}} dx \quad (8)$$

where $p_{14}$ is the probability of a distribution component with respect to all channel points. Also, since every error that occurs in the patterns shown in Table 1 is a one-bit error, $p_{14}$ is multiplied by one.

The difference metric by the patterns shown in Table 2 can be calculated by Equation (5) and its exemplary distribution is represented by the curve (B) shown in FIG. 18. The probability of errors that will occur in the patterns shown in Table 2 can be calculated by the following Equation (9) based on that distribution:

$$bER_{12A} = 2 \times p_{12A} \times \int_{-\infty}^{0} \frac{1}{\sqrt{2\pi}\,\sigma_{12A}} e^{-\frac{(x-d_{12A}^2)^2}{2\sigma_{12A}^2}}\,dx \qquad (9)$$

where $p_{12A}$ is the probability of a distribution component with respect to all channel points. Also, since every error that occurs in the patterns shown in Table 2 is a two-bit error, $p_{12A}$ is multiplied by two.

The difference metric by the patterns shown in Table 3 can be calculated by Equation (6) and its exemplary distribution is represented by the curve (C) shown in FIG. 18. The probability of errors that will occur in the patterns shown in Table 3 can be calculated by the following Equation (10) based on that distribution:

$$bER_{12B} = 3 \times p_{12B} \times \int_{-\infty}^{0} \frac{1}{\sqrt{2\pi}\,\sigma_{12B}} e^{-\frac{(x-d_{12B}^2)^2}{2\sigma_{12B}^2}}\,dx \qquad (10)$$

where $p_{12B}$ is the probability of a distribution component with respect to all channel points. Also, since every error that occurs in the patterns shown in Table 3 is a three-bit error, $p_{12B}$ is multiplied by three.

The probability of errors that will occur in all of the patterns shown in Tables 1, 2 and 3 can be calculated by adding together Equations (8), (9) and (10). That is to say, the total error rate bER (All) is given by the following Equation (11):

$$bER_{all} = bER_{14} + bER_{12A} + bER_{12B} \qquad (11)$$

The total error rate thus calculated by Equation (11) is accurate enough to be defined as a "signal index" and regarded as a signal index that is correlated to actual errors. Considering the degree of compatibility to be realized between various evaluation methods for optical disc drives, however, there is an increasing demand for an index that is not only similar to a jitter but also correlated to an error rate. That is why the error rate calculated by Equation (11) is substituted into the left side of Equation (7), thereby calculating a in reverse order. And that σ thus obtained is normalized with a predetermined window. As a result, a signal index that is correlated to the error rate, similar to a jitter, and yet easy to handle can be obtained. In that case, p in Equation (7) becomes the probability of a distribution component with respect to the number of all channels, which is calculated by adding $p_{14}$, $p_{12A}$ and $p_{12B}$ together.

Equation (7) may be modified into the following Equation (12):

$$bER = \frac{p}{2} \operatorname{erfc}\left(\frac{d^2}{\sqrt{2}\,\sigma}\right) \qquad (12)$$

where erfc ( ) is the integrated value of a complementary error function. In this case, the signal index is defined by the following Equation (13):

$$M = \frac{\sigma}{2 \cdot d^2} \qquad (13)$$

If this Equation (13) is substituted into Equation (12), then Equation (12) can be represented by the following Equation (14):

$$bER = \frac{p}{2} \operatorname{erfc}\left(\frac{1}{2\sqrt{2} \times M}\right) \qquad (14)$$

By using this Equation (14), the error rate calculated by Equation (11) and the signal index M defined by Equation (13) can get associated with each other. However, the present invention is in no way limited to this specific definition of the signal index M.

The present invention provides a signal evaluation method and evaluation index that are highly correlated with the error rate and pays special attention to a merging path pattern that has a relatively small Euclidean distance in the PRML signal processing. And based on the distributions of multiple groups of patterns that have respectively different probabilities and mutually different numbers of error bits, a single signal evaluation index is generated. For that purpose, the probabilities of errors are calculated based on the respective distributions, the sum of those probabilities of errors is calculated as an error rate, and then a total σ is calculated based on the error rate thus obtained, and defined as a signal evaluation index.

Figure 19:
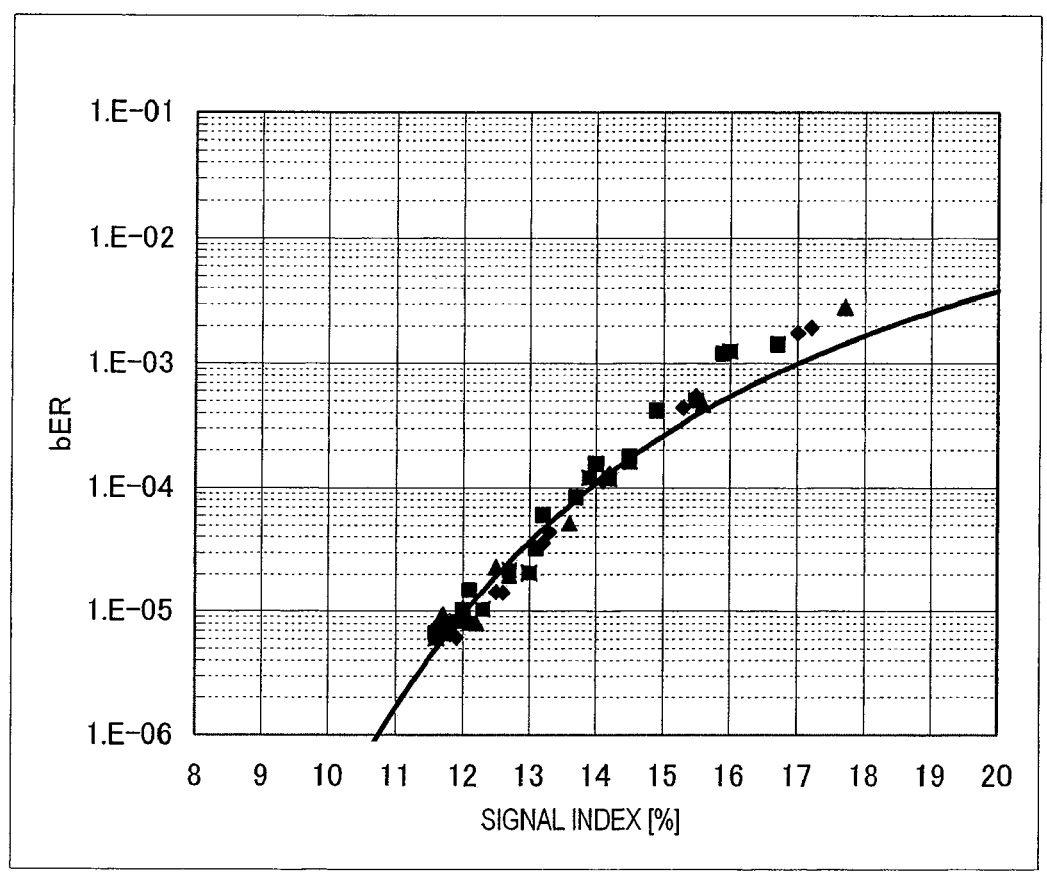
FIG. 19 shows how the error rate changes with the signal evaluation index value in a preferred embodiment of the present invention.

FIG. 19 shows exemplary results of simulations based on the relation between the bit error rate and the signal index value [%] of Equation (13) in a situation where a tilt, a defocus, a spherical aberration and other read stresses were imposed. In FIG. 19, the solid curve is a theoretical curve obtained from Equation (14). As can be seen from FIG. 19, even when simulations were actually carried out, the correlation between the error rate and the signal index M substantially agreed with the theoretical curve. Thus, it can be seen that the signal evaluation method and index of the present invention would contribute greatly to evaluating a read signal appropriately.

In the foregoing description, it has been described how to calculate the signal evaluation index with the patterns of merging paths with relatively small Euclidean distances in the PRML signal processing roughly classified into three groups of patterns. However, the present invention is in no way limited to that specific preferred embodiment. Specifically, in Table 1, patterns, of which the square of the Euclidean distance is equal to 14, are treated as a single group. Alternatively, the difference metrics may be calculated with those patterns shown in Table 1 further classified according to their feature (which corresponds to Equation (4)) and the expected error rate may be calculated (which corresponds to Equation (8)). The patterns may be classified according to their feature such as the beginning and end of recording marks. For example, a recording mark left could be inappropriate and a non-linearly distorted read signal waveform might be detected. In that case, if the distributions shown in FIG. 15 are plotted for each and every pattern shown in Table 1, then some distributions could be non-normal distributions and other distributions could have their center significantly deviated as shown in FIG. 15(b). If such patterns were treated as a single group of patterns, then the correlation between the performance of the PRML signal processing (as represented by the bit error rate) and the signal index value obtained by Equation (13) might decrease. For that reason, the signal index value of the present invention can be calculated with those patterns further classified into smaller groups according to their feature. Likewise, as for the patterns shown in Tables 2 and 3, the signal index value of the present invention may also be calculated with those patterns further classified into smaller groups according to their feature.

As such a feature-by-feature pattern classification, the patterns shown in Table 2 may be classified into groups with isolated 2T marks and groups with isolated 2T spaces. Meanwhile, the patterns shown in Table 3 may be classified into groups with 2T marks followed by 2T spaces and groups with 2T spaces followed by 2T marks.

The patterns do not always have to be classified just as already described by way of illustrative examples. Alternatively, in Tables 1 to 3, the patterns could also be classified so as to have good correlation with the performance of the PRML signal processing (as represented by the bit error rate).

Methods for evaluating an information recording medium have been described as preferred embodiments of the present invention. Next, an apparatus for evaluating an information recording medium will be described.

In the foregoing description of preferred embodiments, an exemplary configuration for a read signal evaluating apparatus and the functions of its components have already been described with reference to FIG. 12. That is why the following description will be focused on a distinct operation of the read signal evaluating apparatus shown in FIG. 12, which is different from the apparatus that has already been described for those preferred embodiments of the present invention.

The signal evaluation index calculating section 10 shown in FIG. 12 includes a pattern detecting section for detecting any of the recording code patterns shown in Table 1 based on the binarized data that has been supplied from the PRML detecting section. That is to say, the signal evaluation index calculating section 10 includes a calculating section for defining the pattern detected by the pattern detecting section as a correct pattern and calculating a PR equalization ideal value associated with the correct pattern, an erroneous pattern that is similar to, but different from, the correct pattern, and a PR equalization ideal value associated with the erroneous pattern.

For example, supposing the correct pattern in Table 1 is (0, 0, 0, 0, 1, 1, 1, 0, 0), a PR equalization ideal value associated with that correct pattern becomes (1, 3, 5, 6, 5). On the other hand, supposing the erroneous pattern is (0, 0, 0, 0, 0, 1, 1, 0, 0), a PR equalization ideal value associated with that erroneous pattern becomes (0, 1, 3, 4, 4). In that case, the square of the Euclidean distance, which is the square of the difference between the PR equalization ideal values of the correct and erroneous patterns, becomes equal to 14. If the present invention can cope with signal processing in which the ideal value is not fixed as shown in those tables but in which those PR equalization ideal values are varied according to the read signal, the ideal values do not have to be fixed as in the tables but may be updated according to the read signal.

Next, the square of the difference between the read signal sequence and the PR equalization ideal value associated with the correct pattern is calculated and defined as PA. In the same way, the square of the difference between the read signal sequence and the PR equalization ideal value associated with the erroneous pattern is calculated and defined as PB. Then, their difference PA-PB is calculated. And this differential information is offset by the square (i.e., 14) of the difference between the PR equalization ideal values of the correct and erroneous patterns. The signal evaluation index calculating section 10 includes a computing section for making such calculations.

The patterns shown in Tables 2 and 3 are also processed in the same way as the ones shown in Table 1. Those processing steps are computation processing steps represented by Equations (4), (5) and (6). Furthermore, the signal evaluation index calculating section 10 shown in FIG. 12 further includes a number of detected patterns counter for detecting the frequencies of occurrence of the respective patterns shown in Tables 1, 2 and 3. The counter may be designed to increase its count by one every time any of the patterns shown in Table 1 is detected by the detecting section described above.

The optical disc controller 12 shown in FIG. 12 gets the values that have been detected and calculated by the signal evaluation index calculating section 10 by Equations (4), (5) and (6) and the numbers of patterns detected on the respective tables from the signal evaluation index calculating section 10, thereby calculating the probabilities. Specifically, the optical disc controller 12 calculates estimated error rates based on the variances of the respective groups of patterns by Equations (8), (9) and (10) described above, and then calculates, based on the bit error rate thus obtained, the signal index M by Equation (14).

However, the estimated error rates of the respective groups of patterns, calculated by Equations (8), (9) and (10), do not have to be calculated as described above. In the example described above, the bit error rate is estimated based on σ of the respective groups of patterns, the probabilities, and the weights of the numbers of errors. Alternatively, as disclosed in Patent Document No. 4 mentioned above, the number of times the difference metric value of a particular group of patterns exceeds a predetermined threshold value (which is SL in Patent Document No. 4) may be counted and the bit error rate may be estimated based on that number obtained. Hereinafter, a method for estimating the bit error rate of each group of patterns based on the difference metric value of that group according to a preferred embodiment of the present invention will be described.

Figure 20:
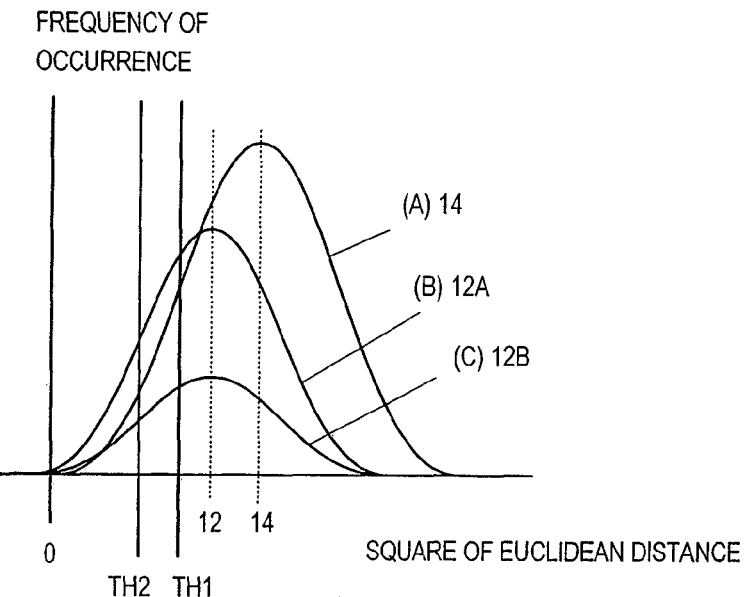
FIG. 20 shows relations between the distributions of difference metrics of the patterns with respective Euclidean distances according to the PR (1, 2, 2, 2, 1) ML method and predetermined threshold values in a preferred embodiment of the present invention.

FIG. 20 shows the distributions of the difference metrics, which have already been described with reference to FIG. 18, for the respective groups of patterns. Specifically, in FIG. 20, the curve (A) represents the distribution for the patterns, of which the square of the Euclidean distance is equal to 14 as shown in Table 1. The curve (B) represents the distribution for the patterns, of which the square of the Euclidean distance is equal to 12 as shown in Table 2. And the curve (C) represents the distribution for the patterns, of which the square of the Euclidean distance is equal to 12 as shown in Table 3.

The difference metric (Pa-Pb) is calculated, where Pb is the square of the distance between the detected pattern and the read signal and Pa is the square of the distance between an erroneous pattern, corresponding to the detected pattern, and the read signal. That is why the smaller the difference metric detected, the more likely the errors occur. That is to say, it means that the skirts of each distribution shown in FIG. 20, which is close to zero, have high probabilities of errors. In this case, the number of errors, of which the difference metric Pa-Pb becomes equal to or smaller than a predetermined value, is counted.

For example, the number of times the patterns, of which the square of the Euclidean distance is equal to 14 as represented by the curve (A) in FIG. 20, are detected is counted to obtain a count C14. Also, the number of times the difference metric Pa-Pb is equal to or smaller than TH (which may be seven that is a half of the square of the Euclidean distance) is counted to obtain a count TH14.

Likewise, the number of times the patterns, of which the square of the Euclidean distance is equal to 12 as represented by the curve (B) in FIG. 20, are detected is counted to obtain a count C12A. Also, the number of times the difference metric Pa−Pb is equal to or smaller than TH (which may be six that is a half of the square of the Euclidean distance) is counted to obtain a count TH12A.

Likewise, the number of times the patterns, of which the square of the Euclidean distance is equal to 12 as represented by the curve (C) in FIG. 20, are detected is counted to obtain a count C12B. Also, the number of times the difference metric Pa−Pb is equal to or smaller than TH is counted to obtain a count TH12B.

Then, the numbers of times the respective groups of patterns are detected and the numbers of times the predetermined threshold value is exceeded are obtained and the bit error rates are estimated for the respective groups of patterns.

For example, the rate of errors occurring in the group of patterns, of which the square of the Euclidean distance is equal to 14 as represented by the curve (A) in FIG. 20, is obtained by calculating the probability of exceeding a predetermined threshold value based on a result of calculation of TH/C. That is why supposing this is a normal distribution with an average of zero and a standard deviation of one, σ of the normal distribution can be obtained by calculating the inverse function of the standard normal cumulative distribution function. Furthermore, based on σ thus obtained, the probability that the curve (A) shown in FIG. 20 becomes equal to or smaller than zero can be obtained by using the standard normal cumulative distribution function. Furthermore, by multiplying together the probability (identified by $p_{14}$ in the example described above) of the group of patterns, of which the square of the Euclidean distance is equal to 14 as represented by the curve (A) in FIG. 20, and the number of error bits (which may be one in that pattern 14) based on the data quantity measured, the rate of errors that would occur in the group of patterns, of which the square of the Euclidean distance is 14, can be estimated.

Likewise, by multiplying together the probability (identified by $p_{12A}$ in the example described above) of the group of patterns, of which the square of the Euclidean distance is equal to 12 as represented by the curve (B) in FIG. 20, and the number of error bits (which may be two in that pattern 12A), the rate of errors that would occur in the group of patterns, of which the square of the Euclidean distance is 12, can be estimated.

In the same way, by multiplying together the probability (identified by $p_{12B}$ in the example described above) of the group of patterns, of which the square of the Euclidean distance is equal to 12 as represented by the curve (C) in FIG. 20, and the number of error bits (which may be three in that pattern 12B), the rate of errors that would occur in the group of patterns, of which the square of the Euclidean distance is 12, can be estimated.

Then, the respective bit error rates that have been obtained for these groups of patterns are added together, and σ is calculated inversely from those error rates and used as a signal index just as already described for the preferred embodiment of the present invention.

However, this is not a method for estimating an error rate based on σ that has been obtained by calculating the difference metric (Pa−Pb) but a method in which the number of times the difference metric calculated exceeds a predetermined threshold value is simply counted and the error rate is estimated based on that result. That is why compared to the method of estimating an error rate based on σ, this method would be affected more easily by various defects such as scratches and fingerprints. For that reason, some measure should be taken (e.g., the measuring range may be extended). As can be seen, such a method for estimating the rate of errors that would occur in each group of patterns is not limited to what has already been described for the preferred embodiment but may also be such a method. Naturally, any other appropriate method may be adopted instead of the two bit error estimating methods already described for the preferred embodiments.

In that case, the apparatus may be modified in the following manner. For example, a predetermined threshold value may be defined for the circuit that detects the difference metric in the signal evaluation index calculating section 10 shown in FIG. 12. And if the difference metric is equal to or smaller than the predetermined threshold value in each pattern, the count is increased.

Also, in the case of the patterns shown in Table 3 where 2Ts appear consecutively, the larger the number of 2Ts that appear consecutively, the larger the number of errors that would occur as described above. That is why a pattern evaluation index detecting section with an extension of Table 3 may be provided.

It should be noted that if the frequency of occurrence that the waveform to evaluate has a series of 2Ts that appear consecutively (which is at least four times) is much smaller than other patterns, then the extension of the Table 3 patterns detection range (i.e., the range in which the number of 2Ts that appear consecutively is detected) should be a problem for an evaluation index in most cases, even without consideration, and may be omitted from the beginning. In evaluating patterns in which a series of 2Ts appear quite often, however, the range in which the 2Ts appear consecutively should also be taken into consideration. As such a frequency of occurrence depends heavily on the evaluation pattern and the environment, the tables of patterns and circuits may be drawn up or designed with those parameters borne in mind.

Next, in calculating the error rate, a waveform at the same point in time could be counted as multiple evaluation values. Hereinafter, it will be described what will be the problem with such a situation and how to resolve such a problem. In the preferred embodiments described above, the patterns shown in Tables 1, 2 and 3 have been described as specific examples of patterns for evaluating the signal quality. However, Tables 1, 2 and 3 share some patterns in common, and therefore, a waveform at the same point in time may be counted as multiple evaluation values. Also, as the groups of evaluation patterns shown in Tables 1, 2 and 3 have different numbers of errors that would occur, a waveform at the same point in time would be evaluated with mutually different weights. That is why according to the signal quality, the evaluation values could not be calculated properly.

Hereinafter, the countermeasures to take in such a situation will be described by way of specific examples. FIGS. 21(a) and 21(b) show the ideal waveforms of erroneous patterns, corresponding to the correct pattern, in a situation where the binarized pattern decoded by the Viterbi decoder is a 2T isolated pattern of the first pattern (with a recording code 0, 0, 0, 0, 1, 1, 0, 0, 0, 0) shown in Table 2, and their binarized patterns, respectively.

Figure 21:
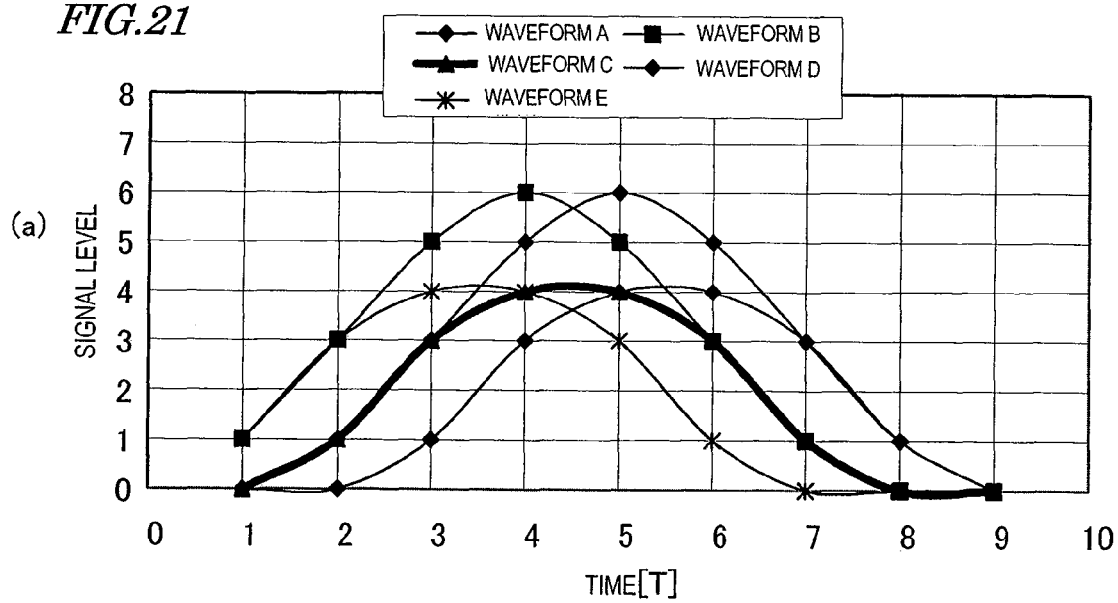
FIGS. 21(a) and 21(b) show examples of overlapping evaluation patterns in a preferred embodiment of the present invention.

The waveform C shown in FIG. 21 is the ideal waveform of the correct pattern. At a point in time of 7, the evaluation value described above can be obtained between the waveform B with the first pattern in Table 1 (with a recording code 0, 0, 0, 0, 1, 1, 1, 0, 0), which is a potential erroneous pattern, and the waveform C.

Likewise, at a point in time of 10, the evaluation value described above can be obtained between the waveform A with the seventh pattern in Table 1 (with a recording code 0, 0, 1, 1, 1, 0, 0, 0, 0), which is a potential erroneous pattern, and the waveform C.

In the same way, at the point in time of 10, the evaluation value described above can be obtained between the waveform D with the second pattern in Table 2 (with a recording code 0, 0, 0, 0, 0, 1, 1, 0, 0, 0, 0), which is a potential erroneous pattern, and the waveform C.

Likewise, at a point in time of 9, the evaluation value described above can be obtained between the waveform D with the first pattern in Table 2 (with a recording code 0, 0, 0, 0, 1, 1, 0, 0, 0, 0, 0), which is a potential erroneous pattern, and the waveform C (i.e., the waveform two points in time before the correct pattern in this case).

In this manner, sometimes a waveform at the same point in time may be counted to obtain multiple evaluation values. In this example, the waveform C (which is supposed to be the correct pattern) is compared to other waveforms for the following purposes. Specifically, the waveform C is compared to the waveform A to see if the isolated 2T could increase its length by 1T toward its rear end and be detected as 3T. The waveform C is compared to the waveform B to see if the isolated 2T could increase its length by 1T toward its front end and be detected as 3T. The waveform C is compared to the waveform D to see if the isolated 2T could shift backward by 2T along the time axis. And the waveform C is compared to the waveform E to see if the isolated 2T could shift forward by 2T along the time axis.

To avoid evaluating the waveform at the same point in time a number of times, only results of evaluation falling within a particular range are adopted as evaluation values and the rest of the results is excluded. As described above, supposing PB is the distance calculated between the expected value of the correct pattern and the signal and PA is the distance calculated between the expected value of the erroneous pattern, which is similar to, but different from, the correct pattern, and the signal in calculating the difference metric, the results are adopted as evaluation values only when PA-PB calculated is smaller than the ideal distance between PA and PB. On the other hand, if PA-PB is greater than the ideal distance between PA and PB, those results are excluded from the evaluation values. In this manner, the evaluation values can be calculated without redundancies.

For example, in the evaluation patterns shown in Table 1, the square of the ideal Euclidean distance is 14. That is why if PA-PB is equal to or smaller than 14, the results of evaluation are adopted as evaluation values. In the same way, in the evaluation patterns in Tables 2 and 3, the square of the ideal Euclidean distance is 12. That is why if PA-PB is equal to or smaller than 12, the results of evaluation are adopted as evaluation values.

This means using only a half of the distributions (A), (B) and (C) shown in FIG. 18, which is located on the left hand side of the points where the squares of the Euclidean distances are 14, 12 and 12, respectively (i.e., closer to zero). Even when the error rate is predicted based on σ of the difference metric, only that half on the left hand side (i.e., closer to zero) with respect to the squares of the ideal Euclidean distances of 14, 12 and 12 may be used. By performing such additional processing, the redundancies of evaluation patterns can be avoided. Instead, only portions where the ideal distance of the difference metric is so small that errors are actually likely to occur may be adopted as evaluation values. As a result, the signal evaluation values thus obtained will have a high degree of correlation with the error rate.

Nevertheless, if the method described above is applied to evaluation values, of which the squares of the Euclidean distances are 14 and 12, respectively (i.e., have different dimensions), it might be impossible to perfectly avoid evaluating the waveforms at the same point in time multiple times.

However, as long as the square of the ideal Euclidean distance remains the same, the waveforms at the same point in time will never be evaluated redundantly.

The points in time when the detection patterns are supposed to be detected as already described with reference to FIG. 21 are just examples. Thus, depending on the configuration of the circuits, those patterns could be detected at different timings. For example, if the circuits are designed so as to detect the particular patterns in Tables 1, 2 and 3 at the center of the time axis of those patterns, then the detection times will be different from the ones shown in FIG. 21. In the example shown in FIG. 21, the detection time is supposed to be timing to detect when potential merging paths will be fixed. The specific time when those paths are fixed is not limited to this example.

If the circuits, apparatus and program are designed to detect particular patterns shown in Tables 1, 2 and 3, then those patterns themselves do not always have to be detected. Alternatively, only portions of the patterns, other than the differential information thereof, may be retained to detect the particular patterns. Still alternatively, those particular patterns could be calculated, too. The method of detecting the particular patterns is not limited to what has already been described for the preferred embodiments of the present invention.

Optionally, the circuit for detecting the difference metric in the signal evaluation index calculating section 10 shown in FIG. 12 may also determine whether or not the difference metric value detected is greater than the ideal Euclidean distance. In that case, that circuit may be designed so as not to output the result of detection and the number of times of the detection (i.e., output zero) if the difference metric is greater than the ideal Euclidean distance.

These detection and computation processing steps do not have to be carried out just as described above but may be performed in any other way.

Hereinafter, an exemplary configuration for the signal evaluation index calculating section 10 shown in FIG. 12 and its operation will be described.

Figure 22:
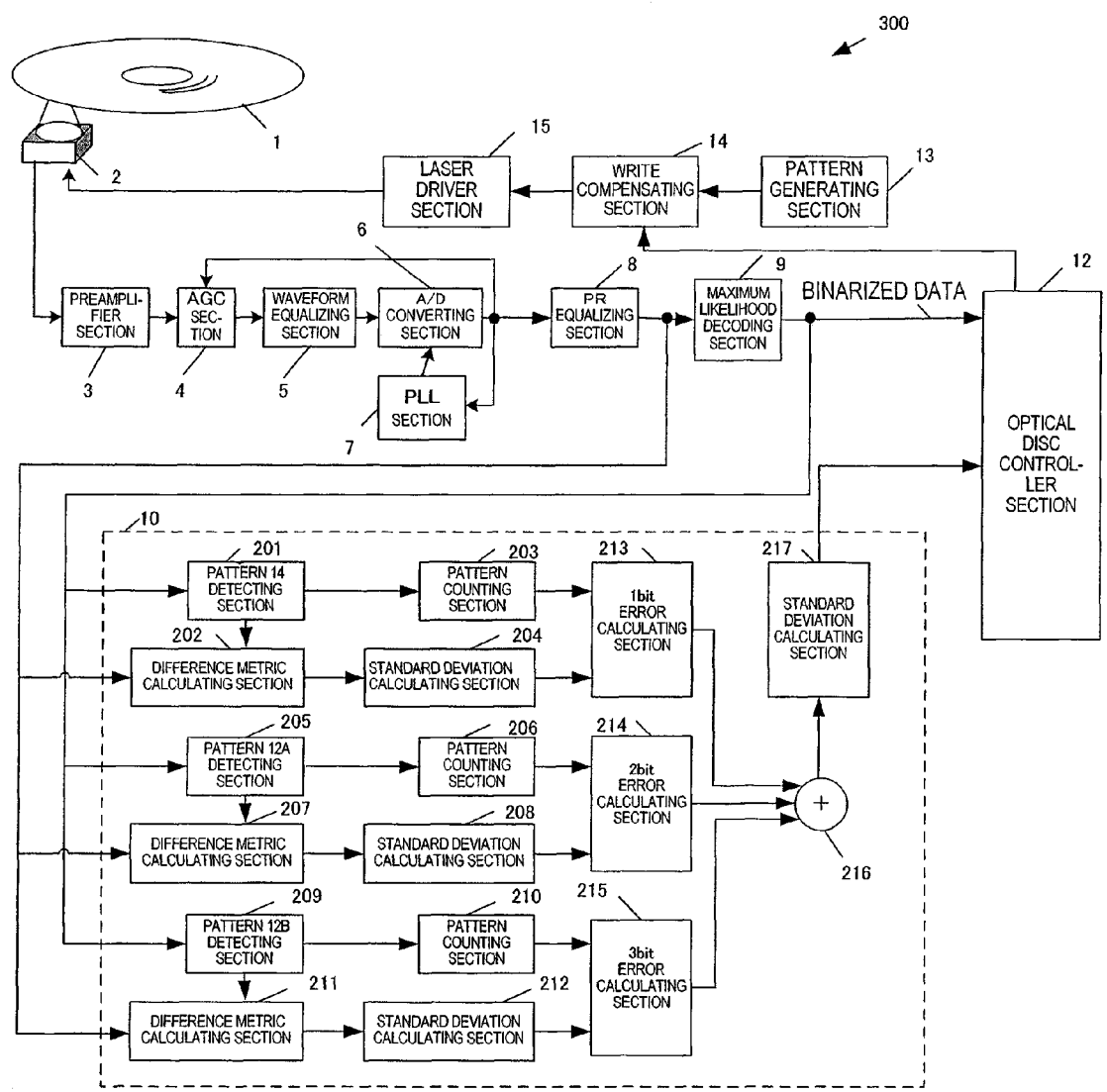
FIG. 22 illustrates an optical disc drive according to yet another preferred embodiment of the present invention.

FIG. 22 illustrates a signal evaluation index calculating section 10 for the optical disc drive 300 shown in FIG. 12. The apparatus shown in FIG. 22 is different from the counterpart shown in FIG. 12 in the configurations of the signal evaluation index calculating section 10, the selecting section 17 and the optical disc controller 12.

The Table 1 pattern evaluation index detecting section of the signal evaluation index calculating section 10 shown in FIG. 12 includes a pattern detecting section 201, a difference metric calculating section 202, a pattern counting section 203, a standard deviation calculating section 204 and an error calculating section 213 as shown in FIG. 22.

The Table 2 pattern evaluation index detecting section of the signal evaluation index calculating section 10 shown in FIG. 12 includes a pattern detecting section 205, a difference metric calculating section 207, a pattern counting section 206, a standard deviation calculating section 208 and an error calculating section 214 as shown in FIG. 22.

The Table 3 pattern evaluation index detecting section of the signal evaluation index calculating section 10 shown in FIG. 12 includes a pattern detecting section 209, a difference metric calculating section 211, a pattern counting section 210, a standard deviation calculating section 212 and an error calculating section 215 as shown in FIG. 22.

In the configuration shown in FIG. 12, the adding section 216 and the standard deviation calculating section 217 shown in FIG. 22 are included in the optical disc controller section 12.

Also, in the configuration shown in FIG. 12, the selecting section 17 may select either some or all of the error calculating sections 213, 214 and 215.

The information recording medium 1 is used to read and write information optically from/on it and may be an optical disc medium, for example. The optical disc drive 300 is a read/write system for reading and writing information from/on the given information recording medium 1 but may also be a read-only drive.

The optical disc drive 102 includes the optical head section 2, the preamplifier section 3, the AGC section 4, the waveform equalizing section 5, the A/D converting section 6, the PLL section 7, the PR equalizing section 8, the maximum likelihood decoding section 9, the signal evaluation index detecting section 10, the optical disc controller section 15, the pattern generating section 13, the write compensating section 14 and the laser driver section 15.

As shown in FIG. 22, the signal evaluation index detecting section 10 includes the pattern detecting sections 201, 205 and 209, the difference metric calculating sections 202, 207 and 211, the pattern counting sections 203, 206 and 210, the standard deviation calculating sections 204, 208 and 212, the error calculating sections 213, 214 and 215, the adding section 216 and the standard deviation calculating section 217.

The pattern detecting sections 201, 205 and 209 compare the transition data sequences shown in Tables 1, 2 and 3 to the binarized data. The difference metric calculating sections 202, 207 and 211 detect the metric differences associated with Tables 1 (consisting of "14" patterns), 2 (consisting of "12A" patterns) and 3 (consisting of "12B" patterns), respectively. The pattern counting sections 203, 206 and 210 detect the numbers of respective patterns. The calculating sections 204, 208 and 211 calculate the standard deviations σ of the respective outputs of the difference metric calculating sections. The error calculating sections 213, 214 and 215 calculate expected error rates based on the standard deviations of the respective patterns and the counts. The adding section 216 adds together all of the errors calculated. And the standard deviation calculating section 217 calculates a standard deviation based on the total error rate calculated.

The optical head section 2 converges a laser beam, which has been transmitted through an objective lens, on the recording layer of the information recording medium 1 and receives the light reflected from the medium 1, thereby generating an analog read signal representing information that is stored on the information recording medium 1. The objective lens preferably has a numerical aperture of 0.7 to 0.9, more preferably 0.85. The laser beam preferably has a wavelength of 410 nm or less, more preferably 405 nm. The preamplifier section 3 amplifies the analog read signal with a predetermined gain and outputs the amplified signal to the AGC section 4. In response, the AGC section 4 further amplifies the read signal with a preset target gain such that the read signal will have a constant level when output from the A/D converting section 6 and then passes the amplified signal to the waveform equalizing section 5.

The waveform equalizing section 5 functions as an LPF for cutting off the high frequency portion of the read signal and a filter for amplifying a predetermined frequency portion of the read signal, shapes the waveform of the read signal into a desired one, and then outputs such a read signal to the A/D converting section 6. The PLL circuit 7 generates a read clock signal, which is synchronized with the waveform-equalized read signal, and outputs it to the A/D converting section 6.

In response to the read clock signal supplied from the PLL circuit 7, the A/D converting section 6 samples the read signal, converts the analog read signal into a digital read signal and outputs it to the PR equalizing section 8, the PLL section 7 and the AGC section 4.

The PR equalizing section 8 such a frequency characteristic that was defined such that the read system has a frequency characteristic expected by the maximum likelihood decoding section 9 (such as PR (1, 2, 2, 2, 1) equalization characteristic). Specifically, the PR equalizing section 8 carries out PR equalization processing on the read signal by reducing the radio frequency noise thereof and by intentionally producing intersymbol interference, and then outputs the processed read signal to the maximum likelihood decoding section 9. Optionally, the PR equalizing section 8 may have a finite impulse response (FIR) filter configuration and may control tap coefficients adaptively by the least mean square (LMS) algorithm.

The maximum likelihood decoding section 9 may be a Viterbi decoder, for example, and uses a maximum likelihood decoding technique, which estimates the most likely sequence by the coding rule that has been added intentionally according to the type of the partial response, to decode the read signal that has been subjected to the PR equalization by the PR equalizing section 8 and output binarized data. This binarized data is output as demodulated binarized signal to the optical disc controller 12 on the next stage and then subjected to a predetermined type of processing, thereby reading the information that is stored on the information recording medium 1.

The signal evaluation index detecting section 10 receives the waveform-shaped digital read signal from the PR equalizing section 8 and the binarized signal from the maximum likelihood decoding section 9.

The pattern detecting sections 201, 205 and 209 compare the transition data sequences shown in Tables 1, 2 and 3 to the binarized data. When finding the binarized data agreeing with the transition data sequences shown in Tables 1, 2 and 3, the pattern detecting sections 201, 205 and 209 select the most likely transition sequence #1 and the second most likely transition sequence #2 by reference to Tables 1, 2 and 3. And based on the result of this selection, the difference metric calculating sections calculate the metrics, which are the distances between the ideal values of the transition sequences (i.e., the PR equalization ideal values shown in Tables 1 to 3) and the digital read signal, and also calculate the difference between the metrics thus obtained. The standard deviation calculating sections calculate the standard deviations σ representing the degrees of deviation of the difference between the metrics for the respective groups of patterns.

Each of the pattern counting sections 203, 206 and 210 counts the number of times of generation for its associated group of patterns shown in Table 1, 2 or 3. That is to say, each pattern counting section 203, 206 or 210 counts how many times the group of patterns shown in Table 1, 2 or 3 agrees with the binarized signal. This count will be used as the frequency of occurrence of each group of patterns when the error rate is calculated.

The error calculating sections 213, 214 and 215 calculate expected error rates based on the standard deviations of the difference metrics and the number of times of pattern generations. Thereafter, those error rates calculated are added together by the adding section 216, and then a standard deviation associated with that total error rate is calculated by the standard deviation calculating section 217. The standard deviation calculated by the standard deviation calculating section 217 is used as signal evaluation index for evaluating the quality of the read signal. And the optical disc controller section 12 evaluates the quality of the read signal using that signal evaluation index.

The specific calculating methods for use in these various types of processing have already been described using Equations (4) through (11), and the description thereof will be omitted herein. In short, the difference metric calculating sections 202, 207 and 211 perform the computations represented by Equations (4), (5) and (6), respectively, the error rate calculating sections 213, 214 and 215 perform the computations represented by Equations (8), (9) and (10), respectively, and the adding section 216 performs the computation represented by Equation (11).

And the standard deviation calculating section 217 converts the total error rate that has been calculated by Equation (11) into σ associated with that error rate.

Alternatively, the error rate may be normalized with the overall probability of respective groups of patterns by performing calculations inversely to Equation (7) and transformed into σ of the sample portion that has been detected to calculate the signal index.

As described above, the signal evaluation index can be calculated by using the circuit configuration shown in FIG. 22.

Hereinafter, a specific example of a signal evaluation method that uses the output value of the standard deviation calculating section 217 will be described.

Figure 24:
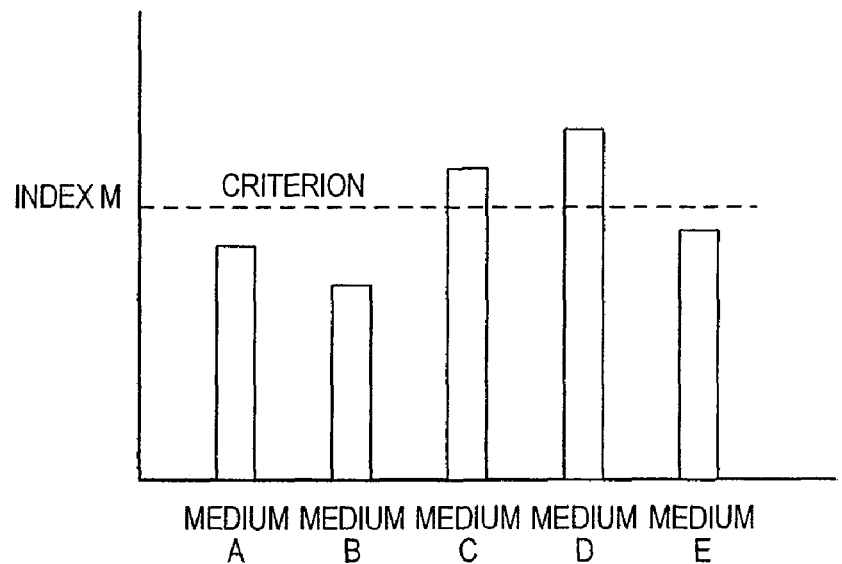
FIG. 24 shows the results of comparison that was carried out by calculating the signal evaluation indices of the present invention in a number of media with recording films having mutually different properties and then comparing them to each other.

First of all, the signal evaluating method of the present invention can be used effectively to rate the quality of a storage medium. FIG. 24 shows the results of comparison that was carried out by defining recording areas, in which a write operation was performed using the best recording parameters (including recording powers and write strategies), in a number of media with recording films having mutually different properties, calculating the signal evaluation indices thereof according to the method of the present invention, and then comparing the signal evaluation indices of those media to each other. In FIG. 24, the abscissa represents the types A through E of the media and the ordinate represents the signal evaluation index value (index M) according to the present invention.

According to the present invention, a technique for setting a predetermined criterion and defining the quality of a given medium such that a write operation can be performed on that medium with the index value kept equal to or smaller than that criterion may be adopted. For example, if the index M has a criterion of 11%, a medium on which a write operation can be performed so that the index value M becomes equal to or smaller than 11% can be determined to be a medium that achieves a predetermined quality. In the example shown in FIG. 24, Media C and D fail to satisfy the quality setting criterion (i.e., index M=11%) and may be determined to have bad qualities.

Optionally, such criteria for the index M may be defined for the respective layers of the information recording medium shown in FIG. 16. In an information recording medium with three recording layers, for example, the L0 recording layer may have a criterion of 10.5% or less, the L1 recording layer may have a criterion of 11.0% or less, and the L2 recording layer may have a criterion of 11.5% or less. In the exemplary multilayer information recording medium shown in FIG. 16, the more distant from the head a given recording layer is arranged, the narrower the maximum permissible margin the layer allows the tilt stress to be produced by the lens tilt of the head or the warp of the medium. That is why considering the margins of the respective recording layers, the more distant from the head the recording layer is, the better the basic signal quality thereof should be. It should be noted that these criteria are just examples. Optionally, every recording layer may have the same criterion on the supposition that no tilt stress is tolerated. In that case, the criterion may be set to 11.0%, for example.

Alternatively, the criteria may also be defined for the respective storage capacities of various information storage media. In the preferred embodiments described above, a situation where each recording layer has a storage capacity of 33.3 GB and a situation where each recording layer has a storage capacity of 31.0 GB have been described. For example, if each of the recording layers of a three-layer storage structure has a storage capacity of 33.3 GB, the respective recording layers L0, L1 and L2 may have criteria of 11.0%, 11.5% and 11.5%, respectively. Or if each of the recording layers of a four-layer storage structure has a storage capacity of 31.0 GB, the respective recording layers L0, L1, L2 and L3 may have criteria of 10.5%, 10.5%, 11.0% and 11.0%, respectively.

By defining such criteria for either respective recording layers or respective storage capacities as described above, standards for maintaining good qualities for information storage media can be set and the qualities that those various media should have can be defined appropriately. As a result, systems for reading and/or writing from/to information storage media can maintain a high degree of compatibility without expecting excessive high qualities from those information storage media. Consequently, the present invention provides a signal evaluation method that can reduce the costs of information storage media and achieve a high degree of compatibility for systems at the same time and also provides a method for defining their criteria.

Figure 25:
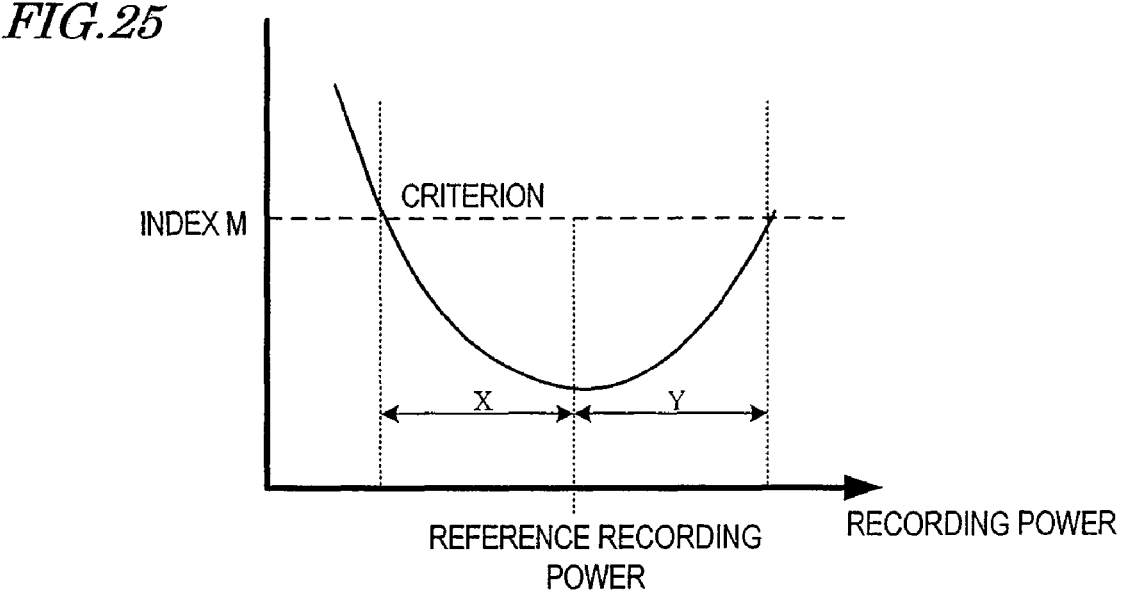
FIG. 25 shows the recording power margin with the signal evaluation indices according to a preferred embodiment of the present invention.

On top of that, the signal evaluation method of the present invention can also be used effectively to estimate the recording margin of an information recording medium. FIG. 25 shows the signal evaluation index values of the present invention that were calculated by performing a write operation on a particular information recording medium with the recording powers changed and reading data from the area on which the write operation had been performed.

By defining the best recording power to be the reference recording power and by detecting how much the recording power varied until a predetermined criterion was reached, the recording power margin of the information recording medium can be measured. For example, suppose the criterion of the index M is 15%, the magnitude of the variation (i.e., decrease) in recording power from that reference value to the smaller value associated with the criterion is x %, and the magnitude of the variation (i.e., increase) in recording power from that reference value to the greater value associated with the criterion is y %. In that case, an information recording medium, of which the x and y values are equal to or greater than their predetermined values, may be regarded as an information recording medium that satisfies a predetermined recording power margin. For example, x and y may be 15.0% and 10.0%, respectively, but may also be any other values as long as the costs of an information recording medium that satisfies such a criterion can be reduced and a high degree of system compatibility is achieved at the same time.

Furthermore, the signal evaluation method of the present invention can also be used effectively as a technique for searching for the best point of any of various servo parameters. FIG. 10 shows how to calculate the signal evaluation index value of the present invention with the focus parameters changed. In FIG. 10, by selecting a focus parameter setting that minimizes the index M, the best focus parameter setting can be determined for a transmission line for processing a read signal. In this manner, by selecting such a servo parameter that minimizes the index M, the best setting for the read signal transmission line can be determined. Examples of servo parameters include tilt parameters and spherical aberration parameters.

Figure 23:
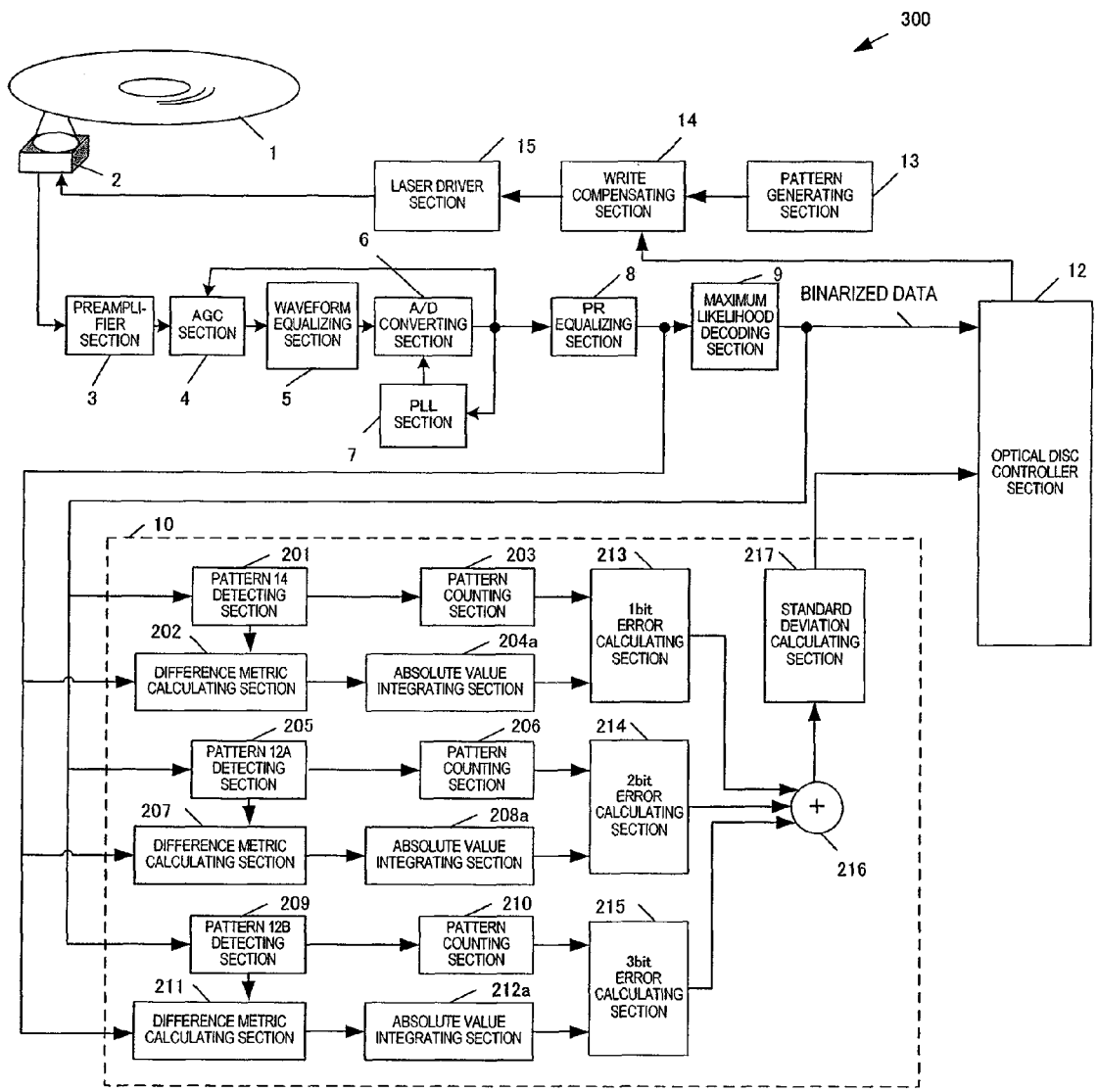
FIG. 23 illustrates an optical disc drive according to yet another preferred embodiment of the present invention.

It should be noted that if the variance of the difference metric values that have been output from the difference metric calculating sections 202, 207 and 211 is close to that of a normal distribution, the circuit could be further simplified. An exemplary configuration in such a situation is shown in FIG. 23. To obtain a standard deviation by means of electric circuits, the size of the circuits should be increased. On the other hand, to obtain a standard deviation by means of programs, the complexity of the processing would increase so much as to make the overall processing rate significantly lower.

In the configuration shown in FIG. 23, the standard deviation calculating sections 204, 208 and 210 shown in FIG. 22 are replaced with absolute value integrating sections 204a, 208a and 210a, respectively. Each of the absolute value integrating sections 204a, 208a and 210a adds together the absolute values of the outputs of its associated difference metric calculating section 202, 207 or 211. Thereafter, the absolute value integrating section 204a, 208a or 210a divides the integral by the count of its associated pattern counting section 203, 206 or 210, thereby working out the average of the absolute values of the difference metrics. Generally speaking, supposing the standard deviation σ has a Gaussian distribution, σ is usually the product of the average m of the absolute values and a predetermined coefficient (σ≈1.253m). Based on such a relationship, σ may be obtained from the average of the absolute values and the error calculating sections 213, 214 and 215 may calculate the error rate using that σ. In this manner, the configuration shown in FIG. 23 can cut down the standard deviation calculating processing compared to the one shown in FIG. 22 and the circuit size can be reduced.

If the error function calculation imposes a heavy load on the hardware and the CPU's computation processing, then a conversion table for bit error rates and the signal indices M such as the following Table 6 may also be used. The accuracy of computation may be optimized as needed.

TABLE 6

| bit error rates | ⇔ | signal indices M |
|---|---|---|
| ... | | |
| 1.25E−10 | | 8.0 |
| 2.05E−10 | ⇔ | 8.1 |
| 3.28E−10 | ⇔ | 8.2 |
| 5.19E−10 | ⇔ | 8.3 |
| 8.06E−10 | ⇔ | 8.4 |
| 1.23E−09 | ⇔ | 8.5 |
| 1.86E−09 | ⇔ | 8.6 |
| ... | | |
| 1.08E−04 | ⇔ | 14.0 |
| 1.19E−04 | ⇔ | 14.1 |
| 1.31E−04 | ⇔ | 14.2 |
| 1.44E−04 | ⇔ | 14.3 |
| 1.57E−04 | ⇔ | 14.4 |
| 1.72E−04 | ⇔ | 14.5 |
| 1.88E−04 | ⇔ | 14.6 |
| 2.05E−04 | ⇔ | 14.7 |
| ... | | |

In this manner, by providing a signal evaluation index for a single parameter that is correlated to a bit error rate, the storage medium can be defined more easily. In addition, by providing an index that is similar to jitter, compatibility with conventional evaluation methods can be ensured easily. Also, as already described with reference to FIG. 15, by using signal indices that have been separated into an edge shift component and an SN component on a Euclidean distance basis in the PR 12221 ML method, the deviation of the recording power parameter and that of the write strategy parameter can be detected quantitatively. As a result, the parameters can be optimized more easily. In the example described above, the square of the Euclidean distance is supposed to be 14. However, the method of the present invention is naturally applicable to the patterns shown in Tables 2 and 3, of which the square of the Euclidean distance is 12. The patterns shown in those Tables 2 and 3 always include 2T marks and/or 2T spaces. As shown in FIG. 15, by separating the edge shift component and the SN component from each other, the influence of portions before and after a 2T mark can be quantized and parameters associated with 2T can be evaluated and optimized effectively.

The present invention has been described as being applied to the PR 12221 ML technique. However, the present invention is in no way limited to this specific type of PR but is applicable to any other type of PR.

Hereinafter, an optical disc according to the present invention will be described in terms of its storage density, among other things.

Figure 26:
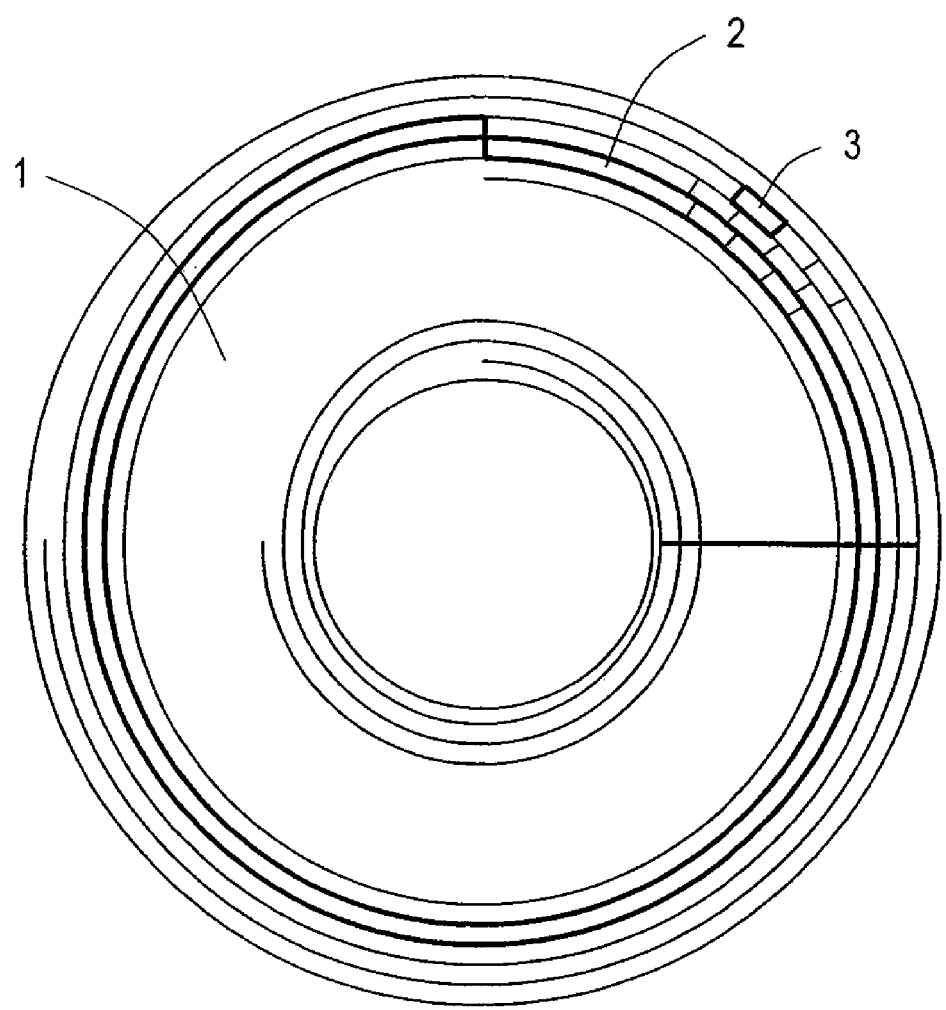
FIG. 26 illustrates the physical structure of an optical disc according to a preferred embodiment of the present invention.

FIG. 26 illustrates the physical structure of an optical disc 1. On the disklike optical disc 1, a lot of tracks 2 are arranged either concentrically or spirally. And each of those tracks 2 is subdivided into a lot of sectors. As will be described later, data is supposed to be written on each of those tracks 2 on the basis of a block 3 of a predetermined size.

In this optical disc 1, each information recording layer has an increased storage capacity compared to a conventional optical disc (such as a BD, of which each information recording layer has a capacity of 25 GB). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule).

The optical disc 1 may have multiple information recording layers. In the following description, however, only one information recording layer thereof will be described for convenience sake.

In a situation where there are multiple information recording layers in the same optical disc, even if the tracks have the same width between the respective information recording layers, the storage linear densities could also be different from one layer to another by uniformly varying the mark lengths on a layer-by-layer basis.

Each track 2 is divided into a lot of blocks every 64 kB (kilobytes), which is the data storage unit. And those blocks are given sequential block addresses. Each of those blocks is subdivided into three subblocks, each having a predetermined length. The three subblocks are assigned subblock numbers of 0, 1 and 2 in this order.

Next, the storage density will be described with reference to FIG. 27.

FIG. 27(A) illustrates an example of a BD with a storage capacity of 25 GB. For this BD, the laser beam 123 should have a waveform of 405 nm and the objective lens 220 should have a numerical aperture (NA) of 0.85.

As in a DVD, the data that has been written on this BD is stored as a sequence of marks 120 and 121, representing a physical variation, on the tracks 2 of the optical disc. The shortest one of those marks in the sequence will be referred to herein as the "shortest mark". In the example illustrated in FIG. 27(A), the mark 121 is the shortest mark.

If the storage capacity is 25 GB, the shortest mark 121 has a physical length of 0.149 µm, which is approximately 1/2.7 of that of a DVD. And such a length is rather close to the limit of optical resolution (i.e., the limit over which a light beam can recognize a recording mark) even if the resolution of the laser beam is increased by changing the wavelength parameter (e.g., 405 nm in this example) of the optical system and the NA parameter (e.g., 0.85 in this example).

The storage capacities have been described with reference to FIGS. 13 and 14. However, the storage linear density that an optical disc with a high storage density as shown in FIG. 27(B) is supposed to have could be achieved both in a situation where the frequency of the shortest marks in the read signal is in the vicinity of an OTF cutoff frequency (including a situation where that frequency is lower than, but not significantly lower than, the OTF cutoff frequency) and a situation where that frequency is equal to or higher than the OTF cutoff frequency.

If the frequency of the shortest marks in the read signal is in the vicinity of the OTF cutoff frequency, the storage capacities could be approximately equal to or higher than 29 GB (such as 29 GB±0.5 GB or 29 GB±1 GB), approximately equal to or higher than 30 GB (such as 30 GB±0.5 GB or 30 GB±1 GB), approximately equal to or higher than 31 GB (such as 31 GB±0.5 GB or 31 GB±1 GB), or approximately equal to or higher than 32 GB (such as 32 GB±0.5 GB or 32 GB±1 GB).

On the other hand, if the frequency of the shortest marks in the read signal is equal to or higher than the OTF cutoff frequency, the storage capacities could be approximately equal to or higher than 32 GB (such as 32 GB±0.5 GB or 32 GB±1 GB), approximately equal to or higher than a 33 GB (such as 33 GB±0.5 GB or 33 GB±1 GB), approximately equal to or higher than 33.3 GB (such as 33.3 GB±0.5 GB or 33.3 GB±1 GB), approximately equal to or higher than 34 GB (such as 34 GB±0.5 GB or 34 GB±1 GB) or approximately equal to or higher than 35 GB (such as 35 GB±0.5 GB or 35 GB±1 GB).

In this case, if the storage density of each information recording layer is 33.3 GB, an overall storage capacity of approximately 100 GB (more exactly, 99.9 GB) is realized by the three recording layers combined. On the other hand, if the storage density of each information recording layer is 33.4 GB, an overall storage capacity that is more than 100 GB (more exactly, 100.2 GB) is realized by the three recording layers combined. Such a storage capacity is equivalent to the capacity in a situation where four recording layers, each having a storage density of 25 GB, are provided for a single BD. However, if the number of recording layers in a single disc were increased, the read signal would have decreased amplitude (or a decreased SNR) in each of those recording layers and would be affected by stray light from multiple layers (i.e., interfering signals from adjacent recording layers). That is why by setting the storage density to be equal to or higher than approximately 33.3 GB, the degrees of such influence can be reduced and an overall storage capacity of approximately 100 GB or more is realized by an even smaller number of layers.

Figure 28:
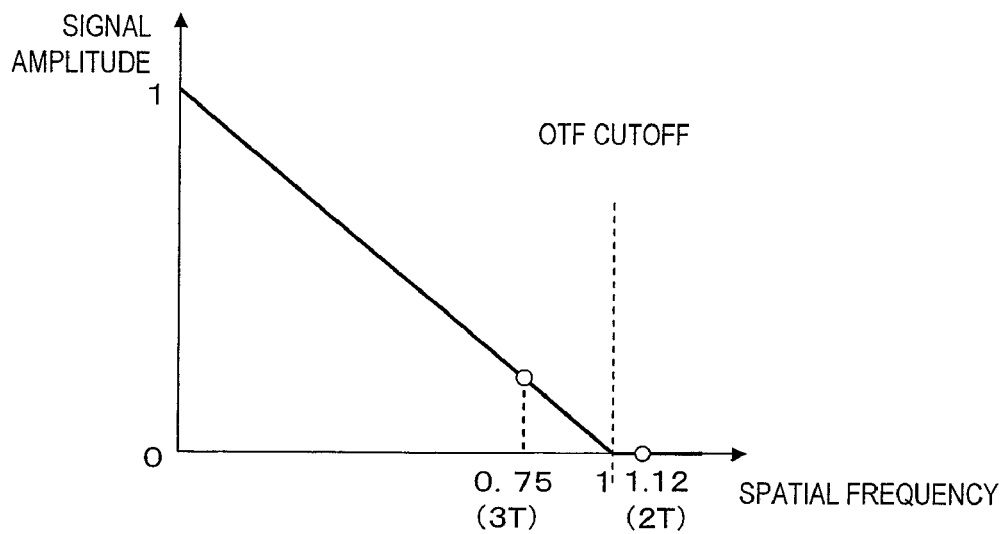
FIG. 28 shows an example in which the spatial frequency of the shortest mark (2T) is higher than the OTF cutoff frequency and in which the 2T read signal has zero amplitude.

FIG. 28 shows an example in which the shortest marks (2T) have a higher spatial frequency than the OTF cutoff frequency and in which the 2T read signal has an amplitude of zero. Specifically, in this example, the spatial frequency of the shortest mark length 2T is 1.12 times as high as the OTF cutoff frequency.

Also, in Disc B with a high storage density, the wavelength, the numerical aperture and the mark/space lengths satisfy the following relation.

Supposing the shortest mark length is TM nm and the shortest space length is TS nm, the sum P of the shortest mark length and the shortest space length is TM+TS nm. In the case of 17 modulation, P=2T+2T=4T. Using the three parameters of the wavelength λ of the laser beam (which is 405 nm+5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation), if the unit length T decreases to the point that $P \leq \lambda/2NA$ is satisfied, then the OTF cutoff frequency is exceeded.

If NA=0.85 and λ=405, then the unit length T corresponding to the OTF cutoff frequency becomes:

$T = 405/(2 \times 0.85)/4 = 59.558$ nm

Conversely, if $P > \lambda/2NA$ is satisfied, then the spatial frequency becomes lower than the OTF cutoff frequency.

In the foregoing description, the storage density obtained by comparing the frequency of the read signal representing the shortest mark to the OTF cutoff frequency has been described. However, if the storage density is further increased, then the storage density (and the storage linear density and the storage capacity) can be defined based on the same principle as the one described above by reference to the relation between the frequency of the read signal representing the second shortest mark (or the third shortest mark or an even shorter recording mark) and the OTF cutoff frequency.

Next, the structure of the optical disc 400 of this preferred embodiment will be described in detail with reference to FIG. 29.

Figure 29:
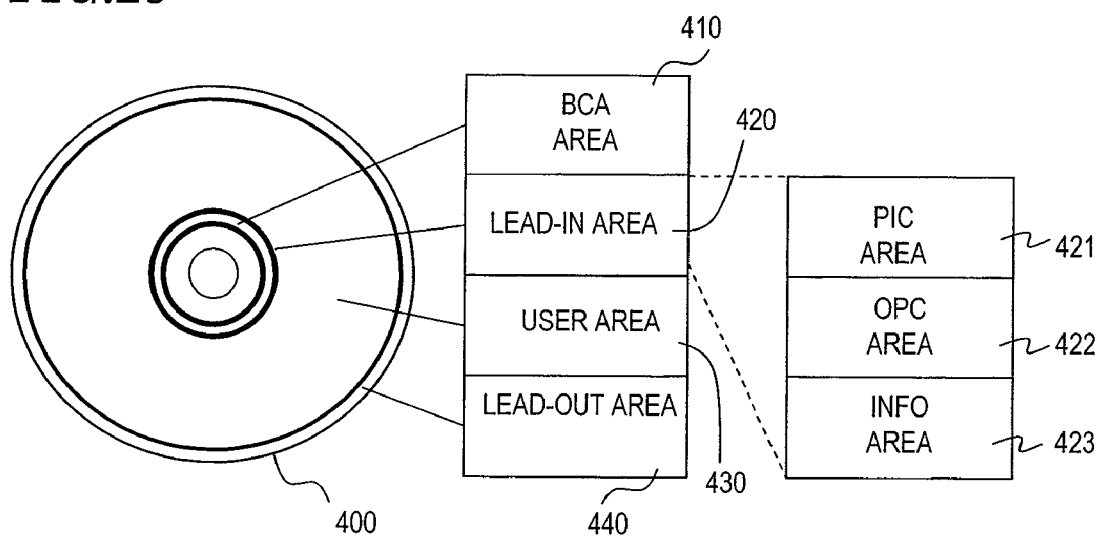
FIG. 29 shows the arrangements of respective areas on an optical disc.

FIG. 29 illustrates the arrangement of respective areas on the optical disc 400. The optical disc 400 has an information recording layer. By forming recording marks on the information recording layer, data is written on the optical disc 400. Tracks are arranged concentrically on the optical disc 400.

The optical disc 400 has a BCA (burst cutting area) 410, a lead-in area 420, a user area 430 and a lead-out area 440.

In the BCA 410, a barcode signal is stored in advance. That signal represents a serial number to identify the medium on a disc by disc basis, copyright information, and disc property information. That disc property information includes pieces of information indicating the number of information recording layers included and the address management method to take. Examples of the disc property information include information representing the number itself of the information recording layers included, information about a predetermined number of bits representing the number of recordable layers, and information about the storage density. And examples of the information about the storage density include information representing the storage capacity of the optical disc and information representing the channel bit length (or storage linear density).

In a read-only disc, those pieces of information about the storage density may be stored in the BCA area and/or inside the stored data (or uneven pits). In the latter case, those pieces of information may be stored as a data address to be added to data. On the other hand, in write-once and rewritable discs, those pieces of information about the storage density may be stored in the BCA area and/or the PIC area and/or the wobble. In the last case, those pieces of information may be stored as auxiliary information to be superposed on the wobble.

The user area 430 is designed so as to allow the user to write his or her data thereon. That is to say, user data is written on the user area 430. The user data may include audio data and visual (video) data, for example.

Unlike the user area 430, the lead-in area 420 is not designed to allow the user to write his or her data there. The lead-in area 420 includes a PIC (permanent information and control data) area 421, an OPC (optimum power calibration) area 422 and an INFO area 423.

The PIC area 421 contains disc property information, which includes pieces of information indicating the number of information recording layers and the address management method to take and access parameters. Examples of the access parameters include a parameter about the recording power of a laser beam that is used to make recording marks on the optical disc 400 and to erase them and a parameter about the widths of write pulses to leave the recording marks.

In the preferred embodiment described above, the disc property information is supposed to be stored in both of the BCA area 410 and the PIC area 421. However, this is just an example and never limits the scope of the present invention. Alternatively, the disc property information may be stored in one of the BCA area, the PIC area, inside the stored data and the wobble or in any two of these in combination. It should be noted that if the same piece of disc property information is stored in multiple locations separately, then that information can be read from any of those locations. As a result, the reliability of the disc property information can be maintained. Also, even if the type of the given optical disc is unknown but if the disc property information is stored in any of those areas that have already been located, then the optical disc drive can see the number of information recording layers included in that disc and other properties.

If there are multiple information recording layers, the information recording layer in which the disc property information is stored (i.e., the reference layer) may be the farthest layer from the optical head, i.e., the deepest layer as measured from the surface on which the incoming laser beam impinges.

To ensure compatibility with other past drives that can handle only BDs, the disc property information stored in that reference layer preferably has its track address formats changed on a storage linear density basis to obviate the need of modifying the old disc property information.

Hereinafter, this point will be described in further detail with reference to FIG. 30. Portion (1) of FIG. 30 shows the structure of the information recording layer in Disc A with a conventional storage density and in Disc B with a higher storage density. On the other hand, portions (2) and (3) of FIG. 30 show the specific makeup of the respective lead-in areas 420 of Discs A and B, respectively.

Portion (1) of FIG. 30 shows the information recording layer of an optical disc, in which a clamp area 425, a BCA area 410, a lead-in area 420, and a user data area 430 are arranged in this order from the inner edge (i.e., the end of the paper on the left-hand side) toward the outer edge of the optical disc.

Portion (2) of FIG. 30 shows the specific arrangements of respective areas in the lead-in area 420 on the reference layer of Disc A. Specifically, the PIC area 421 has a predetermined radial distance A as measured from a radial location of 22.2 mm. On the other hand, portion (3) of FIG. 30 shows the specific arrangements of respective areas in the lead-in area 420 on the reference layer of Disc B. Specifically, the PIC area 421 has a predetermined radial distance B as measured from a radial location of 22.2 mm. These discs A and B are characterized in that the radial distances A and B of the PIC areas 421 of Discs A and B are equal to each other.

If information is stored in the PIC area 421 of Disc B by simply increasing the storage linear density, then the channel bit length will become shorter, and therefore, the PIC area 421 could have a shorter radial distance B. However, the PIC area 421 of Disc B stores important information to access the disc and should be able to be scanned securely. For example, if the PIC area 421 had a shorter radial distance, an optical disc drive for reading information from the PIC area 421 with an optical head mechanically moved precisely to a predetermined location might be unable to scan the PIC area 421 anymore. That is why to maintain low-order compatibility with such drives, the radial distance B is preferably equal to the radial distance A.

These radial distances B and A could be made equal to each other by one of the following two methods. One method is to perform a write operation on the PIC area of Disc B with the storage linear density of Disc A, not its own storage linear density. In that case, the storage linear density could vary from one location to another even within the same lead-in area. The other method is to increase the number of times the same information is written repeatedly on the PIC area with the storage linear density of Disc B. Since the information to be written in the PIC area is important information, that information is written a number of times to ensure reliability. In that case, by increasing the number of times of repetition from five times to seven times, for example, so that the storage linear density increases, the radial distance B can be substantially equal to the radial distance A of conventional discs.

The OPC area 422 is an area to read test data from, or write it on. To read or write the test data, the optical disc drive that is going to access the optical disc 400 adjusts access parameters such as the recording power and the pulse width.

On the INFO area 423, written are the management information of the user area 430 and the data to make defect management on the user area 430 so that an apparatus that is going to access the optical disc 400 can use them.

The multilayer storage medium that has been described with reference to FIG. 16 will be further described complementarily. Before the disc property information is recognized, the optical disc drive may perform focus and tracking operations on a different layer from the reference layer and may read address information from it. In that case, the layer information and block address information could be arranged differently on that another layer, and therefore, the addresses could be read erroneously. To avoid such a situation, the intermediate layer between the reference layer and that another layer may be thicker than an intermediate layer between any other pair of layers so that those layers are not recognized by mistake. For example, in a dual-layer BD, the L0 layer that is its reference layer is located at a depth of approximately 100 μm as viewed from the source of the laser beam, while the L1 layer is located at a depth of approximately 75 μm. According to the present invention, to prevent the laser beam from finding a focus on the L1 layer by mistake, any other recording layer that should be located closer to the source of the laser beam than the L1 layer is may be arranged at a depth of less than 75 μm. For example, the L1 layer could be located at a depth of 70 μm. However, if the intermediate layer between the reference layer and the L1 layer had an excessive width (i.e., were too thick), then it would be difficult to make intermediate layers for the L2 and other recording layers thick enough. That is why an adequate balance should be struck so that the focus would not be found on the L1 layer by mistake and yet the other intermediate layers could be thick enough.

Next, physical and logical formats and recording methods for BDs will be described in further detail.

Examples of BDs include BD-Rs on which information can be written only once (write-once Blu-ray Discs), BD-REs on which information can be rewritten a number of times (rewritable Blu-ray Discs), and BD-ROMs from which information can be just read (read-only Blu-ray Discs). Main optical constants and physical formats for Blu-ray Discs are disclosed in "Illustrated Blu-ray Disc Reader" (published by Ohmsha, Ltd.) and on White Paper at the website of the Blu-ray Disc Association (http://www.blu-raydisc.com), for example.

Main Parameters

Specifically, as for BDs, an objective lens for a laser beam with a wavelength of 405 nm (which may fall within the range of 400 nm to 410 nm supposing the tolerance of errors is +5 nm) and with an NA of 0.85 (which may fall within the range of 0.84 to 0.86 supposing the tolerance of errors is ±0.01) is used. A BD has a track pitch of 0.32 μm and has one or two recording layers. A BD has a single-sided single-layer or a single-sided dual-layer structure on the laser beam incoming side, and its storage plane or recording layer is located at a depth of 75 μm to 100 μm as measured from the surface of the protective coating of the BD.

A write signal is supposed to be modulated by 17PP modulation technique. Recording marks are supposed to have the shortest mark length of 0.149 μm (which is the length of a 2T mark), i.e., a channel bit length T of 74.50 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (i.e., a channel bit rate of 66.000 Mbit/s) at a standard transfer rate (BD 1×), 264 MHz (i.e., a channel bit rate of 264.000 Mbit/s) at 4× transfer rate (BD 4×), 396 MHz (i.e., a channel bit rate of 396.000 Mbit/s) at 6× transfer rate (BD 6×) and 528 MHz (i.e., a channel bit rate of 528.000 Mbit/s) at 8× transfer rate (BD 8×). And the standard linear velocity (which will also be referred to herein as "reference linear velocity" or 1×) is supposed to be 4.917 m/sec.

The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

Protective Coating

As for the thickness of the protective coating (cover layer), to minimize the influence of spot distortion due to either a decrease in focal length with an increase in numerical aperture or the tilt, the protective coating may have its thickness reduced. For example, if the medium has an overall thickness of approximately 1.2 mm, the protective coating may have a thickness of 10 μm to 200 μm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm. If the disc has three or more recording layers, the protective coating and/or the spacer layer will be even thinner.

Multilayer Structure

For example, supposing the optical disc is a single-sided disc, from/on which information is read and/or written by having a laser beam incident on the protective coating side, if two or more recording layers need to be provided, then there will be multiple recording layers between the substrate and the protective coating. In that case, the multilayer structure may be defined as follows. Specifically, a reference layer L0 may be arranged at the deepest level that is located at a predetermined depth from the light incoming surface. Multiple recording layers L1, L2, ... and Ln may be stacked one upon the other from over the reference layer toward the light incoming surface. And the depth of the reference layer as measured from the light incoming surface in the multi-layer disc may be equal to the depth (e.g., approximately 0.1 mm) of the only recording layer of a single-layer disc as measured from the light incoming surface. If the depth of the deepest layer is always the same irrespective of the number of recording layers stacked, compatibility can be ensured in accessing the reference layer. In addition, even if the number of recording layers stacked increases, the influence of tilt will not increase. This is because although the deepest layer is affected by tilt most, the depth of the deepest layer does not increase in this case even if the number of recording layers stacked is increased.

Raised portion to Prevent Protective Coating from Getting Scratched

Optionally, the optical information recording medium may have the following raised portion. As for a Blu-ray Disc, for example, its protective coating has a thickness of 100 μm if it is a single-layer disc and a thickness of 75 μm if it is a dual-layer disc. To prevent such a thin protective coating from getting scratched, a raised portion may be provided inside or outside of the clamp area. For example, particularly if such a raised portion is arranged inside of the clamp area, the protective coating will not get scratched. On top of that, since the raised portion is located near the center hole of the disc, the load to be imposed on the rotating spindle (motor) in order to balance the weight of the raised portion can be reduced and potential collision against the optical head can be avoided as well. The collision between the raised portion and the optical head can be avoided by arranging the raised portion inside of the clamp area because the optical head accesses the information recording area that is located outside of the clamp area.

If the clamp area is arranged inside, the clamp area may be located at the following position on a disc with an outside diameter of 120 mm. Supposing the center hole has a diameter of 15 mm and the clamp area covers the range from 23 mm through 33 mm in diameter, the raised portion will be arranged between the center hole and the clamp area, i.e., in the range of 15 mm to 23 mm in diameter. In that case, the raised portion may be located at some distance from the center hole (e.g., at a distance of 0.1 mm or more (and/or 0.125 mm or less) from the peripheral edge of the center hole). The raised portion may also be located at some distance from the clamp area (e.g., at a distance of 0.1 mm or more (and/or 0.2 mm or less) from the inner edge of the clamp area).

And the raised portion may also be located at some distances from both the peripheral edge of the center hole and the inner edge of the clamp area. Specifically, the raised portion may be arranged in the range of 17.5 mm to 21.0 mm in diameter, for example. The height of the raised portion may be determined so as to strike an adequate balance between an expected degree of protection of the protective coating from scratches and the readiness to lift and remove the disc. However, if the raised portion were too high, then another problem could arise. For that reason, the raised portion may have a height of 0.12 mm or less as measured from the surface of the clamp area.

Scanning Direction

As for the scanning direction or beam spot moving direction, the optical disc may be either a parallel path type or an opposite path type. In a disc of the parallel path type, the data area is scanned in the same direction on every layer, i.e., from the innermost area toward the outermost area or vice versa. On the other hand, in a disc of the opposite path type, the scanning directions are changed into the opposite one every time the layers to scan are changed. For example, if the reference layer L0 is scanned from the innermost area toward the outermost area (which direction will be simply referred to herein as "outward"), then the L1 layer is scanned from outermost area toward the innermost area (which direction will be simply referred to herein as "inward"), the L2 layer is scanned outward, and so forth. That is to say, the Lm layer (where m is either zero or an even number) may be scanned outward and the Lm+1 layer may be scanned inward. Conversely, the Lm layer (where m is either zero or an even number) may be scanned inward and the Lm+1 layer may be scanned outward.

Modulation Technique

In writing data (which may be original source data or binary data yet to be modulated) on a storage medium, the data is divided into multiple sections of a predetermined size, each of those data sections of the predetermined size is further divided into a number of frames having a predetermined length, and then a predetermined sync code and/or sync code sequence is/are inserted into each frame (in a frame sync area). Then, the data that has been subdivided into those frames is written as a data code sequence that has been modulated following a predetermined modulation rule that matches the read/write signal characteristic of the storage medium (in a frame data area).

In this case, the modulation rule may be RLL (run length limited) coding technique that limits the mark length, for example. If the RLL coding technique is represented as RLL (d, k), where d and k are natural numbers that satisfy d<k, it means that the minimum number of zeros appearing between two ones is equal to d and the maximum number thereof is k. For example, where d=1 and k=7 and if T represents one reference modulation cycle, the recording marks and spaces will have the shortest length of 2T and the longest length of 8T. Optionally, this RLL (1, 7) modulation technique may also be modified into 1-7 PP modulation technique with the following features [1] and [2] introduced. In 1-7 PP, PP is the acronym of Parity preserve/Prohibit repeated minimum transition length. Specifically, the feature [1] lies in "Parity preserve", representing the first P, which means that the parity of the number of source data bits "1" yet to be modulated agrees with that of the number of ones of the modulated bit pattern. The second feature [2] is determined by the latter P (i.e., Prohibit repeated minimum transition length), which refers to a scheme for limiting the number of times of repetition of the shortest marks and spaces on a modulated write waveform. For example, the number of times of repetition of 2T may be defined to be at most six times.

Frame Sync

The predetermined modulation rule described above does not apply to the sync code/sync code sequence to be inserted between frames. That is why the sync code may have a pattern that has a different code length from the one defined by the modulation rule. This sync code/sync code sequence determines the timing of read processing when the written data is read, and therefore, may have the following pattern.

To distinguish the sync code from the data code sequence more easily, the sync code may have a unique pattern that never appears in the data code sequence. For example, the sync code may have marks or spaces that are even longer than the longest marks or spaces in the data code sequence or an alternation of such marks and spaces. In the 1-7 modulation technique, the lengths of marks and spaces are limited to 2T through 8T. Thus, the sync code may include marks or spaces with a length of 9T or more that is longer than 8T (i.e., 9TM and/or 9TS) or an alternation of 9T marks and 9T spaces (i.e., 9T/9T).

To get the phase locking process done more easily, a pattern with a lot of zero cross points may be included. For example, the sync code may include relatively short ones of the marks and spaces in the data code sequence or an alternation of such marks and spaces. When the 1-7 modulation technique is adopted, the sync code may include the shortest 2T marks or spaces (i.e., 2TM and/or 2TS), an alternation of 2T marks and 2T spaces, (i.e., 2T/2T), the next shortest 3T marks or spaces (i.e., 3TM and/or 3TS), or an alternation of 3T marks and 3T spaces, (i.e., 3T/3T).

Intersymbol Distance in Frame Sync

Suppose an area including such a sync code sequence and a data code sequence will be referred to as a "frame area" and a unit including a number of (e.g., 31) such frame areas as a "sector" or "address unit". In that case, the intersymbol distance between the sync code sequence included in a certain frame area of one sector and the one included in another frame area of the same sector may be equal to or greater than two. As used herein, the "intersymbol distance" means the number of different bits between two code sequences being compared to each other. By defining the intersymbol distance to be two or more in this manner, even if one of the two sequences is read with a one bit shift error produced due to the influence of noise during reading, that sequence will never be taken for the other one by mistake. Also, the intersymbol distance between the sync code sequence included in the frame area at the top of that sector and the one included in another frame area of the same sector may be equal to or greater than two. In that case, it can be determined more easily whether or not the given frame area is located at the top of a sector (or at the boundary between two sectors).

It should be noted that the intersymbol distance could be the distance between code sequences according to the NRZ notation if an NRZ write operation is performed but could also be the distance between sequences according to the NRZI notation if an NRZI write operation is performed. For that reason, if the RLL modulation technique is adopted, then it means that the number of high or low levels that appear consecutively on an NRZI write waveform should be limited.

That is why it means that the intersymbol distance according to the NRZI notation should be equal to or greater than two.

Recording Method—In-Groove or On-Groove

Furthermore, if grooves are cut on an optical information recording medium, the storage medium comes to have groove portions and land portion between the groove portions. That is why the methods of writing data need to be changed depending on whether data should be written on groove portions or on land portions. Specifically, data can be written in various manners, e.g., only on groove portions, only on land portions, or both on groove and land portions. In this case, a method of writing data on portions (i.e., either groove portions or land portions) that are raised as viewed from under the light incoming surface is called "On-Groove" writing. On the other hand, a method of writing data on portions that are depressed as viewed from under the light incoming surface is called "In-Groove" writing. According to the present invention, at least one of these two writing methods may be adopted arbitrarily. That is to say, only the On-Groove writing or only the In-Groove writing should be adopted, or one of these two methods could be used selectively.

If one of these two writing methods needs to be permitted selectively, writing method specifying information, indicating which of the two writing methods (i.e., the On-Groove writing or In-Groove writing) should be adopted for the medium, may be written on the medium. As for a multilayer medium, the writing method specifying information for the respective layers needs to be stored. In that case, the writing method specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of writing method specifying information may be stored in each layer. Still alternatively, the writing method specifying information for all layers could be stored on each and every layer.

Also, the writing method specifying information could be stored in the BCA (burst cutting area) or a disc information area or superposed on the wobbled groove. The disc information area is located inside and/or outside of the data recording area and used to store mainly control information. The disc information area is a read-only area and may have a broader track pitch than the data recording area. The writing method specifying information could be stored in one, any two, or even all, of these areas and portions.

Furthermore, the direction in which the groove starts wobbling for the very first time according to the On-Groove writing method may be opposite to the one according to the In-Groove writing method. That is to say, if the groove starts to wobble inward (i.e., toward the center of the disc) according to the On-Groove writing method, then the groove should start to wobble outward according to the In-Groove writing method. Alternatively, if the groove starts to wobble outward according to the On-Groove writing method, then the groove should start to wobble inward according to the In-Groove writing method. In this manner, by getting the groove to start wobbling in mutually opposite directions between the On-Groove and In-Groove writing methods, the polarity of tracking can be the same, no matter which of these two methods is adopted. This is because although a write operation is performed on the raised portion according to the On-Groove writing method as viewed from under the light incoming surface, a write operation is performed on the depressed portion according to the In-Groove writing method as viewed from under the light incoming surface. That is why supposing the groove depths are the same between these two methods, their tracking polarities will be opposite to each other. Thus, if the groove is supposed to start wobbling in mutually opposite directions between these two methods, then their tracking polarities should be the same.

In-Pit and On-Pit

The In-Groove and On-Groove writing methods described above are applied to a recordable medium on which grooves are supposed to be cut. However, a similar idea is applicable to a read-only medium, too. More specifically, as for a read-only medium, information is stored in the forms of an embossed pattern (i.e., raised and depressed pits). As for the method of forming such pits, a technique for forming raised pits as viewed from under the light incoming surface is called "On-Pit technique" and a technique for forming depressed pits as viewed from under the light incoming surface is called "In-Pit technique". According to the present invention, at least one of these two methods may be adopted arbitrarily. That is to say, only the On-Pit technique or only the In-Pit technique should be adopted, or one of these two methods could be used selectively.

If one of these two methods needs to be permitted selectively, pit forming method specifying information, indicating which of the two methods (i.e., the On-Pit technique or In-Pit technique) should be adopted for the medium, may be written on the medium. As for a multilayer medium, the pit forming method specifying information for the respective layers needs to be stored. In that case, the pit forming method specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of pit forming method specifying information may be stored in each layer. Still alternatively, the pit forming method specifying information for all layers could be stored on each and every layer.

Also, the pit forming method specifying information could be stored in the BCA (burst cutting area) or a disc information area. The disc information area is located inside and/or outside of the data recording area and used to store mainly control information. The disc information area may have a broader track pitch than the data recording area. The pit forming method specifying information could be stored in one or both of these two areas.

Recording Film and Reflectance—HTL and LTH

The recording film of an optical information recording medium may have the following two different properties, which are determined by the reflectances of recorded and unrecorded portions thereof. Specifically, if the unrecorded portion has a higher reflectance than the recorded portion, then the recording film has high-to-low (H to L) property. On the other hand, if the unrecorded portion has a lower reflectance than the recorded portion, then the recording film has low-to-high (L to H) property. According to the present invention, at least one of these two recording film properties may be adopted arbitrarily. That is to say, the recording film of a given medium may have only the H to L property or only the L to H property. Or the recording film could permit one of these two properties selectively.

If one of these two properties needs to be permitted selectively, recording film property specifying information, indicating which of the two properties the recording film should have (i.e., either H to L or L to H), may be written on the medium. As for a multilayer medium, the recording film property specifying information for the respective layers needs to be stored. In that case, the recording film property specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of recording film property specifying information may be stored in each layer. Still alternatively, the recording film property specifying information for all layers could be stored on each and every layer.

Also, the recording film property specifying information could be stored in the BCA (burst cutting area) or a disc information area or superposed on the wobbled groove. The disc information area is located inside and/or outside of the data recording area and used to store mainly control information. The disc information area is a read-only area and may have a broader track pitch than the data recording area. The recording film property specifying information could be stored in one, any two, or even all, of these areas and portions.

It should be noted that as the storage densities increase, optical disc media will have multiple different storage densities. In that case, only some of those various formats and methods described above could be adopted according to the storage density or others could be changed into different formats or methods.

Also, in the foregoing description, the storage medium is supposed to be an optical disc, and has been referred to herein as a "medium" or an "information recording medium". However, these terms actually have the same meaning. Also, examples of the storage media to which the present invention is applicable include not only optical discs on which a read/write operation is performed with light but also magnetic recording media and magneto-optical storage media on which a read/write operation is performed with magnetic energy. Furthermore, the present invention can find application in the field of technology in which signal processing is carried out by the PRML signal processing technique. For example, the present invention is applicable to the field of evaluating the characteristic of transmission line for telecommunications. More particularly, the present invention can be used to evaluate high-speed telecommunications transmission lines such as HD-PLC and HDMI.

A signal evaluation method according to the present invention is a method for evaluating a read signal, retrieved from an information recording medium, based on a binarized signal that has been generated from the read signal by a PRML method. The method includes the steps of: detecting the patterns of multiple paths that are associated with the binarized signal and that merge into the same state; getting the ideal value of a correct pattern that is associated with the binarized signal and the ideal value of an erroneous pattern that is similar to, but different from, the correct pattern; calculating the difference between a distance from the ideal value of the correct pattern to the read signal and a distance from the ideal value of the erroneous pattern to the read signal; calculating, based on the difference, an expected error rate for each predetermined group of patterns by the PRML method; and calculating a standard deviation that is associated with a total error rate, which is obtained by adding together the error rates of the predetermined groups of patterns, and that is used for evaluating the read signal.

In one preferred embodiment, the step of calculating the error rate includes: calculating the standard deviation of the difference for each said predetermined group of patterns; detecting the probability of each said predetermined group of patterns; and calculating the error rate based on the standard deviation of the difference, the probability, and the number of errors occurring in each said predetermined group of patterns.

In another preferred embodiment, each said predetermined group of patterns has a Euclidean distance of 14 or less.

In still another preferred embodiment, the predetermined groups of patterns include: a group of patterns with a Euclidean distance of 14; a group of patterns with a Euclidean distance of 12 and with isolated 2T signals; and a group of patterns with a Euclidean distance of 12 and with a series of 2T signals.

In yet another preferred embodiment, the PRML method is PR 12221.

An apparatus according to the present invention is designed to evaluate a read signal, retrieved from an information recording medium, based on a binarized signal that has been generated from the read signal by a PRML method. The apparatus includes: a pattern detecting section for detecting the patterns of multiple paths that are associated with the binarized signal and that merge into the same state; a difference calculating section for calculating the difference between a distance from the ideal value of a correct pattern associated with the binarized signal to the read signal and a distance from the ideal value of an erroneous pattern, which is similar to, but different from, the correct pattern, to the read signal; an error rate calculating section for calculating, based on the difference, an expected error rate for each predetermined group of patterns by the PRML method; and a standard deviation calculating section for calculating a standard deviation that is associated with a total error rate, which is obtained by adding together the error rates of the predetermined groups of patterns, and that is used for evaluating the read signal.

In one preferred embodiment, the apparatus further includes: a calculating section for calculating the standard deviation of the difference for each said predetermined group of patterns; and a detecting section for detecting the probability of each said predetermined group of patterns. The error rate calculating section calculates the error rate based on the standard deviation of the difference, the probability, and the number of errors occurring in each said predetermined group of patterns.

In another preferred embodiment, each said predetermined group of patterns has a Euclidean distance of 14 or less.

In still another preferred embodiment, the predetermined groups of patterns include: a group of patterns with a Euclidean distance of 14; a group of patterns with a Euclidean distance of 12 and with isolated 2T signals; and a group of patterns with a Euclidean distance of 12 and with a series of 2T signals.

In yet another preferred embodiment, the PRML method is PR 12221.

An information recording medium according to the present invention has a predetermined quality. The information recording medium includes at least one recording layer, which has a recording area in which information is stored as a combination of marks and spaces. An evaluation value, representing a read signal that has been generated from the marks and the spaces, has a predetermined value. The process of calculating the evaluation value includes the steps of: generating a binarized signal from the read signal, which has been generated from the marks and the spaces, by a PRML method; detecting the patterns of multiple paths that are associated with the binarized signal and that merge into the same state; calculating the difference between a distance from the ideal value of a correct pattern that is associated with the binarized signal to the read signal and a distance from the ideal value of an erroneous pattern that is similar to, but different from, the correct pattern to the read signal; calculating, based on the difference, an expected error rate for each predetermined group of patterns by the PRML method; and calculating a standard deviation that is associated with a total error rate, which is obtained by adding together the error rates of the predetermined groups of patterns, and that is used for evaluating the read signal.

A player according to the present invention is designed to read information from the information recording medium of the present invention described above. The player includes: a light receiving section for irradiating the information recording medium with a light beam and receiving light that has been reflected from the marks and the spaces; and a reading section for reading, based on a signal generated from the reflected light, information that is stored as the marks and the spaces.

A recorder according to the present invention is designed to write information on the information recording medium of the present invention described above. The recorder includes: an irradiating section for irradiating the information recording medium with a pulsed light beam, thereby forming marks on the recording area; and an adjusting section for adjusting an emission wave pattern of the light beam such that the evaluation value satisfies the predetermined value.

A signal evaluation method according to the present invention is a method for generating a binarized signal based on a read signal, retrieved from an information recording medium, by a PRML signal processing method. According to the signal evaluation method of the present invention, the patterns of multiple paths that merge into the same state are detected from the binarized signal by the PRML method. Next, with the binarized signal defined as a correct pattern, an ideal signal obtained from the correct pattern, an erroneous pattern that is similar to, but different from, the correct pattern, an ideal signal obtained from the erroneous pattern, and a Euclidean distance between the correct and erroneous patterns are calculated. If the binarized signal has turned out to have a predetermined pattern, then the difference between a Euclidean distance from the ideal signal of the correct pattern to the read signal and a Euclidean distance from the ideal signal of the erroneous pattern to the read signal is calculated, and $\sigma$ of the differences of each said predetermined group of patterns and the probability of that group of patterns are calculated. Then, the integral of the error functions is calculated for each said group of patterns, thereby obtaining an estimated bit error rate. And the quality of the read signal is evaluated by an overall estimated bit error rate, which is the sum of the estimated bit error rates of those groups of patterns. Alternatively, $\sigma$ may be obtained based on the overall estimated bit error rate that is the sum of the estimated bit error rates of the respective groups of patterns, and then the quality of the read signal may be evaluated by that $\sigma$.

A signal evaluation apparatus according to the present invention is an apparatus for generating a binarized signal based on a read signal, retrieved from an information recording medium, by a PRML signal processing method. The signal evaluation apparatus of the present invention includes: means for detecting the patterns of multiple paths that merge into the same state from the binarized signal by the PRML method; and means for calculating, with the binarized signal defined as a correct pattern, an ideal signal from the correct pattern, an erroneous pattern that is similar to, but different from, the correct pattern, an ideal signal from the erroneous pattern, and a Euclidean distance between the correct and erroneous patterns. If the binarized signal has turned out to have a predetermined pattern, then the apparatus includes: means for calculating the difference between a Euclidean distance from the ideal signal of the correct pattern to the read signal and a Euclidean distance from the ideal signal of the erroneous pattern to the read signal: means for calculating $\sigma$ of the differences of each said predetermined group of patterns and the probability of that group of patterns; means for calculating the integral of the error functions for each said group of patterns, thereby obtaining an estimated bit error rate; and means for obtaining an overall estimated bit error rate, which is the sum of the estimated bit error rates of those groups of patterns. Alternatively, the signal evaluation apparatus may also include means for obtaining $\sigma$ based on the overall estimated bit error rate that is the sum of the estimated bit error rates of the respective groups of patterns.

Another signal evaluation method according to the present invention is a method for generating a binarized signal based on a read signal, retrieved from an information recording medium, by a PRML signal processing method. According to the signal evaluation method of the present invention, the patterns of multiple paths that merge into the same state are detected from the binarized signal by the PRML method. Next, with the binarized signal defined as a correct pattern, an ideal signal obtained from the correct pattern, an erroneous pattern that is similar to, but different from, the correct pattern, and an ideal signal obtained from the erroneous pattern are calculated. If the binarized signal has turned out to have a predetermined pattern, then the difference between a distance from the ideal signal of the correct pattern to the read signal and a distance from the ideal signal of the erroneous pattern to the read signal is calculated. And based on the difference thus obtained, an expected error rate of each said predetermined group of patterns is calculated. Then, $\sigma$ of the normal distribution, expected from the total error rate that is the sum of the respective error rates of the groups of patterns obtained in the error rate calculating processing step, is obtained and used to evaluate the read signal.

In calculating the error rate, $\sigma$ of the differential information calculated for each said predetermined group of patterns and the probability of that predetermined group of patterns are obtained. The expected error rate is calculated based on the number of errors that occur in each predetermined group of patterns.

Alternatively, in calculating the error rate, the number of times the differential information calculated for each said predetermined group of patterns exceeds a predetermined threshold value and the probability of the predetermined group of patterns are obtained. And the expected error rate is calculated based on the number of errors that occur in each predetermined group of patterns.

Another signal evaluation apparatus according to the present invention is an apparatus for generating a binarized signal based on a read signal, retrieved from an information recording medium, by a PRML signal processing method. The signal evaluation apparatus of the present invention includes: means for detecting the patterns of multiple paths that merge into the same state from the binarized signal by the PRML method; and means for generating, with the binarized signal defined as a correct pattern, an ideal signal from the correct pattern, an erroneous pattern that is similar to, but different from, the correct pattern, and an ideal signal from the erroneous pattern. If the detecting means has found the binarized signal having a predetermined pattern, the signal evaluation apparatus further includes: difference calculating means for calculating the difference between a distance from the ideal signal of the correct pattern to the read signal and a distance from the ideal signal of the erroneous pattern to the read signal; an error rate calculating means for calculating, based on the difference thus obtained, an expected error rate of each said predetermined group of patterns; and means for obtaining σ of the normal distribution that is expected from the total error rate that is the sum of the respective error rates of the groups of patterns obtained by the error rate calculating means.

The present invention can be used particularly effectively in the field of technology where signal processing is done by maximum likelihood decoding.

What is claimed is:

1. A signal evaluation method for evaluating a read signal, retrieved from an information recording medium, based on a binarized signal that has been generated from the read signal by a PRML method, the method comprising the steps of:
   detecting the patterns of multiple paths that are associated with the binarized signal and that merge into the same state;
   getting the ideal value of a correct pattern that is associated with the binarized signal and the ideal value of an erroneous pattern that is associated with the correct pattern;
   calculating the difference between a distance from the ideal value of the correct pattern to the read signal and a distance from the ideal value of the erroneous pattern to the read signal;
   calculating, based on the difference, an expected error rate for each predetermined group of patterns by the PRML method; and
   calculating a standard deviation that is associated with a total error rate, which is obtained by adding together the error rates of the predetermined groups of patterns, and that is used for evaluating the read signal.

2. An apparatus for evaluating a read signal, retrieved from an information recording medium, based on a binarized signal that has been generated from the read signal by a PRML method, the apparatus comprising:
   a pattern detecting section for detecting the patterns of multiple paths that are associated with the binarized signal and that merge into the same state;
   a difference calculating section for calculating the difference between a distance from the ideal value of a correct pattern associated with the binarized signal to the read signal and a distance from the ideal value of an erroneous pattern associated with the correct pattern to the read signal;
   an error rate calculating section for calculating, based on the difference, an expected error rate for each predetermined group of patterns by the PRML method; and
   a standard deviation calculating section for calculating a standard deviation that is associated with a total error rate, which is obtained by adding together the error rates of the predetermined groups of patterns, and that is used for evaluating the read signal.

3. An information recording medium with a predetermined quality,
   wherein the information recording medium includes at least one recording layer, and
   wherein the recording layer has a recording area in which information is stored as a combination of marks and spaces, and
   wherein an evaluation value, representing a read signal that has been generated from the marks and the spaces, has a predetermined value, and
   wherein the process of calculating the evaluation value includes the steps of:
   generating a binarized signal from the read signal, which has been generated from the marks and spaces, by a PRML method;
   detecting the patterns of multiple paths that are associated with the binarized signal and that merge into the same state;
   calculating the difference between a distance from the ideal value of a correct pattern that is associated with the binarized signal to the read signal and a distance from the ideal value of an erroneous pattern that is associated with the correct pattern to the read signal;
   calculating, based on the difference, an expected error rate for each predetermined group of patterns by the PRML method; and
   calculating a standard deviation that is associated with a total error rate, which is obtained by adding together the error rates of the predetermined groups of patterns, and that is used for evaluating the read signal.

4. A reproducing apparatus for reading information from the information recording medium of claim 3, the reproducing apparatus comprising:
   a light receiving section for irradiating the information recording medium with a light beam and receiving light that has been reflected from the marks and the spaces; and
   a reading section for reading, based on a signal generated from the reflected light, information that is stored as the marks and the spaces.

5. A recording apparatus for writing information on the information recording medium of claim 3, the recording apparatus comprising:
   an irradiating section for irradiating the information recording medium with a pulsed light beam, thereby forming marks on the recording area; and
   an adjusting section for adjusting an emission wave pattern of the light beam such that the evaluation value satisfies the predetermined value.

* * * * *